United States Patent [19]
Furutani et al.

[11] Patent Number: 5,053,638
[45] Date of Patent: Oct. 1, 1991

[54] SEMICONDUCTOR NEURAL CIRCUIT DEVICE HAVING CAPACITIVE COUPLING AND OPERATING METHOD THEREOF

[75] Inventors: Kiyohiro Furutani; Koichiro Mashiko, both of Hyogo, Japan

[73] Assignee: Mitsubishi Denki Kabushiki Kaisha, Tokyo, Japan

[21] Appl. No.: 489,169

[22] Filed: Mar. 6, 1990

[30] Foreign Application Priority Data

May 25, 1989 [JP] Japan .................................. 1-132206

[51] Int. Cl.$^5$ .............................................. G06F 7/00
[52] U.S. Cl. .................................... 307/201; 307/246; 364/807; 365/185
[58] Field of Search ............... 307/201, 450, 480, 246, 307/570; 364/513, 807; 365/185

[56] References Cited

U.S. PATENT DOCUMENTS

| | | | |
|---|---|---|---|
| 3,950,233 | 4/1976 | Cooper et al. ................... | 307/201 X |
| 4,045,783 | 8/1977 | Harland ............................. | 301/530 |
| 4,518,866 | 5/1985 | Clymer ............................. | 307/201 |
| 4,533,843 | 8/1985 | McAlexander, III et al. ..... | 307/530 |
| 4,660,166 | 4/1987 | Hopfield .......................... | 364/807 |
| 4,731,747 | 3/1988 | Deuker ............................. | 364/807 |
| 4,782,460 | 11/1988 | Spencer .......................... | 364/807 |
| 4,904,881 | 2/1990 | Castro ............................. | 307/201 |
| 4,924,119 | 5/1990 | Lee .................................. | 307/450 X |
| 4,935,648 | 6/1990 | Radjy et al. .................... | 307/450 X |
| 4,956,564 | 9/1990 | Holler et al. .................... | 307/201 |

FOREIGN PATENT DOCUMENTS 0121987  5/1988  Japan ................................... 307/201

OTHER PUBLICATIONS

Hollis et al., "Artificial Neurons Using Analog Multipliers", N.C. State Univ. Dept. Elect. Engr., Releigh, N.C., Manuscript received 12-1988.

William S. Johnson et al., "A 16Kb Electrically Erasable Nonvolatile Memory", 1980 IEEE International Solid States Circuits Conference, Feb. 14, 1980, pp. 152-153.

Hans P. Graf et al., "VLSI Implementation of a Neural Network Model", 1988 IEEE, Mar., pp. 41-49.

Primary Examiner—David Hudspeth
Attorney, Agent, or Firm—Lowe, Price, LeBlanc and Becker

[57] ABSTRACT

A neural circuit device modeled on vital cells includes a plurality of first signal lines to which signals to be computed are transferred, a plurality of amplifiers serving as the bodies of the vital cells, a plurality of second signal lines arranged to intersect with the first signal lines in correspondence to the respective amplifiers, and a plurality of coupling elements provided in crossings between the first and second signal lines. Each of the coupling elements is adapted to couple an associated first signal line with an associated second signal line in a specific degree of coupling, and includes a first capacitive element storing information of the degree of coupling in the form of charges, and a circuit which converts a signal potential of the associated first signal line along the coupling degree information stored in the first capacitive element to transfer the converted potential to the associated second signal line without feeding current between an operation power source or a ground potential and the associated second signal line. This conversion/transfer circuit includes a circuit which causes potential change on the second signal line through charge pumping function or charging function. The amplifiers as the neuron bodies include a capacitive coupling element at their inputs.

59 Claims, 25 Drawing Sheets

| Di AMPLITUDE | Xie | $\overline{Xie}$ | Xi1 | Xi1 |
|---|---|---|---|---|
| 3 | H | L | H | H |
| 2 | H | L | H | L |
| 1 | H | L | L | H |
| 0 | L | H | L | L |

FIG.11 PRIOR ART
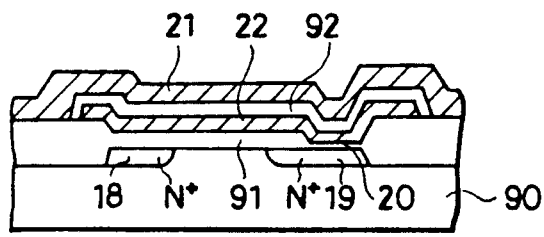
FIG.12
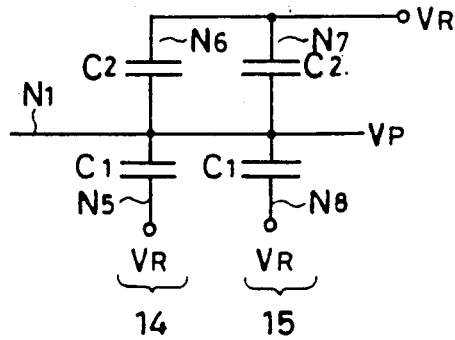
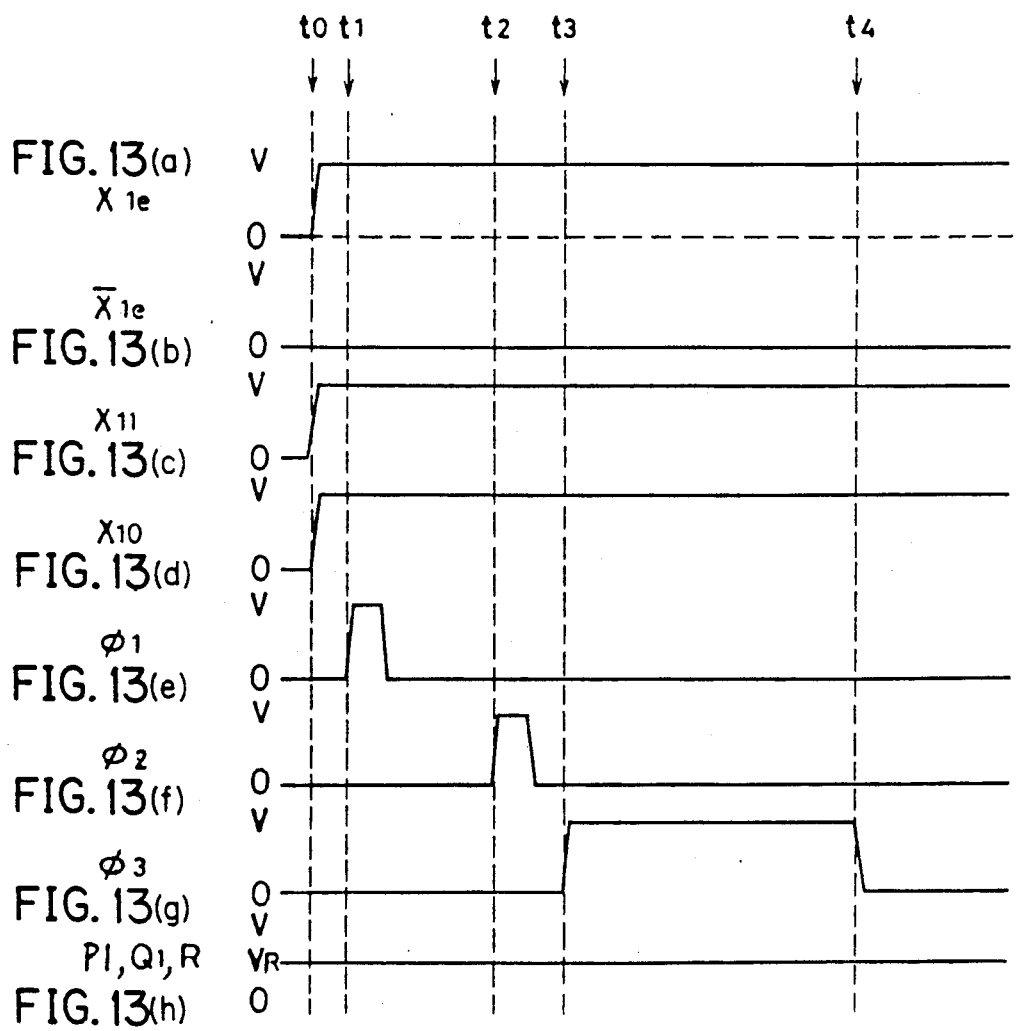

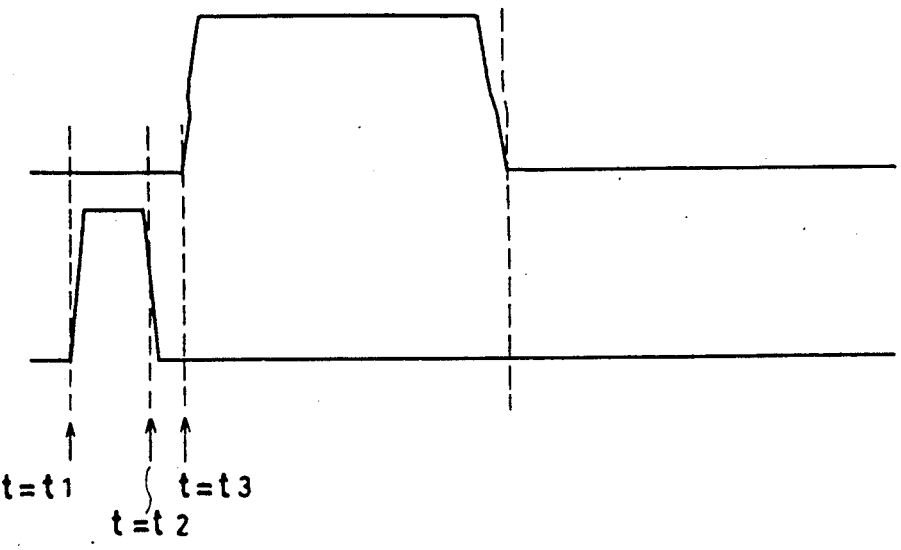
FIG. 21(a) X4
FIG. 21(b) φR
t=t1  t=t2  t=t3
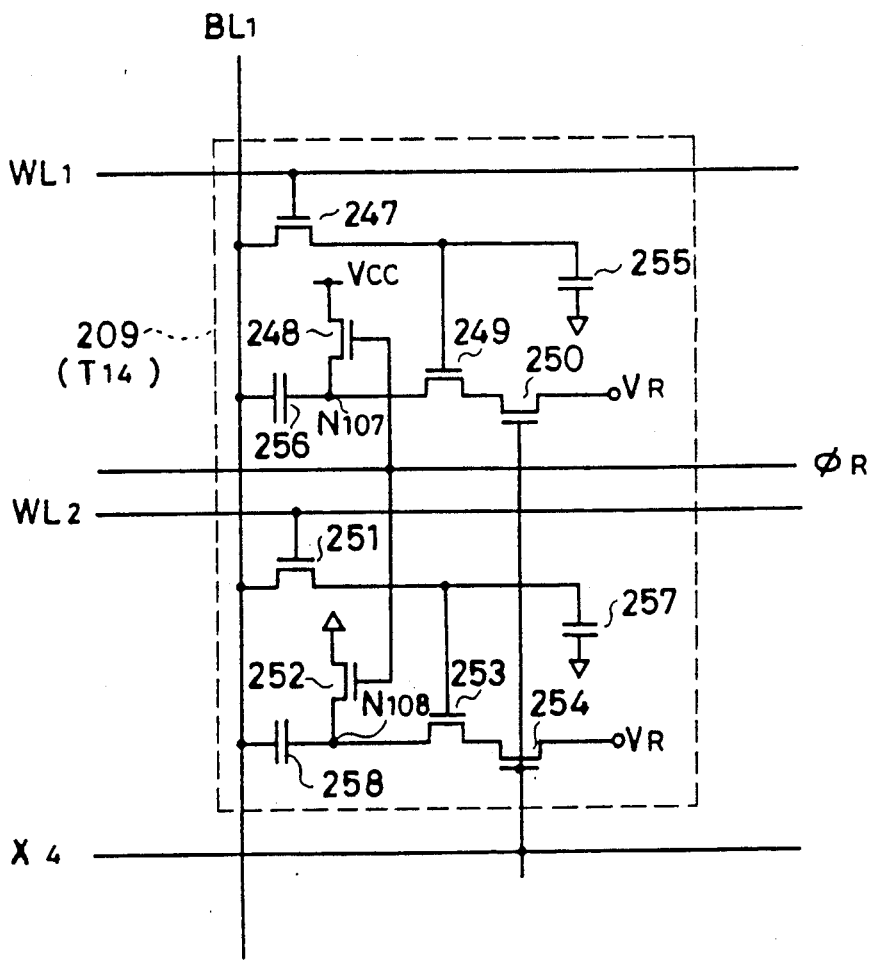
FIG. 22

FIG.33

| N 401 | N 402 | N 403 | N 404 | AMOUNT OF MOVED CHARGES | COUPLING DEGREE |
|---|---|---|---|---|---|
| 2VR | 2VR | 2VR | 2VR | 6VR·C | +3 |
| 2VR | 2VR | 2VR | 0 | 4VR·C | +2 |
| 2VR | 0 | 2VR | 2VR | 2VR·C | +1 |
| 2VR | 0 | 2VR | 0 | 0 | 0 |
| 2VR | 0 | 0 | 0 | −2VR·C | −1 |
| 0 | 0 | 2VR | 0 | −4VR·C | −2 |
| 0 | 0 | 0 | 0 | −6VR·C | −3 |

SEMICONDUCTOR NEURAL CIRCUIT DEVICE HAVING CAPACITIVE COUPLING AND OPERATING METHOD THEREOF

BACKGROUND OF THE INVENTION

1. Field of the Invention

The present invention relates to a semiconductor neural circuit device and an operating method thereof, and more particularly, it relates to the structure of a connection matrix of low power consumption and a small area, which is suitable for high integration.

2. Description of the Background Art

In recent years, various types of parallel arithmetic processing techniques have been proposed on the model of vital cells. Such a parallel arithmetic processing technique employs a model called a neural network. A neuron model employed in such a neural network is now described.

FIG. 1 shows a neuron unit which is provided in a neural network. Referring to FIG. 1, a unit i corresponding to a neuron includes signal an input part A, a conversion part B for converting signals supplied from the input part A along a prescribed rule, and an output part C for outputting the data converted in the conversion part B. The input part A has a prescribed weight (synapse load) $W_{ij}$ in correspondence to each unit. For example, a signal $S_k$ received from a unit k is converted into a signal $S_k \cdot W_{ij}$ with multiplication of a weight $W_k$, and then transferred to the conversion part B.

The conversion part B passes through a prescribed function the summation $$U_i \left( = \sum_j W_{ij} S_j \right)$$

of the signals transferred through the input part A, and outputs an output signal $S_i$.

A nonlinear monotonously increasing function, such as a sigmoid function shown in FIG. 2, is utilized as a function g(u) for converting the input data in the conversion part B. The sigmoid function is expressed as:

$$g(u) = 1/(1 + \exp(-u)), \text{ or}$$
$$= (\tfrac{1}{2})\{1 + \tanh(u/u_0)\}$$

where $u_0$ represents a predetermined threshold value. Such a neuron model is employed in the parallel arithmetic processing technique of a neural network model called Hopfield model. This neural network model is generally adopted to solve various problems such as an optimization problem through simulation with a serial processing computer.

However, it is inefficient to simulate such a neural network having parallel processability in essence with a computer which is essentially a serial processing unit. Therefore, such a neural network has been implemented as an electronic circuit.

FIG. 3 shows exemplary structure of a conventional neural network which is implemented as an electronic circuit. The neural network shown in FIG. 3 is disclosed in U.S. Pat. No. 4,660,166 to Hopfield, for example. Referring to FIG. 3, the conventional neural network includes amplifiers $A_i$, $\overline{A_i}$, $A_j$, $A_k$ and $\overline{A_k}$ serving as neuron units, data input lines $I_i$, $I_j$ and $I_k$, and data output signal lines $X_i$, $\overline{X_i}$, $X_j$, $\overline{X_j}$, $X_k$ and $\overline{X_k}$.

The data input lines $I_i$ to $I_k$ correspond to dendrites, and the data output lines $X_i$ and $\overline{X_i}$ to $X_k$ and $\overline{X_k}$ correspond to axons. Resistive elements having conductance $T_{ij}$ are provided on crossings of the input lines $I_i$ to $I_k$ and the data output lines $X_i$ and $\overline{X_i}$ to $X_k$ and $\overline{X_k}$. The input line $I_i$ is coupled with the output line $X_j$ through this resistive element $T_{ij}$. The amplifiers $A_i$ and $\overline{A_i}$ output signals which are complementary to each other. Thus, the output signal lines can be paired as complementary signal line pairs, to implement both excitatory connection and inhibitory connection. In the case of excitatory connection, the data input line $I_i$ is coupled with the data output line $X_j$ through the conductance $T_{ij}$, as shown in FIG. 4A. In the case of inhibitory connection, on the other hand, the data input line $I_i$ is coupled with the complementary data output line $\overline{X_j}$ through the conductance $T_{ij}$ as shown in FIG. 4B. Signal input and output characteristics of the amplifiers $A_i$ to $A_k$ are expressed by the sigmoid function shown in FIG. 2. The operation of this neural network is now briefly described.

In this model, each neuron unit (amplifier) can be connected with any unit. It is assumed here that $u_i$ represents a potential appearing at an input terminal of the amplifier $A_i$, and $V_i$ represents a potential appearing at its output terminal. As hereinabove described, there is the following relation in this case:

$$V_i = g(u_i)$$

As described in the aforementioned Hopfield patent in detail, the following equation holds in one neuron unit.

$$C_i \cdot du_i/dt = -u_i/P_i + \sum_j T_{ij} V_j + I_i$$

where $$1/R_i = 1/P_i + \sum_j T_{ij}$$

$R_i$: input resistance of amplifier $A_i$
$C_i$: input capacitance of amplifier $A_i$
$I_i$: current flowing in input signal line $I_i$ When values are given to the aforementioned parameters $T_{ij}$, $I_i$, $g(u_i)$, $C_i$ and $R_i$, it is possible to simulate the time-dependent change in state of respective units provided in this neural network through the aforementioned nonlinear differential equation. However, when the states of the respective neurons are one by one changed in time, programs will be impractically excessive as the number of the units forming the neural network is increased. Therefore, Hopfield introduces the following energy function:

$$E = (-\tfrac{1}{2}) \sum_{i,j} T_{ij} V_i V_j + \sum_i (1/R_i) \int g_i^{-1}(V) dV - \sum_i I_i V_i$$

as a quantity expressing the property of the overall neural network. This energy function is in the same form as spin Hamiltonian, which is used in an Ising model in material theory. The Ising model is employed for illustrating a phase transition phenomenon of a ferromagnetic material in statistical mechanics, and gives energy of the overall system when spins exhibiting plus and/or minus states interact with each other to cause state transition. It is known that this energy function takes the minimum value when the system is in an equilibrium state.

In the neural network, therefore, the goal is found in a potential $V_i$ which minimizes the energy function E. Namely, the electronic circuit shown in FIG. 3 has such function that the respective amplifiers $A_i$ to $A_k$ operate in parallel with each other, to output an output signal $V_i$ which minimizes the energy function E with respect to supplied data.

When the curve of the function showing the input and output characteristics of the aforementioned amplifiers is abrupt, the form of the energy function E is simplified. In this case, the output of each neuron unit is substantially zero or close to the maximum output of 1, if the system of the neural network is in a stable state having low energy. For this case, the energy function E is given as follows:

$$E = (-\tfrac{1}{2}) \sum_{i,j} T_{ij} V_i V_j - \sum_j I_j V_j$$

where $T_{ij} = T_{ji}$.

In the network according to the Hopfield model, obtained are such output data that the energy E of the network is settled at the minimum value. Therefore, a resistive matrix formed by the coupling elements stores certain patterns or data in accordance with program states of the resistive coupling elements $T_{ij}$, and can decide match/mismatch between input data and the stored pattern or data. Thus, such a neural network can be applied to an associative memory circuit or a pattern discriminator.

FIG. 5 shows the structure of such a programmable resistive coupling element. The structure of the programmable coupling element shown in FIG. 5 is disclosed in IEEE Computer, March 1988, pp. 41 to 49.

Referring to FIG. 5, the conventional programmable coupling element includes switching elements $S_1$, $S_2$, $S_3$ and $S_4$, resistive elements $R^+$ and $R^-$, and random access memory cells $RM_1$ and $RM_2$. The switching elements $S_1$ and $S_4$ enter on states in response to the signal potential on a signal line $X_j$. The switching element $S_2$ enters an on state in response to information stored in the random access memory cell $RM_1$. The switching element $S_3$ enters an on state in response to information stored in the random access memory cell $RM_2$. The resistive element $R^+$ is connected to a source potential $V_{CC}$, and the resistive element $R^-$ is connected to a ground potential $V_{SS}$. These resistive elements $R^+$ and $R^-$, which are of high resistance values, have current limiting function.

When the random access memory cell $RM_1$ stores data "1" and the random access memory cell $RM_2$ stores data "0", the switching element $S_2$ enters an on state and the switching element $S_3$ enters an off state. Therefore, current is flown from the resistive element $R^+$ into an input terminal of an amplifier $A_i$ in response to the signal potential on the signal line $X_j$, thereby to express a positive coupling degree $T_{ij}$.

When data "0" is written in the random access memory cell $RM_1$ and data "1" is written in the random access memory cell $RM_2$, on the other hand, the switching element $S_2$ enters an off state and the switching element $S_3$ enters an on state. In this case, current is flown from the input terminal of the amplifier $A_i$ to the ground potential $V_{SS}$ in response to the signal potential on the signal line $X_j$, thereby to express a negative coupling degree $T_{ij}$.

A coupling degree 0 is expressed by writing data "0" in both of the random access memory cells $RM_1$ and $RM_2$ and bringing the switching elements $S_2$ and $S_3$ into off states.

Such random access memory cells $RM_1$ and $RM_2$ are generally formed by static random access memory cells, which require no refresh function.

A perceptron proposed by F. Rosenblatt is known as a neural network model. FIG. 6 shows simplified structure of the perceptron.

Referring to FIG. 6, four nerve cells 501 to 504 are connected to a nerve cell 105 through synapse loads $W_1$, $W_2$, $W_3$ and $W_4$, respectively. Assuming that $X_1$ to $X_4$ represent quantities of stimuli outputted from the respective nerve cells 501 to 504, the summation of the quantities of stimuli received in the nerve cell 505 is expressed as $$\sum_i W_i X_i.$$

The nerve cell 505 enters a firing state and its output goes to "1" when the summation $\Sigma W_i X_i$ is higher than a predetermined threshold value h, while the output goes to "0" when the former is lower than the latter.

This perceptron can be so set that an output $Y_1$ of the nerve cell 505 goes high only when inputs $X_1$ to $X_4$ have certain patterns by appropriately programming the degree of coupling of the synapse loads $W_1$, $W_2$, $W_3$ and $W_4$. Thus, this perceptron can serve as a discriminator for input patterns $(X_1, X_2, X_3, X_4)$.

A plurality of such perceptrons are connected in a multistage manner as shown in FIG. 7, thereby to increase ability for pattern discrimination.

The electronic circuit of the neural network has the aforementioned structure, and current stationarily flows during the operation through resistors of the coupling elements providing the degree of coupling between signal lines. In the coupling element shown in FIG. 5, for example, an output signal line of an amplifier $A_j$ merely drives the switching elements $S_1$ and $S_4$ and it is not necessary to drive the input signal line of the amplifier $A_i$, whereby an output load of the amplifier $A_j$ is reduced. In this case, however, current flows between the input terminal of the amplifier $A_i$ and the source potential $V_{CC}$ or the ground potential $V_{SS}$. Thus, stand-by-state current normally flows during the operation, to increase power consumption.

Although various structures have been proposed to couple signal lines simply through resistive elements, current flows between the signal lines also in this case, to increase power consumption.

SUMMARY OF THE INVENTION

An object of the present invention is to provide an improved semiconductor neural circuit which eliminates the disadvantages of the conventional semiconductor neural network.

Another object of the present invention is to provide an improved coupling element which eliminates the disadvantages of the coupling element of the conventional semiconductor neural circuit.

Still another object of the present invention is to provide a semiconductor neural circuit of low power consumption, which occupies a small area and is suitable for high integration.

A further object of the present invention is to provide a coupling element of low power consumption, which occupies a small area and is suitable for high integration.

A further object of the present invention is to provide a coupling element having novel structure, which is suitable for high integration.

A further object of the present invention is to provide a coupling element which can easily program the degree of coupling.

A further object of the present invention is to provide a semiconductor neural network in which the degree of coupling is readily programmed.

A further object of the present invention is to provide an improved amplifier of low power consumption, which serves as a neuron unit.

The semiconductor neural circuit according to the present invention comprises a capacitive coupling element serving as an element for coupling an input signal line corresponding to a dendrite and an output signal line corresponding to an axon, and a capacitive element for storing information as to the degree of coupling. The capacitive coupling element converts an input signal along the coupling degree information stored in the capacitive element to transfer the same to the output signal line in the form of charges.

In a semiconductor neural circuit device according to a first aspect of the present invention, a coupling element providing a degree of coupling between a first signal line to which input data is transferred and a second signal line transferring a signal to an amplifier comprises a capacitor for storing information indicating the degree of coupling specific to the coupling element; a transistor element having a first conduction terminal connected to a source potential and a control terminal receiving the information stored and held in the capacitive element; and means for capacitively coupling a second conduction terminal of the transistor element to the second signal line in response to a potential on the first signal line.

A neural circuit device according to a second aspect of the present invention comprises a coupling element which is formed by a first capacitive element holding information indicating a degree of coupling, means for transferring a first reference potential to a first node in response to the information held in the first capacitive element and to a potential on a first signal line to which input data is transferred, means for capacitively coupling the first node to a second signal line transferring an input signal for an amplifier to the amplifier, and means for precharging the first node to a second reference potential before an input signal to be processed is transferred onto the first signal line from an exterior to the circuit.

A coupling element of an electronic neural network according to a third aspect of the present invention includes a first capacitive element holding information indicating a degree of coupling, and means for coupling a first reference potential to a second signal line transferring an input signal for an amplifier to the amplifier in response to the potential of a first signal line onto which an input signal to be processed is transferred from an exterior and to the information held in the first capacitive element.

An amplifier serving as the body of a nerve cell in a semiconductor neural circuit device according to a fourth aspect of the present invention includes an element for capacitively coupling an input signal line with a first node, an element for precharging a second node to a reference potential in response to a first control signal, an element for connecting the first node with the second node after completion of the operation for precharging the second node, an amplifier for amplifying and outputting the potential of the second node, and means for holding the first and second nodes at the same potential when the input signal line is precharged.

A semiconductor neural circuit device according to the present invention includes a memory cell array storing information indicating the degree of coupling between a first input signal line and a second signal line transferring a signal to an amplifier serving as a neuron unit, circuit means for transferring the information stored in the memory cell array through a third signal line to a corresponding coupling element in a separately provided connection matrix. Each of coupling elements in the connection matrix includes a capacitive element having a first terminal holding transferred coupling degree information and a second terminal connected to a second signal line transferring a signal to the amplifier, and element means for connecting the third signal line with the first terminal in response to the potential on the first signal line. The third signal line for data transfer is held at a reference potential, which is different from the potential held in the first terminal, when an input signal is applied to the first signal line for processing.

In the neural circuit device according to the present invention, the first signal line to which the input signal is transferred is capacitively coupled with the second signal line which transfers the coupling-processed input signal to the amplifier. Therefore, only inflow or outflow of charges is caused and no standby-state current flows in an input signal line for the amplifier, whereby low power consumption can be implemented.

The information showing the degree of coupling is merely stored in the capacitor which can be formed in a small area in the semiconductor circuit, whereby the neural circuit device can be implemented with a small occupied area.

The capacitive element provided in the amplifier body capacitively couples its input signal line with the amplifier, whereby no standby-state current flows into the amplifier, which can be driven with low power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 schematically shows the sectional structure of an EEPROM cell employed in the coupling element shown in FIG. 10;

FIG. 12 shows an equivalent circuit for a coupling degree storing part employing the EEPROM cell shown in FIG. 10;

FIG. 13 is a signal waveform diagram showing the operation of the coupling element shown in FIG. 10;

FIG. 21 is a waveform diagram showing the operation of the embodiment shown in FIG. 19;

FIG. 22 shows a modification of the coupling element shown in FIG. 20;

FIG. 33 shows relations between potentials of nodes and degrees of coupling in the coupling element shown in FIG. 32.

DESCRIPTION OF THE PREFERRED EMBODIMENTS

Figure 7:
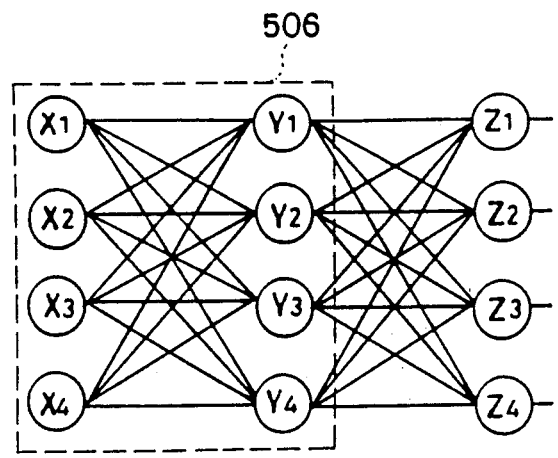
FIG. 7 represents an exemplary connection form of a multilayer perceptron.

Description is now made on structure of an electronic circuit which is provided by a circuit part 506 enclosed by broken lines in FIG. 7.

Figures 8, 9:
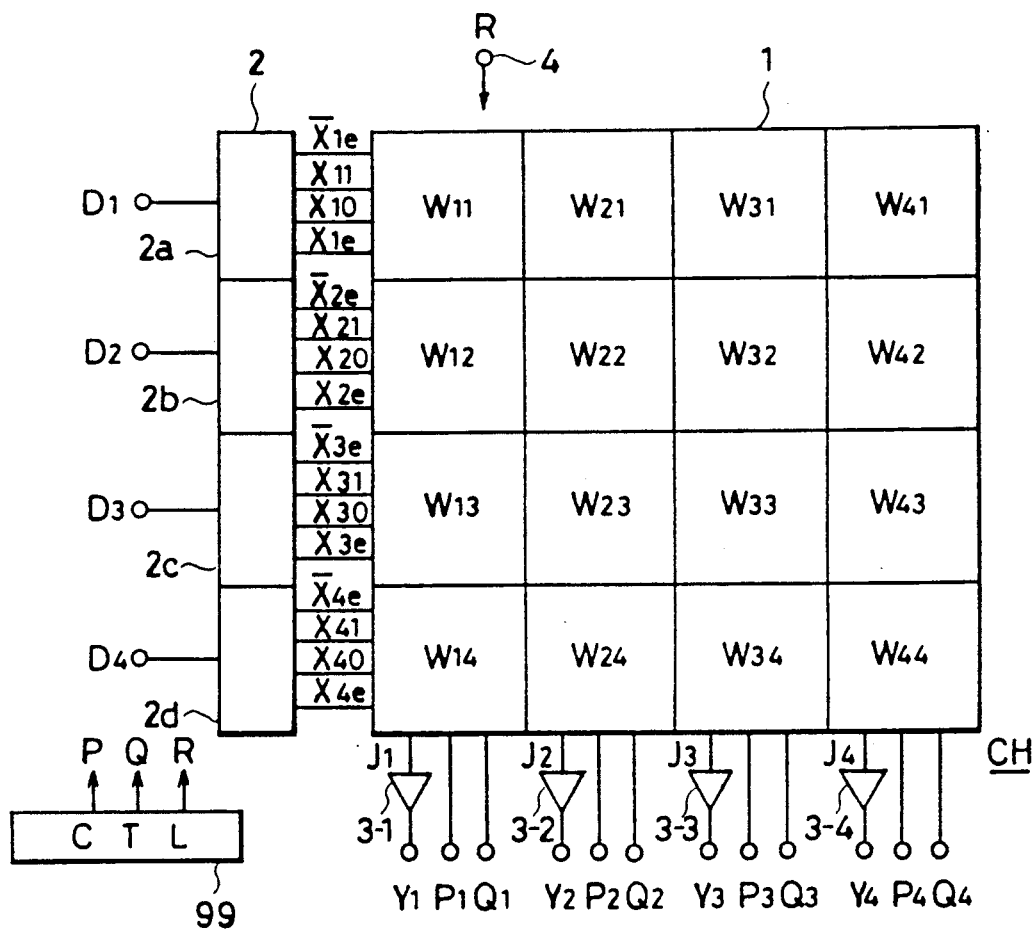
FIG. 8 schematically represents overall structure of a semiconductor neural network according to an embodiment of the present invention.
FIG. 9 depicts relations between input and potentials on corresponding signal lines in the neural network shown in FIG. 8.

FIG. 8 schematically represents overall structure of a semiconductor neural network according to an embodiment of the present invention. Referring to FIG. 8, the semiconductor neural network includes a coupling element array 1, a signal generation circuit 2 which generates signals corresponding to values of input signals $D_1$, $D_2$, $D_3$ and $D_4$, and amplifiers 3-1, 3-2, 3-3 and 3-4 which amplify signals from the coupling element array 1 to derive output signals $Y_1$, $Y_2$, $Y_3$ and $Y_4$.

The coupling element array 1 includes coupling elements $W_{11}$ to $W_{44}$ which are arrayed in four rows and four columns.

The signal generation circuit 2 includes unit signal generation circuits 2a, 2b, 2c and 2d, which are provided in correspondence to respective ones of the input signals $D_1$ to $D_4$. Each of the unit signal generation circuits 2a to 2d includes four signal lines $X_{ie}$, $X_{ie}$, $X_{i1}$ and $X_{i0}$ which transfer signals responsive to an input signal $D_i$ respectively. FIG. 9 shows signal conversion function of each of the unit signal generation circuits 2a to 2d. The input signal $D_i$ is represented in four steps, and an output signal is derived responsive to the strength of the input signal $D_i$. Signals indicating the input signal $D_i$ in two bits are derived on the signal lines $X_{i1}$ and $X_{i0}$. On the other hand, a signal indicating whether or not the input signal $D_i$ is zero is derived on the signal lines $X_{ie}$ and $X_{ie}$.

Each of the unit signal generation circuits 2a to 2d may be structured by an A-D converter which converts the analog input signal $D_i$ into digital data and a logic gate which calculates the OR and NOR of the outputs from the A-D converter and outputs the same. A converted signal is derived on the output signal lines $X_{i1}$ and $X_{i0}$ from the A-D converter, while a signal $X_{ie}$ is outputted from an OR gate and $X_{ie}$ is derived from a NOR gate. A signal indicating a higher bit in two-bit indication of the input signal $D_i$ is supplied onto the signal line $X_{i1}$, while a lower bit of the input signal in two-bit indication is transferred onto the signal line $X_{i0}$.

When the input signal $D_i$ is binary data which is a single-bit digital signal, specific two levels may be considered within the conversion strength values shown in FIG. 9.

Figure 1:
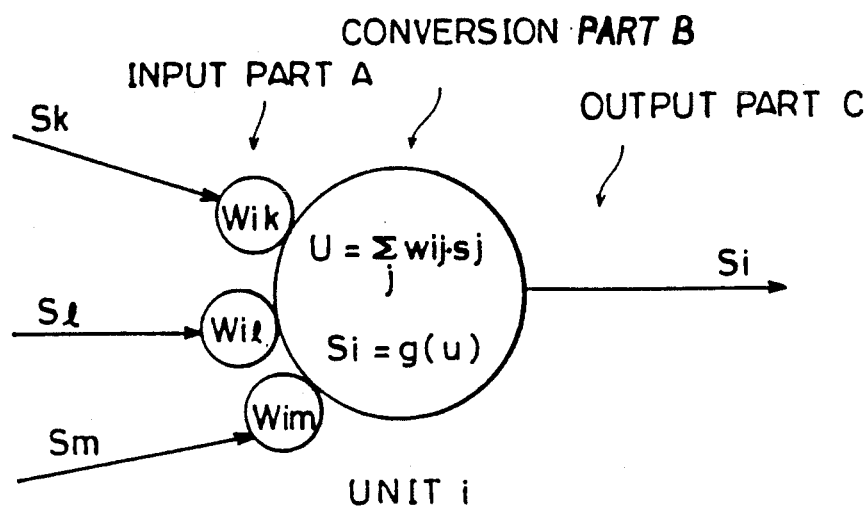
FIG. 1 typically illustrates a neuron unit which is employed as a model in a neural network.
Figure 2:
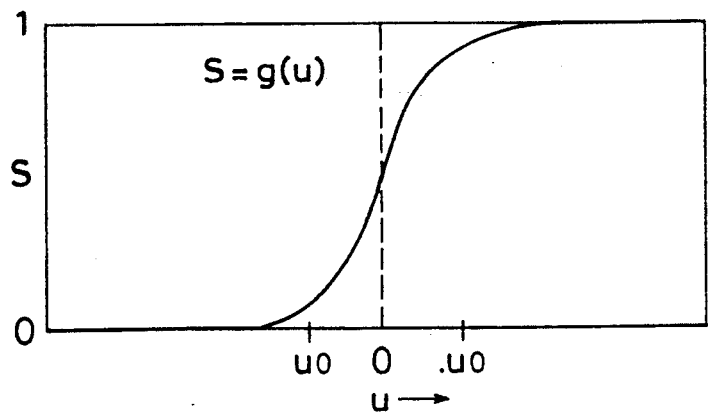
FIG. 2 depicts an exemplary conversion function employed in a neuron model.

The respective amplifiers 3-1 to 3-4 amplify signals derived from the coupling element array 1 through signal lines $J_1$ to $J_4$ and output the same. The signal input and output characteristic of each of the amplifiers 3-1 to 3-4 is given by the sigmoid function g(u) shown in FIG. 2, for example. Thus, each of the amplifiers 3-1 to 3-4 serves as the body of a neuron unit.

Signal lines $P_1$ to $P_4$, $Q_1$ to $Q_4$ and R are provided in order to program the degree of coupling of the respective coupling elements included in the coupling element array 1. Desired control signals are transferred onto the signal lines $P_1$ to $P_4$, $Q_1$ to $Q_4$ and R from an on-chip or off-chip control circuit 99. Symbol CH in FIG. 8 denotes a semiconductor chip. Description is now made on specific structure of each coupling element included in the coupling element array 1.

Figure 10:
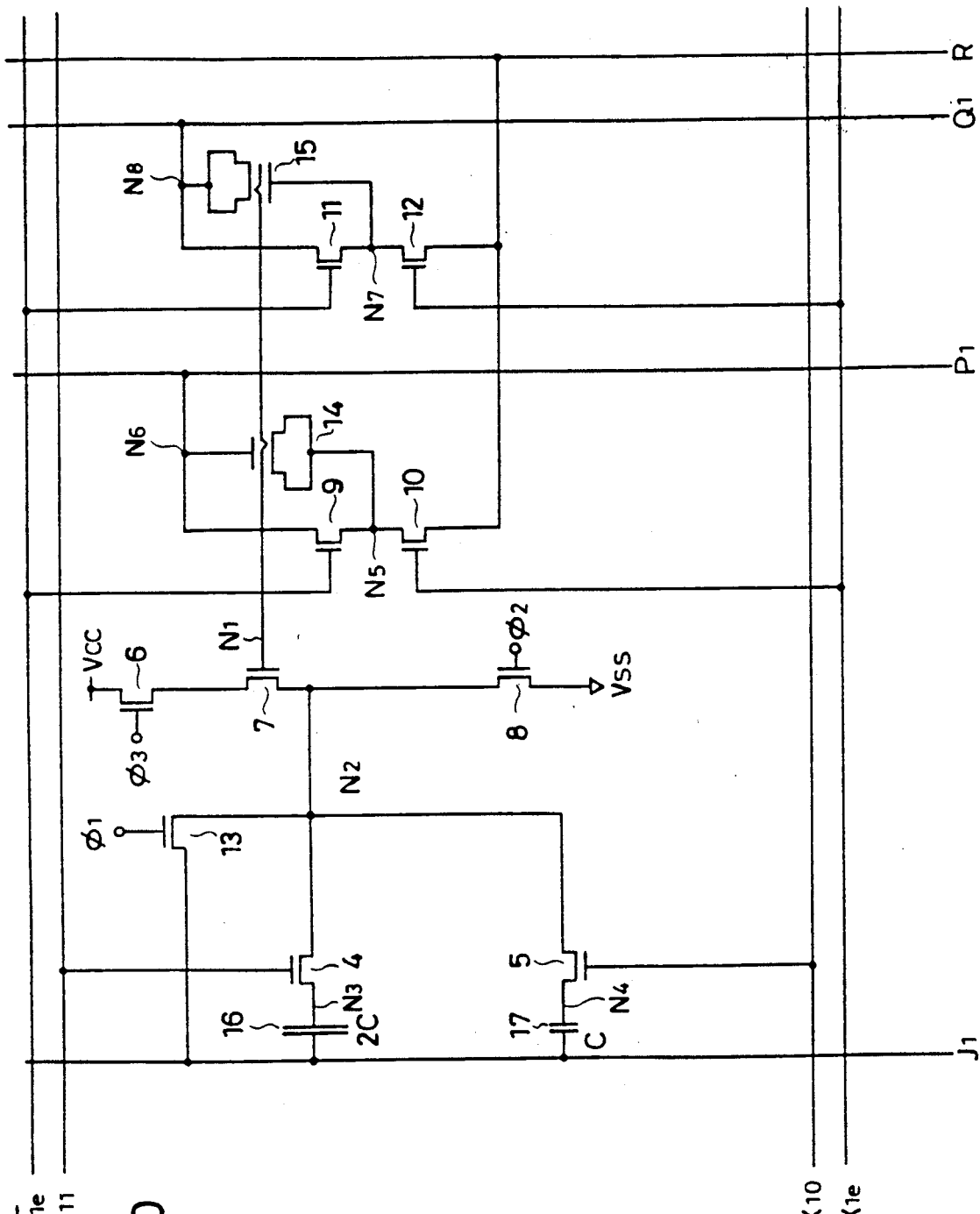
FIG. 10 shows the structure of a coupling element in the neural network according to the embodiment of the present invention.

FIG. 10 typically shows specific structure of the coupling element $W_{11}$. The coupling elements $W_{11}$ to $W_{44}$ are identical in structure to each other. Referring to FIG. 10, the coupling element $W_{11}$ includes EEPROM (electrically erasable and programmable read-only memory) cells 14 and 15, and n-channel field-effect transistors (hereinafter referred to as n-FETs) 9, 10, 11 and 12 for programming the EEPROM cells 14 and 15.

The EEPROM cell 14 has a control gate connected to the signal line $P_1$ through a node N6, a source and a drain both connected to a node N5, and a floating gate connected to a node N1. The EEPROM cell 15 has a source and a drain both connected to the signal line $Q_1$ through a node N8, a control gate connected to a node N7, and a floating gate connected to the node N1.

The n-FET 9 has a gate connected to the signal line $X_{1e}$, a first conduction terminal connected to the node N6, and a second conduction terminal connected to the node N5. The n-FET 10 has a first conduction terminal connected to the node N5, a gate connected to the signal line $X_{1e}$, and a second conduction terminal connected to the signal line R. The n-FET 11 has a gate connected t the signal line $X_{1e}$, a first conduction terminal connected to the node N8, and a second conduction terminal which is connected to the node N7. The n-FET 12 has a first conduction terminal connected to the node N7, a second conduction terminal connected to the signal line R, and a gate connected to the signal line $X_{1e}$.

In order to convert the input signal along the degree of coupling programmed in the EEPROM cells 14 and 15 and output the same on the signal line $J_1$, provided are n-FETs 4, 5, 6, 7, 8 and 13 and capacitors 16 and 17. The n-FET 4 enters an on state in response to the signal on the signal line $X_{11}$, to connect the node N3 with the node N2. The n-FET 5 enters an on state in response to the signal potential on the signal line $X_{10}$, to connect the node N2 with the node N4. The n-FET 13 enters an on state in response to a control signal $\phi_1$, to connect the signal line $J_1$ with the node N2. The n-FET 6 enters an on state in response to a control signal $\phi_3$, to transfer a source potential $V_{CC}$ to a first conduction terminal of the n-FET 7. The n-FET 7 transfers the potential on the node N1 onto the node N2 in a source follower mode. The n-FET 8 enters an on state in response to a control signal $\phi_2$, to couple the node N2 to a ground potential level $V_{SS}$.

The capacitor 16 capacitively couples the signal line $J_1$ with the node N3. The capacitor 17 capacitively couples the signal line $J_1$ with the node N4. The signal line $J_1$ is connected to an input part of the amplifier 3-1. The capacitor 16 is set to be twice the capacitor 17 in electrostatic capacitance.

FIG. 11 shows the structure of each of the EEPROM cells 14 and 15. Such structure of the EEPROM cell shown in FIG. 11 is disclosed, for example, in ISSCC Digest of Technical Papers, February 1980, pp. 152 to 153. Referring to FIG. 11, the EEPROM cell includes a source region 18 and a drain region 19 which are formed on prescribed areas of a semiconductor substrate 90, a floating gate 22 which is formed on the semiconductor substrate 90 with an insulating film 91 interposed therebetween, and a control gate 21 which is formed on the floating gate 22 with an interlayer isolation film 92 interposed therebetween. The source and drain regions 18 and 19 are formed by low-resistance N+ impurity regions into which N-type impurities such as P or As are introduced. A thin gate insulating film 20 is provided between the floating gate 22 and the drain region 19. The thin insulating film 20 is generally called a tunnel insulating film, and its thickness is set at 50 to 100 nm. The floating gate 22 and the drain region 19 transfer charges through the tunnel insulating film 20.

Both of the source and drain regions 18 and 19 are brought into the ground potential level of 0 V while a high potential of about 12 to 16 V in general, which is higher than an ordinary source potential, is applied to the control gate 21, in order to inject electrons into the floating gate 22. At this condition, a high electric field is applied across the tunnel insulating film 20, whereby electrons are injected into the floating gate 22 from the drain region 19 through the tunnel insulating film 20.

When the control gate 21 is brought into the ground potential level of 0 V and a high potential, which is higher than an ordinary high level (operating source potential level), is applied to both of the source and drain regions 18 and 19, electrons are discharged from the floating gate 22 to the drain region 19 through the tunnel insulating film 20.

The degree of coupling is programmably provided by the EEPROM cells 14 and 15 shown in FIG. 10 through charge outflow and inflow characteristics thereof. The EEPROM cells 14 and 15 discharge or receive charges as follows: It is assumed here that $C_2$ represents electrostatic capacitance between the floating gate 22 and the control gate 21 and $C_1$ represents electrostatic capacitance between the floating gate 22 and the source and drain regions 18 and 19, while -Q represents the amount of charges stored in the floating gate 22 through injection of electrons. When the nodes N5, N6, N7 and N8 are set at a predetermined precharge potential $V_R$ in FIG. 10, a potential $V_P$ at the node N1 can be evaluated from an equivalent circuit of the EEPROM cell shown in FIG. 12 as follows:

$$V_P = V_R - \{Q/2 \cdot (C_1 + C_2)\}$$

from the following relation:

$$-Q = 2 \cdot C_1 \cdot (V_P - V_R) + 2 \cdot C_2 \cdot (V_P - V_R)$$

The amount $-Q$ of charges injected into the node N1 is programmed as follows: The signal line $X_{1e}$ is set at a high level and the signal line $X_{1e}$ is set at a low level, so that the n-FETs 10 and 11 are set in on states and the n-FETs 9 and 11 are set in off states. When electrons are injected into the node N1, the potential of the signal line $P_1$ is set at a programming high voltage level which is higher than an ordinary high level, and the potentials of the signal lines $Q_1$ and R are set at the ground potential level of 0 V. In this case, the node N6 is set at a high potential and the node N5 is set at the ground potential level in the EEPROM cell 14, while the node N7 which is connected to the control gate and the node N8 which is connected to the source and drain regions 18 and 19 are set at the ground potential level in the EEPROM cell 15. Electrons are injected through the tunnel insulating film region of the EEPROM cell 14 into the floating gates of the EEPROM cells 14 and 15, which are both connected. Thus, the absolute value of the amount $-Q$ of charges injected into the node N1 is increased.

The potential of the signal line $Q_1$ is set at a high potential level which is higher than an ordinary high level, and the signal lines $P_1$ and R are set at the ground potential level of 0 V. In this case, electrons are discharged from the floating gates of the EEPROM cells 14 and 15 to the node N8 through the tunnel region of the EEPROM cell 15, whereby the electrons are drawn out from the node N1. Thus, the absolute value of the amount $-Q$ of charges injected into the node N1 is decreased.

Thus, the potential $V_P$ appearing at the node N1 when the nodes N5, N6, N7 and N8 are set at the predetermined precharge potential $V_R$, which causes no injection and outflow of electrons from the floating gates through the tunnel region, can be desirably programmed through the potentials respectively transferred onto the signal lines $X_{1e}$, $X_{1e}$, $P_1$, $Q_1$ and R and the time for injecting or discharging the electrons.

While high and low level signals are transferred to the signal lines $X_{1e}$ and $X_{1e}$ for programming the degree of coupling, such structure can be easily implemented by connecting control signal lines which transfer control signals for controlling operation in programming, to respective input parts of an OR gate for transferring the signal onto the signal line $X_{1e}$ and a NOR gate for transferring the signal onto the signal line $D_{1e}$ in the signal generation circuit respectively, for example.

As to programming of the degree of coupling of the coupling elements $W_{11}$ to $W_{44}$, signal lines $P_i$ and $Q_i$ are provided along the row direction to simultaneously program the degree of coupling in one row of the coupling elements. In this case, the signal line R may be provided along either the column or row direction. The operation of the coupling element shown in FIG. 10 is now described with reference to a signal waveform diagram shown in FIG. 13.

The potentials of the signal lines $P_1$, $Q_1$ and R are set at the predetermined potential $V_R$, and held at this potential during the computation process.

At a time $t_0$, the input signal $D_1$ is supplied to the signal generation circuit 2a, which in turn transfers the signals corresponding to the input signal $D_1$ onto the respective signal lines $X_{1e}$, $X_{11}$, $X_{10}$ and $X_{1e}$. When the strength of the input signal $D_1$ is 3, the potential on the signal line $X_{1e}$ goes high and that on the signal line $X_{1e}$ goes low, while the potentials of the signal lines $X_{11}$ and $X_{10}$ go high, as shown in FIG. 13. Thus, the n-FETs 10 and 12 enter on states to connect the nodes N5 and N7 to the signal line R. Consequently, the potentials of the nodes N5, N6, N7 and N8 are set at the predetermined potential $V_R$, whereby the potential of the node N1 is $V_P$.

At a time $t_1$, the control signal $\phi_1$ is raised up to a high level, whereby the signal line $J_1$ is precharged to the predetermined potential $V_R$ and connected to the node N2 through the n-FET 13. Thus, the potentials of the signal line $J_1$ and the nodes N2, N3 and N4 are precharged to the predetermined potential $V_R$.

At a time $t_2$, the control signal $\phi_2$ is activated, whereby the n-FET 8 enters an on state and the potential of the node N2 is set at the ground potential level $V_{SS}$.

At a time $t_3$, the control signal $\phi_3$ is raised up to a high level, whereby the n-FET 6 enters an on state to transfer the source potential $V_{CC}$ to the first conduction terminal of the n-FET 7. The n-FET 7 has the gate connected to the node N1 and a second conduction terminal serving as a source, which is connected to the node N2. Thus, the n-FET 7 operates in a source follower mode, to transfer to the node N2 a potential of:

$$V_q = V_P - V_{TH},$$

where $V_{TH}$ represents the threshold voltage of the n-FET 7. This potential of the node N2 is also transferred to the nodes N3 and N4 through the n-FETs 4 and 5, which are in on states. Such potential change of the nodes N3 and N4 from the ground potential level $V_{SS}$ to the potential $V_q$ is transferred onto the signal line $J_1$ through the capacitors 16 and 17. Assuming that electrostatic capacitance of the capacitor 16 is 2C and that of the capacitor 17 is C, charges are injected into the signal line $J_1$ by an amount:

$$\frac{(2C+C)}{}(V_q - V_R) = 3C\{((-Q)/2(C_1 + C_2)) - V_{TH}\},$$

as compared with that in the precharging at the time $t_1$. Thus, the coupling element $W_{11}$ has transferred the input signal $D_1$ of strength 3 in the degree of coupling which is proportional to the potential $(V_q - V_R)$.

The coupling element $W_{11}$ gives a positive degree of coupling when the potential $V_q$ of the node N2 is larger than the reference potential $V_R$, while the same gives a negative degree of coupling when the former is smaller than the latter. Thus, positive and negative degrees of coupling and a degree 0 of coupling can be implemented by programming the amount $-Q$ of charges injected and stored in the EEPROM cells 14 and 15 at appropriate values. In this case, an analogously changing of the degree of coupling can be implemented by adjusting the time for injecting or discharging the charges into or from the floating gates.

When the strength of the input signal $D_1$ is 2 or 1, charges are injected by capacitive coupling through either the capacitor 16 or 17, so that charges are injected or extracted into or from the signal line $J_1$ in response to the strength of the input signal $D_1$.

The remaining input signals $D_2$ to $D_4$ are also converted through the coupling elements $W_{12}$, $W_{13}$ and $W_{14}$ and thereafter transferred onto the signal line $J_1$. The amplifier 3-1 amplifies the signal on the signal line $J_1$ along predetermined input and output characteristics and converts the same into an output signal $Y_1$. Thus, the output signal $Y_1$ is computed as follows:

$$Y_1 = g\left(\sum_j W_{1j} D_j\right)$$

This also applies to the remaining output signals $Y_2$ to $Y_4$.

In the aforementioned structure, two EEPROM cells are employed to inject and discharge charges through one of the EEPROM cells. However, an effect similar to that of the above embodiment can be attained through a single EEPROM cell, if the EEPROM cell can provide sufficient electrostatic capacitance ($C_1$ and $C_2$) In this case, it is possible to reduce the number of signal wires since one of the signal lines $P_1$ and $Q_1$ can be omitted, thereby to form the coupling element array in high integration density.

In the aforementioned structure, further, the EEPROM cells 15 and 14 may be connected in the same connection fashion. In other words, the EEPROM cell 15 may have a control gate connected to the node N8, and a source and a drain both connected to the node N7, for example. In this case, charges are independently injected or discharged in the respective EEPROM cells 14 and 15, while it is necessary to transfer a high voltage for programming through the n-FETs 10 and 12. As to such structure, the signal line $X_{ie}$ may be provided with a high voltage switch ($V_{PP}$ switch), which is employed in a general EEPROM for further boosting a high-level signal, and functions only in programming operation.

The coupling element shown in FIG. 10 utilizes the charge injection and discharge characteristics of EEPROM cells. Such structure may be replaced by that utilizing charge and discharge characteristics of capacitors, as shown in FIG. 14.

Figure 14:
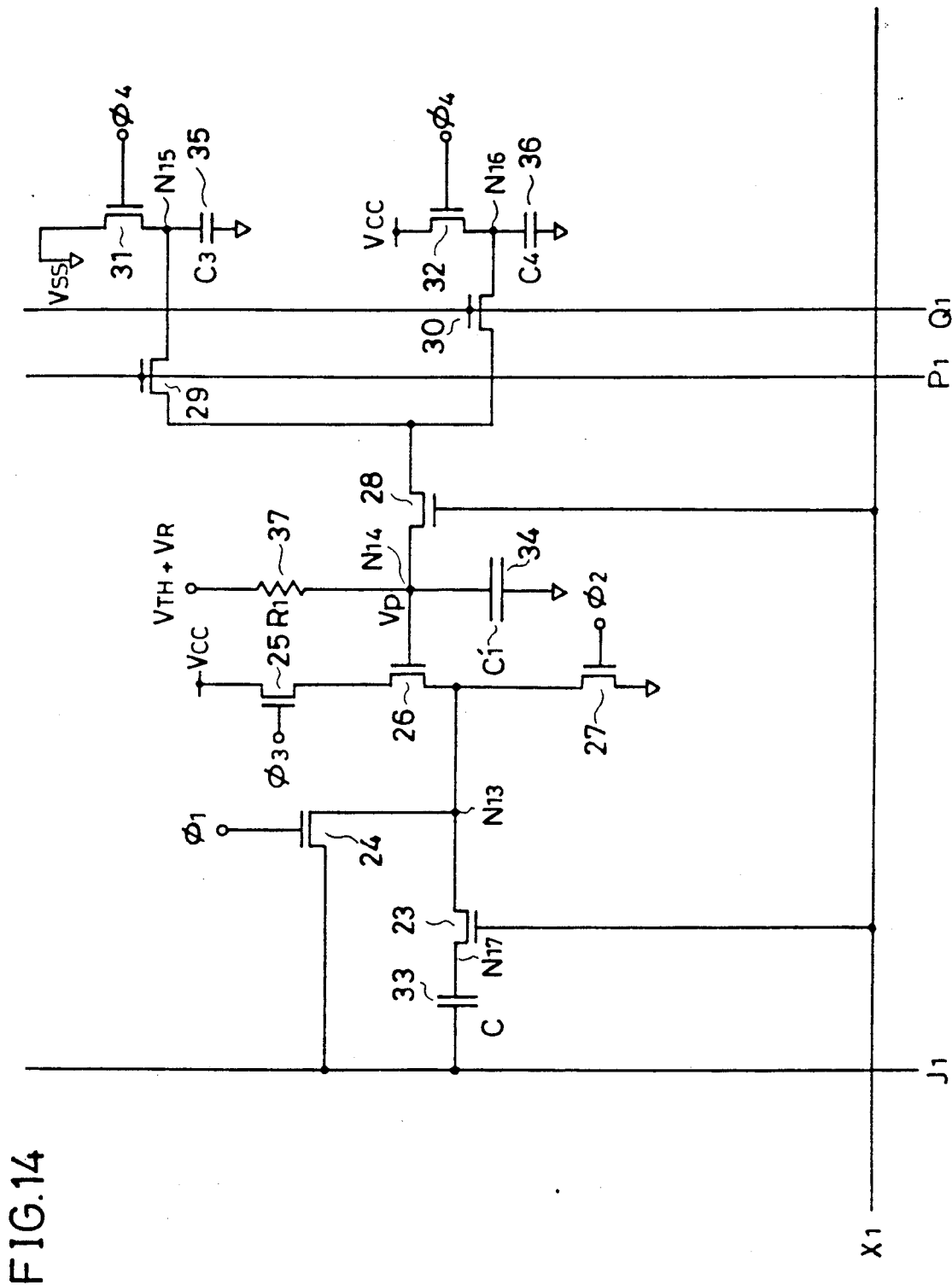
FIG. 14 represents the structure of a coupling element in a neural network according to another embodiment of the present invention.

Referring to FIG. 14, a coupling element according to another embodiment of the present invention includes capacitors 35 and 36 for storing information as to a degree of coupling, and n-FETs 31 and 32 for charging or discharging the capacitors 35 and 36. The capacitor 35 has a first electrode connected to a node N15, and a second electrode connected to a ground potential $V_{SS}$. The capacitor 36 has a first electrode connected to a node N16, and a second electrode connected to the ground potential $V_{SS}$. The n-FET 31 enters an on state in response to a control signal $\phi_4$, to connect the node N15 to the ground potential $V_{SS}$. The n-FET 32 connects the node N16 to a source potential $V_{CC}$ in response to the control signal $\phi_4$.

A resistor 37, a capacitor 34 and n-FETs 28, 29 and 30 are provided in order to give potentials indicative of the degree of coupling in accordance with the coupling degree information. The resistor 37 has a first terminal connected to a predetermined potential $V_{TH}+V_R$, and a second terminal connected to a node N14. The capacitor 34 has a first electrode connected to the node N14, and a second electrode connected to the ground potential $V_{SS}$. The n-FET 28 enters an on state in response to a signal potential on a signal line $X_1$, to connect the node N14 to first electrodes of the n-FETs 29 and 30. The n-FET 29 enters an on state in response to a signal potential on a signal line $P_1$, to connect the node N15 to a first conduction terminal of the n-FET 28. The n-FET 30 enters an on state in response to a signal potential on a signal line $Q_1$, to connect the node N16 to a first conduction terminal of the n-FET 28.

Further, n-FETs 24, 25, 26 and 27 and a capacitor 33 are provided in order to transfer an input signal $X_1$ (signal lines are hereinafer indicated by the same reference numerals as input signals) onto a signal line $J_1$. The n-FET 24 enters an on state in response to a control signal $\phi_1$, to connect the signal line $J_1$ with a node N13. The n-FET 23 enters an on state in response to a signal potential on a signal line $X_1$, to connect a node N17 with the node N13. The n-FET 25 enters an on state in response to a control signal $\phi_3$, to transfer the source potential $V_{CC}$ to the first conduction terminal of the n-FET 26. The n-FET 26 transfers the potential on the node N14 to the node N13 in a source follower manner. The n-FET 27 enters an on state in response to a control signal $\phi_2$, to connect the node N13 to the ground potential $V_{SS}$. The n-FETs 23 to 27 and the capacitor 33 are identical in structure to those shown in FIG. 10, to function similarly to the corresponding parts of the structure shown in FIG. 10.

The reference potential $V_{TH}+V_R$ can be easily generated by connecting high resistance and a diode-connected n-FET (threshold voltage $V_{TH}$) in series between the source potential $V_{CC}$ and a predetermined precharge potential $V_R$, to extract the potential from the connection node of the n-FET and the high resistance.

In the structure of the coupling element shown in FIG. 14, the n-FET 23 enters an on state in response to the signal potential transferred onto the input signal line $X_1$. Assuming that $V_P$ represents the potential of the node N14 and C represents electrostatic capacitance of the capacitor 33, the degree of coupling between the input signal line $X_1$ and the signal line $J_1$ is expressed as follows:

$$C \cdot (V_P - V_{TH} - V_R)$$

The coupling degree information is given by the potential of the node N14, which potential is charged to $V_R+V_{TH}$, and the degree of coupling goes to zero with a time constant $R_1 \cdot C_1'$ provided by the series circuit of the resistor 37 and the capacitor 34. This expresses an "oblivious" state. Therefore, the resistance of the resistor 37 and the electrostatic capacitance of the capacitor 34 are selected to be values expressing the oblivious state after an appropriate time. The coupling degree information is programmed with the following procedure.

The control signal $\phi_4$ is raised up to a high level, thereby to bring the n-FETs 31 and 32 into on states. Then, the capacitor 35 is charged to the ground potential $V_{SS}$, while the capacitor 36 is charged to the source potential $V_{CC}$. Thereafter, both of the potentials at the signal lines $P_1$ and $X_1$ are set at high levels. In this case, the capacitors 34 and 35 are connected in parallel with each other so that charges move from the capacitor 34 to the capacitor 35. Thus, the potential of the node N14 is reduced. Assuming that capacitance of the capacitor 34 is $C_1'$, that of the capacitor 35 is $C_3$ and the initial potential of the node N14 is $V_{TH}+V_R$, the potential $V_P$ given to the node N14 at this time is expressed as follows:

$$V_P = (C_1'/(C_3+C_1')) (V_{TH}+V_R).$$

When signal potentials of the signal line $X_1$ and $Q_1$ are raised up to high levels, on the other hand, the capacitor 34 is connected with the capacitor 36 so that charges move from the capacitor 36, which is charged to the source potential, to the capacitor 34. The reference potential (precharge potential) $V_R$, which is generally lower than the source potential $V_{CC}$, is set at a value $V_{CC}/2$ in general. Thus, the potential of the node N14 is increased. In this case, the following potential $V_P$ appears at the node N14:

$$V_P = \{C_1' \cdot (V_{TH}+V_R) + C_4 \cdot V_{CC}\}/(C_1'+C_4)$$

Thus, a negative degree of coupling is given when the capacitor 34 is connected with the capacitor 35, while a positive degree of coupling is given when the capacitor 34 is connected with the capacitor 36.

Data signals are computed in a process similar to that of the coupling element shown in FIG. 10, such that an input signal is supplied to the signal line $X_1$ and the signal line $J_1$ is precharged to the reference potential $V_R$, while the node N13 is precharged to the precharge potential $V_R$ through the n-FET 24. If the potential on the signal line $X_1$ is at a high level, the n-FET 23 enters an on state and the potential of the node N17 is also precharged to the precharge potential $V_R$.

Then the n-FET 27 is brought into an on state by the control signal $\phi_2$, to discharge the nodes N13 and N17 to the ground potential level. Upon completion of this discharging operation, the n-FET 25 is brought into an on state by the control signal $\phi_3$, and the n-FET 26 transfers a potential $(V_P - V_{TH} - V_R)$ to the nodes N13 and N17, depending on the potential $V_P$ on the node N14. Thus, charges are supplied onto the signal line $J_1$ through the capacitor 33. The potential of the line $J_1$ is increased in response to the charge injection onto the signal line $J_1$ in the case of a positive degree of coupling, while the potential on the signal line $J_1$ is reduced in the case of a negative degree of coupling. The potential of the node N17 is simultaneously precharged in precharging of the signal $J_1$ through the capacitor 33 even if the n-FET 23 is in an off state.

The coupling element shown in FIG. 14 requires no signal lines $X_{1e}$, $X_{1e}$ and R dissimilarly to that shown in FIG. 10, whereby the number of the signal lines can be extremely reduced to easily integrate highly such coupling elements.

In the computation process for the input signal, the n-FET 28 also enters an on state in response to the signal potential on the input signal line $X_1$. Such a conducting state of the n-FET 28 exerts no adverse influence on the computation process (the n-FETs 29 and 30 are in off states during this process). However, the gate of the n-FET 28 may be connected to a signal line R (see FIG. 10) in order to isolate reliably the node N14 from the n-FETs 29 and 30 during the computation process.

In this coupling element, the capacitor 34 is charged to the potential $V_R + V_{TH}$ through the resistor 37 as time elapses in the computation process, whereby the degree 0 of coupling appears to provide the "oblivious" state.

In the aforementioned structure, the control signal $\phi_4$ and the potentials on the signal lines $P_1$ and $Q_1$ are generated by a control signal generation circuit, which is provided in an on-chip or off-chip manner, in correspondence to data to be written (program data). The degree 0 of coupling is programmed by simultaneously setting the signal lines $P_1$ and $Q_1$ at low levels, or high levels when the capacitors 35 and 36 have the same capacitance, in programming.

Signal transfer to the signal line $X_1$ may be performed after the signal line $J_1$ is completely precharged.

In the aforementioned structure of the coupling element shown in FIG. 14, the coupling degree information is held by the capacitors. Another structure may also be available.

Figure 15:
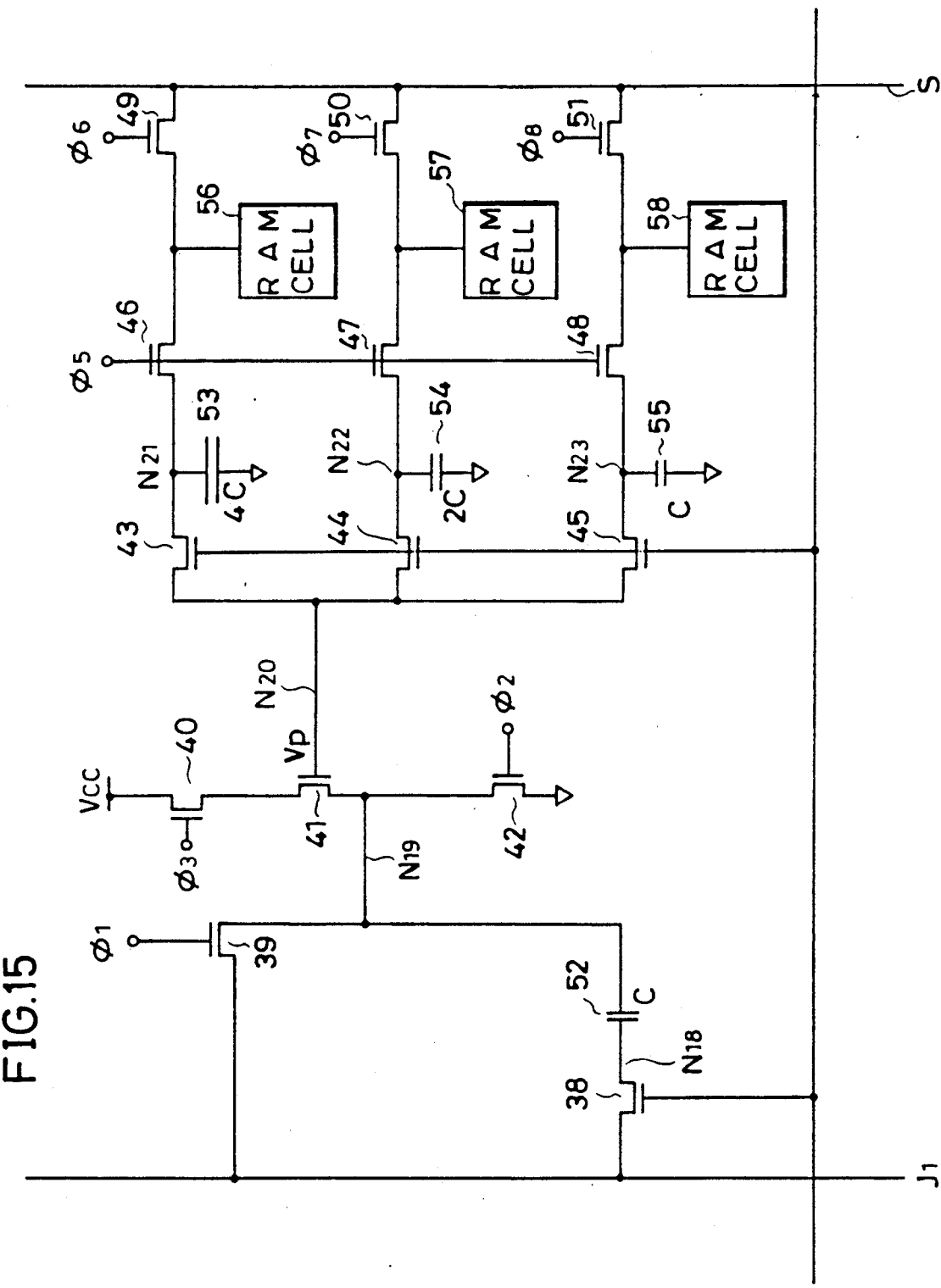
FIG. 15 shows the structure of a coupling element according to still another embodiment of the present invention.

FIG. 15 shows the structure of a coupling element according to still another embodiment of the present invention. Referring to FIG. 15, the coupling element includes capacitors 53, 54 and 55 for storing coupling degree information, and random access memory (RAM) cells 56, 57 and 58 for designating the potentials held at the capacitors 53, 54 and 55. The capacitor 53 is provided between a node N21 and a ground potential $V_{SS}$. The capacitor 54 is provided between a node N22 and the ground potential $V_{SS}$. The capacitor 55 is provided between a node N23 and the ground potential $V_{SS}$. The capacitors 53 54 and 55 are set in the ratio of 5:4:1 in electrostatic capacitance, for example. The capacitors 53 to 55 are coupled to a node N20 through n-FETs 43, 44 and 45, respectively. The n-FETs 43 to 45 enter on states in response to a signal potential on a signal line $X_1$. Further, n-FETs 46, 47 and 48 are provided in order to charge the capacitors 53 to 55 in response to data held in the RAM cells 56 to 58, respectively. The n-FETs 46 to 48 enter on states in response to a control signal $\phi_5$.

In addition, n-FETs 49, 50 and 51 are provided in order to write information into the RAM cells 56 to 58, respectively. The n-FET 49 enters an on state in response to a control signal $\phi_6$, to connect the RAM cell 56 with a program data transfer line S. The n-FET 50 enters an on state in response to a control signal $\phi_7$, to connect the RAM cell 57 with the program data transfer line S. The n-FET 51 enters an on state in response to a control signal $\phi_8$, to connect the RAM cell 58 with the data transfer line S.

The RAM cells 56 to 58 each are formed by a flip-flop type static RAM cell, for example. In this case, the n-FETs 49 to 51 serve as selection gates for the RAM cells 56 to 58 respectively, and hence the control signals $\phi_6$ to $\phi_8$ correspond to word line selection signals in ordinary RAM device.

The coupling degree information is programmed by sequentially activating the control signals $\phi_6$ to $\phi_8$ and transferring write data (program) through the data transfer line S.

A circuit part for coupling an input signal line $X_1$ with a signal line $J_1$ in response to the coupling degree information includes n-FETs 38, 39, 40, 41 and 42 and a capacitor 52. The n-FET 38 enters an on state in response to a signal potential on the signal line $X_1$ to connect the signal line $J_1$ with a node N18. The capacitor 52 capacitively couples the node N18 with a node N19. The n-FET 39 enters an on state in response to the control signal $\phi_1$, to connect the signal line $J_1$ with the node N19. The n-FET 40 enters an on state in response to the control signal $\phi_3$, to transfer a source potential $V_{CC}$. The n-FET 41 transfers a potential on a node N21 onto the node N19 in a source follower. The n-FET 42 enters an on state in response to the control signal $\phi_2$, to discharge the node N19 to the ground potential $V_{SS}$ level. In this circuit part for coupling, the capacitor 52 is connected to the signal line $J_1$ through the n-FET 38, unlike the aforementioned coupling elements shown in FIGS. 10 and 14.

Description is now made on operation for writing the coupling degree programming information. First, the control signals $\phi_6$ to $\phi_8$ are sequentially activated to transfer associated data onto the signal line S, thereby to write coupling degree data in the RAM cells 56 to 58 through the n-FETs 49 to 51, respectively. A circuit (not shown) for such programming may be structured similar to a data write circuit in an ordinary RAM device. After the coupling degree data are written in the RAM cells 56 to 58 respectively, the control signal $\phi_5$ is activated to bring the n-FETs 46 to 48 into on states. Thus, the capacitors 53 to 55 are charged to the operating source potential $V_{CC}$ level in response to the coupling degree data stored in the associated RAM cells 56 to 58 respectively. Thereafter, the signal potential on the signal line $X_1$ is raised up to a high level, whereby the capacitors 53 to 55 are connected in parallel with each other so that the charging potential thereof, i.e., a potential $V_P$ of the node N20 corresponds to the coupling degree information.

Assuming that the RAM cells 56 to 58 hold coupling degree data $V_1$, $V_2$ and $V_3$, respectively, and the capacitors 53 to 55 have capacitance values 4C, 2C and C while the capacitor 53 has capacitance C, the potential $V_P$ at the node N20 is expressed as follows:

$$(4V_1 + 2V_2 + V_3) \cdot V_{CC}/7$$

A computation process for the data signals is similar to those in the coupling elements shown in FIGS. 10 and 14. That is, the signal line $J_1$ and the node N19 are precharged in response to the control signal $\phi_1$, and the node N19 is discharged to the ground potential. Thereafter, the n-FET 41 operates in a source follower, to increase the potential of the node N19. When the signal potential on the input signal line $X_1$ is a high level, charges are injected or extracted onto or from the signal line $J_1$ through the capacitor 52, and the input signal is converted in accordance with the following degree of coupling:

$$C \cdot (V_P - V_{TH} - V_R)$$

and transferred onto the signal line $J_1$. In the structure shown in FIG. 15, the potential $V_P$ on the node N20 can be arbitrarily set at a desired value through the coupling degree data written in the RAM cells 56, 57 and 58.

Although the RAM cells are employed for storing the coupling degree data, such structure may be replaced by any latch circuit to attain an effect similar to that of the above embodiment, inso-far-as that circuit have data latch function.

Further, although the capacitors are employed for storing the coupling degree data in the aforementioned structure, it is also possible to use generally known dynamic random access memory (DRAM) cells utilizing charge holding function of capacitors.

Figure 16:
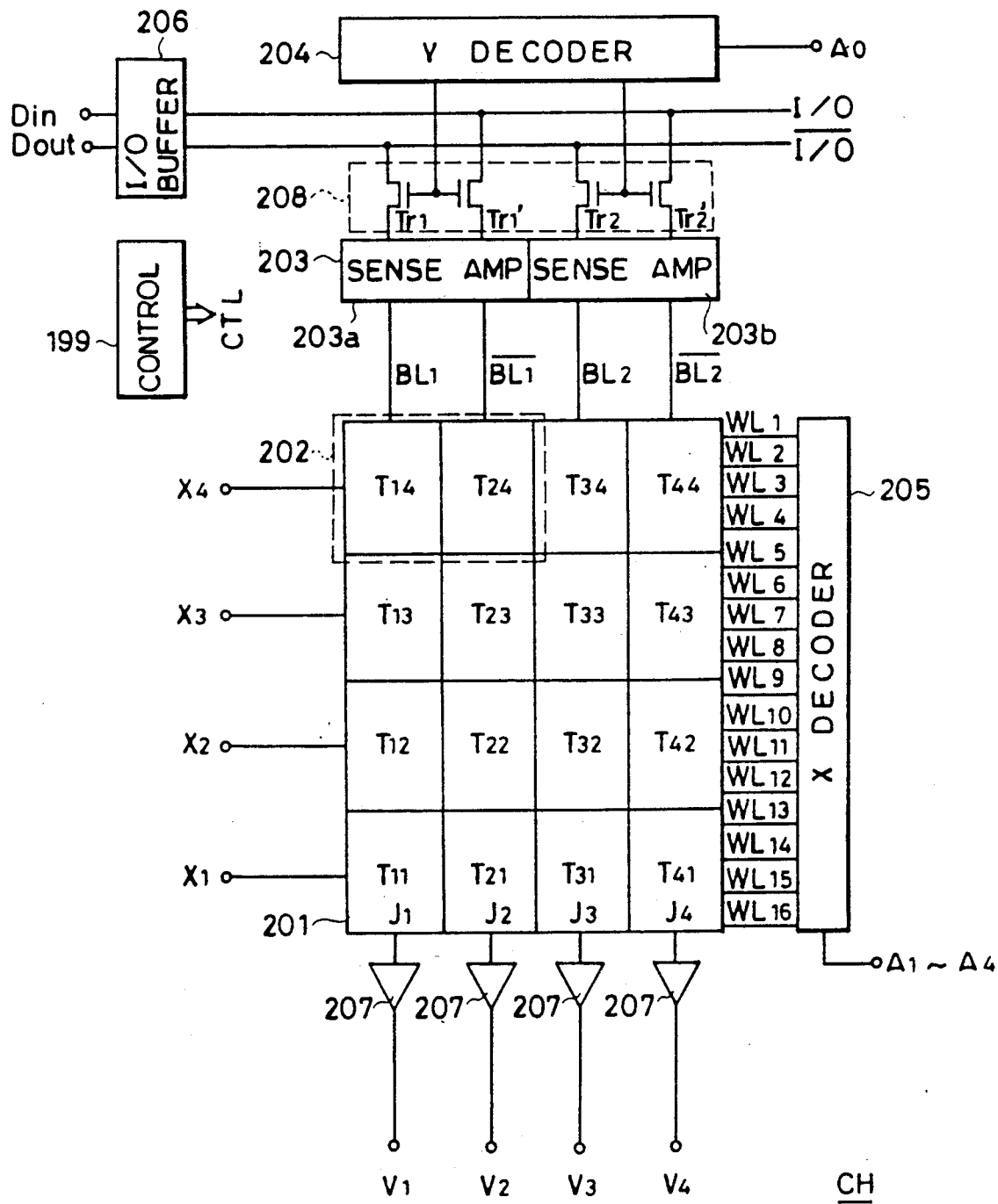
FIG. 16 schematically shows overall structure of a semiconductor neural network according to a further embodiment of the present invention.

FIG. 16 illustrates overall structure of a semiconductor neural network according to a further embodiment of the present invention. Referring to FIG. 16, the semiconductor neural network according to the embodiment of the present invention includes a connection matrix 201 which is formed by a four-by-four matrix of coupling elements $T_{11}$ to $T_{44}$. It also includes a data input/output circuit 206, a Y decoder 204, an X decoder 205, an I/O gate 208 and a sense amplifier 203 for writing desired coupling degree information in each coupling element $T_{ij}$ of the connection matrix 201. The Y decoder 204, the data input/output circuit 206, the I/O gate 208, the sense amplifier 203 and the X decoder 205 are similar in structure and operation to those of generally known DRAM, one example of which is disclosed in U.S. Pat. No. 4,533,843, for example.

The Y decoder 204 decodes an externally supplied address signal $A_0$, to select two columns of the connection matrix 201. The X decoder 205 decodes externally supplied address signals $A_1$ to $A_4$, to select one of word lines $WL_1$ to $WL_{16}$.

The I/O gate 208 includes two pairs of transistors. One of the transistor pairs is formed by n-FETs $Tr_1$ and $Tr_1'$, and another transistor pair is formed by n-FETs $Tr_2$ and $Tr_2'$. The transistor pairs enter on states in response to the output of the Y decoder 204, to connect corresponding bit lines BL and $\overline{BL}$ to data input/output lines I/O and $\overline{I/}$, respectively.

The sense amplifier 203 includes sense amplifiers 203a and 203b which are provided in correspondence to the transistor pairs. The sense amplifier 203a differentially amplifies potentials on bit lines $BL_1$ and $\overline{BL_1}$. The sense amplifier 203b differentially amplifies potentials on bit lines $BL_2$ and $\overline{BL_2}$. The sense amplifiers 203a and 203b are formed by cross-coupled flip-flop differential amplifiers, exemplary specific structure of which is disclosed in U.S. Pat. No. 4,045,783, for example.

The bit line $BL_1$ is connected with coupling elements $T_{1j}$ on the first column of the connection matrix 201. The bit line $\overline{BL_1}$ is connected with coupling elements $T_{2j}$ on the second column of the connection matrix 201. The bit line $BL_2$ is connected with coupling elements $T_{3j}$ on the third column of the connection matrix 201. The bit line $\overline{BL_2}$ is connected with coupling elements $T_{4j}$ on the fourth column of the connection matrix 201.

In order to input and output data in a computation process, provided are signal lines $X_1$ to $X_4$ (signal lines are indicated by the same reference numerals as signals thereon) and amplifiers 207 which amplify signal potentials on signal lines $J_1$ to $J_4$ in predetermined input and output characteristics and output the same. Output signals $V_1$ to $V_4$ are derived from the amplifiers 207, respectively.

In the structure shown in FIG. 16, data can be read and written and refreshed by an on-chip or off-chip control circuit 199 similarly to ordinary DRAM, as shown in U.S. Pat. No. 4,533,843, for example.

Figure 17:
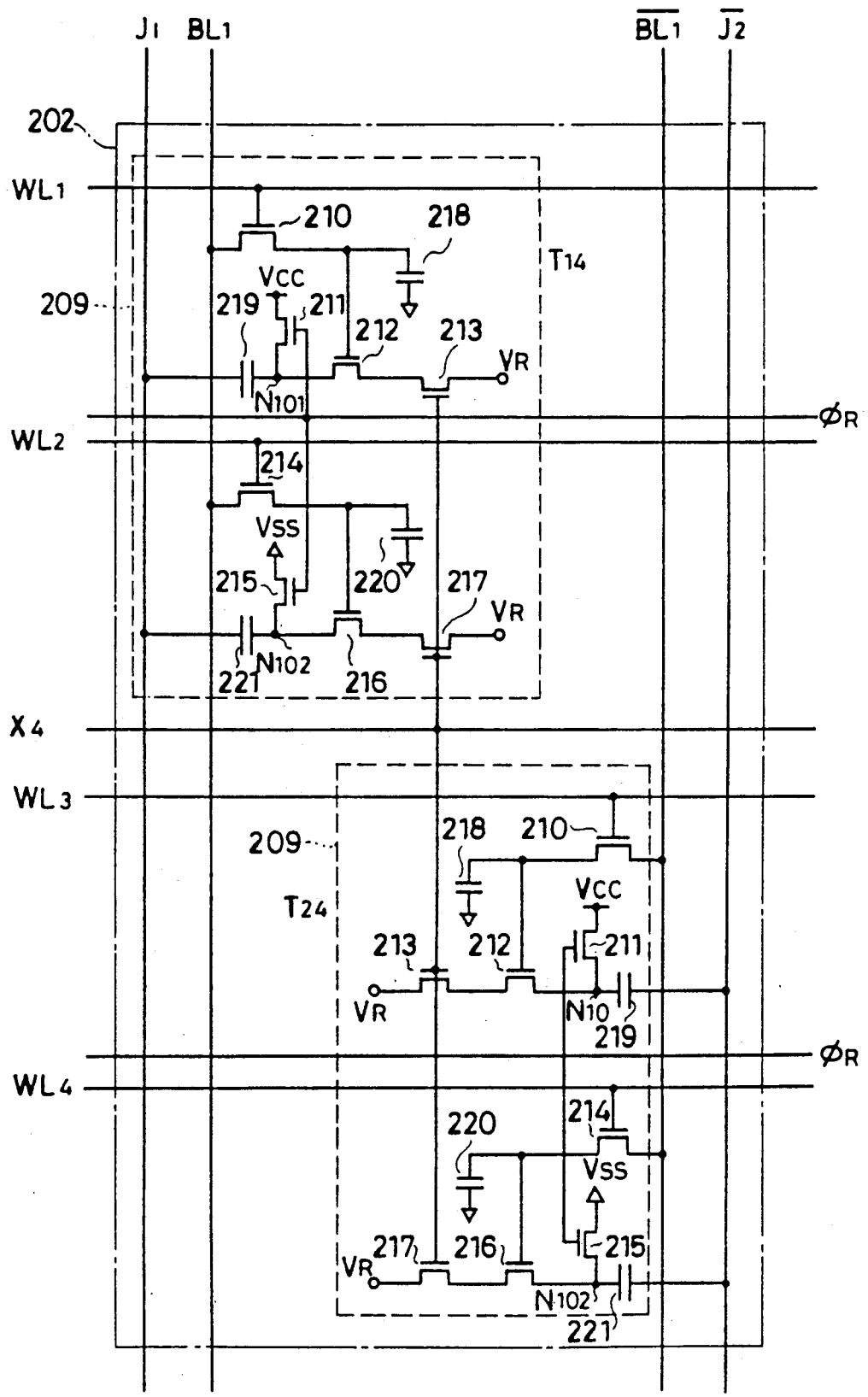
FIG. 17 shows the structure of coupling elements shown in FIG. 16.

FIG. 17 shows specific structure of a circuit part 202 which includes two particular coupling elements in the connection matrix 201.

Referring to FIG. 17, a circuit 209 expressing a coupling element $T_{14}$ includes capacitors 218 and 220 for storing coupling degree information, and n-FETs 210 and 214 serving as transfer gates for writing data in the capacitors 218 and 220, respectively. The n-FET 210 has a gate connected to a word line $WL_1$, a source connected to a bit line $BL_1$, and a drain connected to a first electrode of the capacitor 218. A second electrode of the capacitor 218 is connected to a predetermined potential such as ground potential $V_{SS}$.

The n-FET 214 has a gate connected to a word line $WL_2$, a source connected to the bit line $BL_1$ and a drain connected to a first electrode of the capacitor 220. A second electrode of the capacitor 220 is connected to the ground potential $V_{SS}$.

Capacitors 219, 211, 212 and 213 are provided in order to transform an input signal with a degree of coupling responsive to the information stored in the capacitors 218 and 220 and transfer the same onto a signal line $J_1$. The capacitor 219 capacitively couples the signal line $J_1$ with a node N101. The n-FET 211 enters an on state in response to a reset signal $\phi_R$, to precharge the node N101 to a source potential $V_{CC}$ level. The n-FET 212 enters an on state in response to a potential held at the capacitor 218, to connect the node N101 to a first conduction terminal of the n-FET 213. The n-FET 213 enters an on state in response to a signal potential on a signal line $X_4$, to connect a predetermined reference potential (precharge potential) $V_R$ to a first conduction terminal of the n-FET 212. Thus, the node N101 is coupled to the reference potential $V_R$ only when both of the n-FETs 212 and 213 enter on states.

A circuit part for transform an input signal $X_4$ in response to the coupling degree information stored in the capacitor 220 and transferring the same onto the signal line $J_1$ includes a capacitor 221 and n-FETs 215, 216 and 217. The capacitor 221 capacitively couples the signal line $J_1$ with a node N102. The n-FET 215 enters an on state in response to the reset signal $\phi_R$, to precharge the node N102 to the ground potential $V_{SS}$ level. The n-FET 216 enters an on state in response to the potential held at the capacitor 220, to connect the node N102 to a first conduction terminal of the n-FET 217.

The n-FET 217 enters an on state in response to the potential on the signal line $X_4$, to connect the reference potential $V_R$ to a first conduction terminal of the n-FET 216. Thus the node N102 is coupled to the reference potential $V_R$ only when the n-FETs 216 and 217 simultaneously enter on states.

A circuit 209 expressing a coupling element $T_{24}$ is similar in structure to the circuit 209 expressing the coupling element $T_{14}$ except that a signal line $J_2$ is employed as an output signal line and a complementary bit line $BL_1$ is employed as a data write signal line. Description is now made on operation for storing the coupling degree information.

This operation is similar to that in an ordinary DRAM. The X decoder 205 selects a word line $WL_i$ and then the sense amplifier 203 is activated. Thereafter, the Y decoder 204 selectively opens the I/O gate 208, to transfer data from the data input/output circuit 206 onto corresponding bit lines BL and $\overline{BL}$. Thus, desired information is written in capacitors through n-FETs serving as transfer gates which are in turn connected to the selected word line. Information indicating a desired degree of coupling can be written in each coupling element by sequentially selecting word lines $WL_i$ and writing the data. The operation of the coupling element is now described.

In the computation process, the bit lines BL and $\overline{BL}$ are held at a predetermined potential such as $V_R$. First, the reset signal $\phi_R$ is raised up to a high level. In response to this, the signal lines $J_1$ and $J_2$ are precharged to the precharge potential $V_R$, while the node N101 is precharged to the source potential $V_{CC}(=2V_R)$ and the node N102 is precharged to the ground potential $V_{SS}$ level. Then the signal lines $J_1$ and $J_2$ are brought into electrically floating states and thereafter the signal is transferred onto the signal line $X_4$. Consider that the capacitor 218 stores information "1" which corresponds to a high-level potential, and the capacitor 220 stores information 37 0" which corresponds to the ground potential $V_{SS}$ level.

When the potential on the data input signal line $X_4$ goes high, the n-FETs 213 and 217 enter on states, whereby the potential of the node N101 is discharged from a first precharge potential $V_{CC}(=2\cdot V_R)$ to a second precharge potential $V_R$. Thus, charges of $C\cdot V_R$ are extracted from the output signal line $J_1$ assuming that C represents the electrostatic capacitance of the capacitor 219. Therefore, the potential of the output signal line $J_1$ is reduced by:

$$V_R \cdot C/C_s,$$

assuming that $C_s$ represents parasitic capacitance of the output signal line $J_1$. Thus, a negative degree of coupling is implemented.

Now consider that "0" is written in the capacitor 218 and "1" is written in the capacitor 220. In this case, the n-FET 212 is in an off state and the n-FET 216 is in an on state. Therefore, when the potential on the data input signal line $X_4$ rises to a high level, the potential of the node N102 is charged from the ground potential level $V_{SS}$ to the precharge potential $V_R$, and charges of $C\cdot V_R$ are injected onto the output signal line $J_1$ through the capacitor 221. Thus, the potential of the output signal line $J_1$ is increased by:

$$V_R \cdot C/C_s$$

Both of the capacitors 219 and 221 have capacitance C. Thus, a positive degree of coupling is implemented.

When "0" is written in both of the capacitors 218 and 220, both of the n-FETs 212 and 216 are in off states, and no charge movement is caused through the capacitors 219 and 221. Thus, a degree 0 of coupling is implemented.

The data transferred onto the data output line $J_1$ is amplified by the amplifier 207 and outputted as output data $V_1$.

Similar movement of charges is also caused in the coupling element $T_{24}$, to be transferred onto the data output line $J_2$.

Also in the structure shown in FIG. 17, no steady-state current is developed since output signal lines $J_i$ are coupled with data input lines $X_j$ through capacitors, whereby power consumption can be reduced. Further, coupling elements of small areas can be obtained by utilizing capacitors for storing coupling degree data.

In the aforementioned operation, the data output lines $J_i$ are precharged only when the reset signal $\phi_R$ is in an active state and the same are brought into electrically floating states when the reset signal $\phi_R$ enters an inactive state. This can be considered similar to operation for precharging bit lines in an ordinary DRAM.

Figure 18:
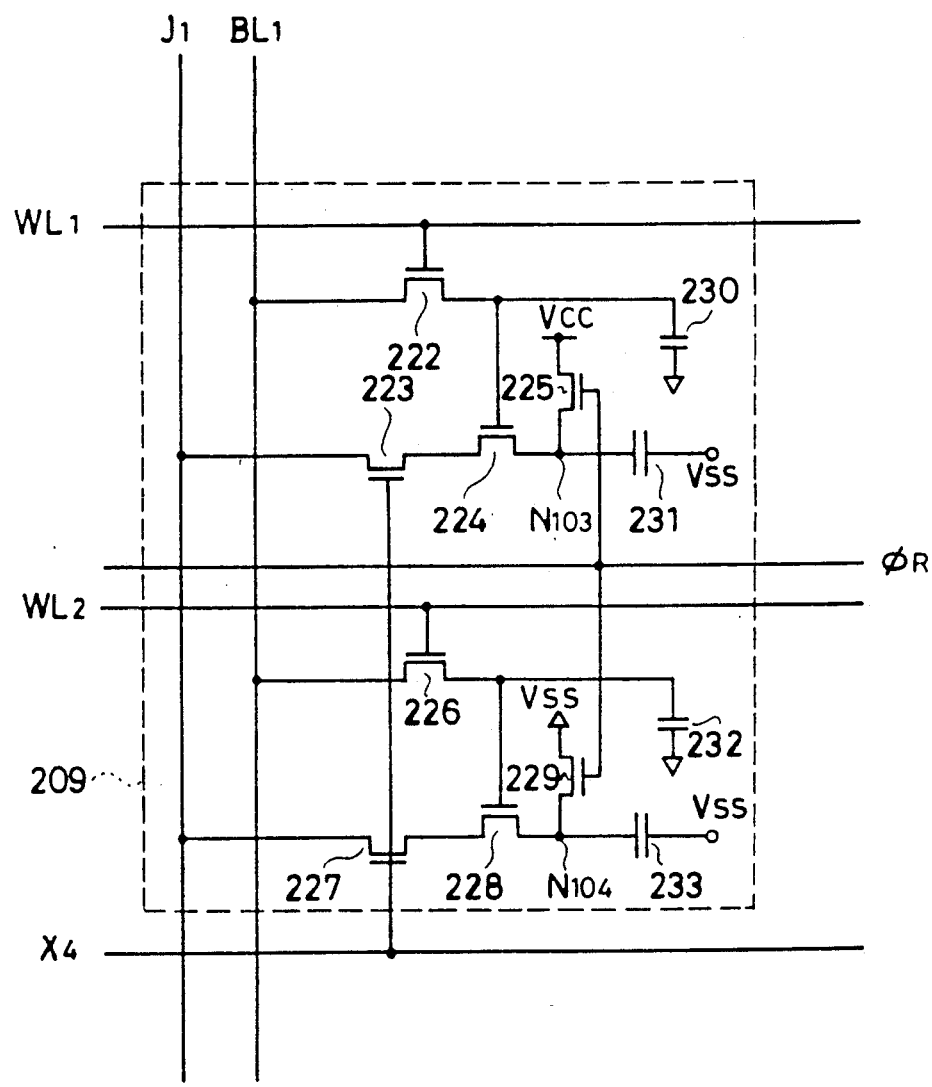
FIG. 18 shows a modification of the coupling element in the neural network shown in FIG. 16.

FIG. 18 shows the structure of a coupling element according to a further embodiment of the present invention. Referring to FIG. 18, a coupling element expressed by circuit 209 includes capacitors 230 and 232 for storing coupling degree data, and n-FETs 222 and 226 serving as transfer gates for writing desired data in the capacitors 230 and 232, respectively. The n-FET 222 serving as a transfer gate and the capacitor 230 as well as the n-FET 226 and the capacitor 232 are similar in structure to ordinary DRAM cells, and data can be written and refreshed similarly to an ordinary DRAM.

In order to couple a data input line $X_4$ with a data output line $J_1$ along the data stored in the capacitor 230, provided are n-FETs 223, 224 and 225 and a capacitor 231. The n-FET 223 enters an on state in response to a potential on the data input line $X_4$, to connect a first electrode of the n-FET 224 to the data output line $J_1$. The n-FET 224 enters an on state in response to the information stored in the capacitor 230, to connect the capacitor 231 to a second conduction terminal of the n-FET 223. The n-FET 225 enters an on state in response to a reset signal $\phi_R$, to charge a node N103 to a source potential $V_{CC}$ level. The capacitor 231 has a first electrode connected to a node N103, and a second electrode connected to a ground potential $V_{SS}$.

In order to couple the data input line $X_4$ with the data output line $J_1$ in response to the information stored in the capacitor 232, provided are n-FETs 227, 228 and 229 and a capacitor 233. The n-FET 227 enters an on state in response to the potential on the data input line $X_4$. The n-FET 228 enters an on state in response to the information stored in the capacitor 232. A first electrode of the capacitor 233 is connected to the data output line $J_1$ when both of the n-FETs 227 and 228 enter on states. The n-FET 229 enters an on state in response to the reset signal $\phi_R$, to discharge a node N104 to the ground potential $V_{SS}$ level. The operation is now briefly described.

First, the reset signal $\phi_R$ is activated and the data output signal line $J_1$ is precharged to a predetermined precharge potential $V_R$. At the same time, both of the n-FETs 225 and 229 enter on states, thereby to discharge the nodes N103 and N104 to the source potential $V_{cc}$ level and the ground potential $V_{SS}$ level, respectively. The capacitors 231 and 233 store the charge levels of the nodes N103 and N104.

After the precharging operation is completed, if data of "1" is transferred onto the data input line $X_4$, the potential thereof goes high so that the n-FET 223 and 227 enter on states.

When "1" is written in the capacitor 230 and "0" is written in the capacitor 232, the n-FET 224 is in an on state and the n-FET 228 is in an off state. Therefore, when the potential of the data input line $X_4$ rises to a high level, the node N103 is connected to the data output line $J_1$, the potential of which is increased by the charging from the capacitor 231. Thus, a positive degree of coupling is implemented.

When "0" is written in the capacitor 230 and "1" is written in the capacitor 232, on the other hand, the node N104 is connected to the data output line $J_1$, so that charges flow into the capacitor 233 from the data output line $J_1$, the potential of which is reduced. Thus, a negative degree of coupling is implemented.

When "0" is written in both of the capacitors 230 and 232, the nodes N103 and N104 are not connected to the data output line $J_1$, whereby a degree 0 of coupling is implemented.

In the structure shown in FIG. 18, the potential on the data output line $J_1$ is controlled not through capacitive coupling but by the charging or discharging of the capacitors 231 and 233. In this case, low power consumption can be implemented since no standby-state current flows. In addition, a coupling element of a small area can be obtained since capacitors are employed for storing the degree of coupling.

In the embodiments shown in FIGS. 17 and 18, the bit lines BL ($\overline{BL}$) and the data output lines $J_i$ are separately provided. However, the number of such signal lines is preferably reduced to the minimum, in order to reduce the chip area.

Figure 19:
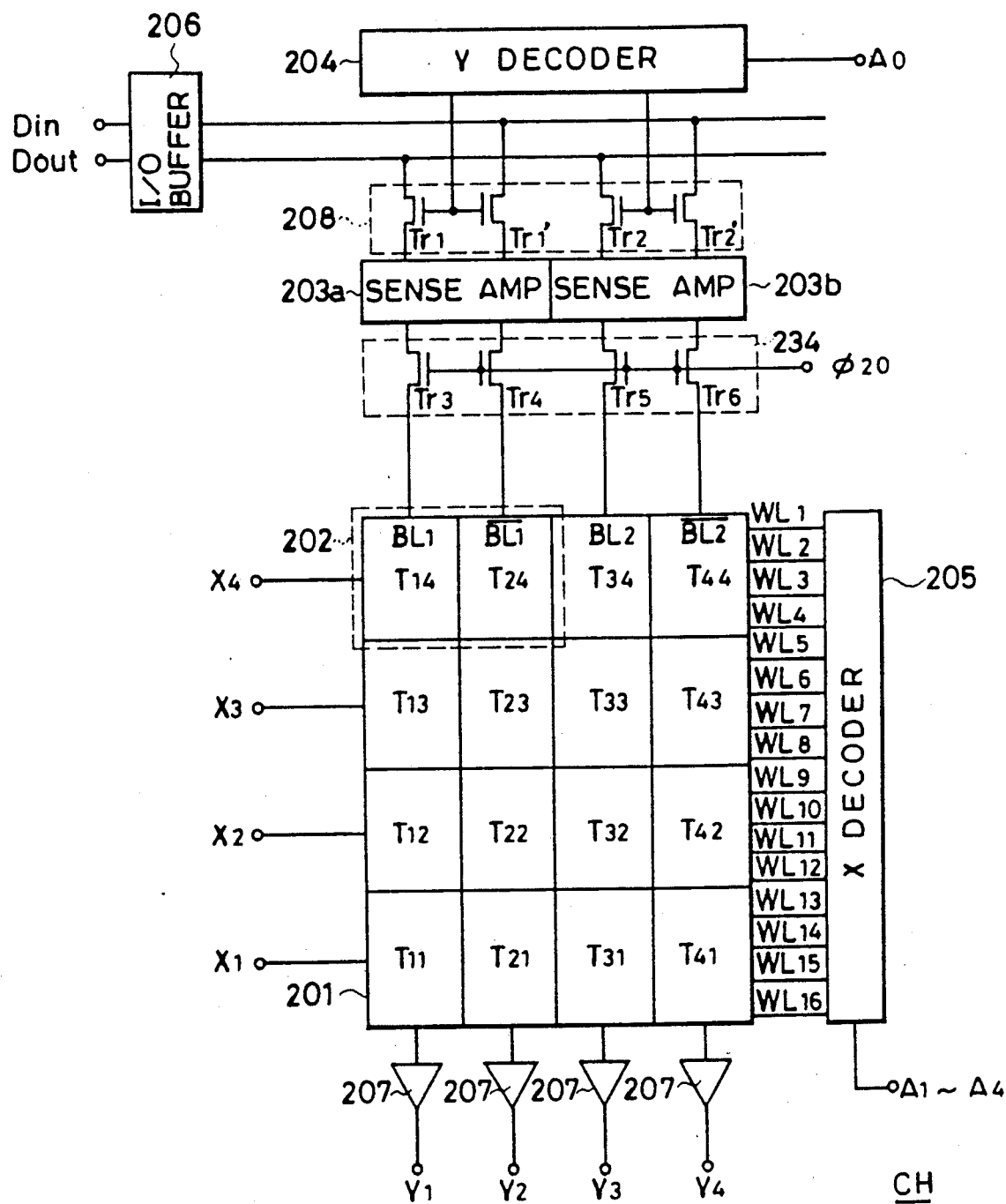
FIG. 19 schematically shows overall structure of a neural network according to a further embodiment of the present invention.

FIG. 19 shows structure for reducing the number of signal lines. In the structure shown in FIG. 19, a separation transistor group 234, each transistor of which enters an on state in response to a control signal $\phi_{20}$, is provided between sense amplifiers 203a and 203b and a connection matrix 201. Bit lines $BL_1$, $\overline{BL_1}$, $BL_2$ and $\overline{BL_2}$ also serve as data output lines, as hereinafter described in detail. The transistor group 234 includes n-FETs $Tr_3$, $Tr_4$, $Tr_5$ and $Tr_6$. The n-FET $Tr_3$ connects the bit line $BL_1$ with the sense amplifier 203a. The n-FET $Tr_4$ connects the bit line $\overline{BL_1}$ with the sense amplifier 203a. The n-FETs $Tr_5$ and $Tr_6$ connect the bit lines $BL_2$ and $\overline{BL_2}$ with the sense amplifier 203b, respectively. Other peripheral circuits are substantially similar in structure to those shown in FIG. 16.

Figure 20:
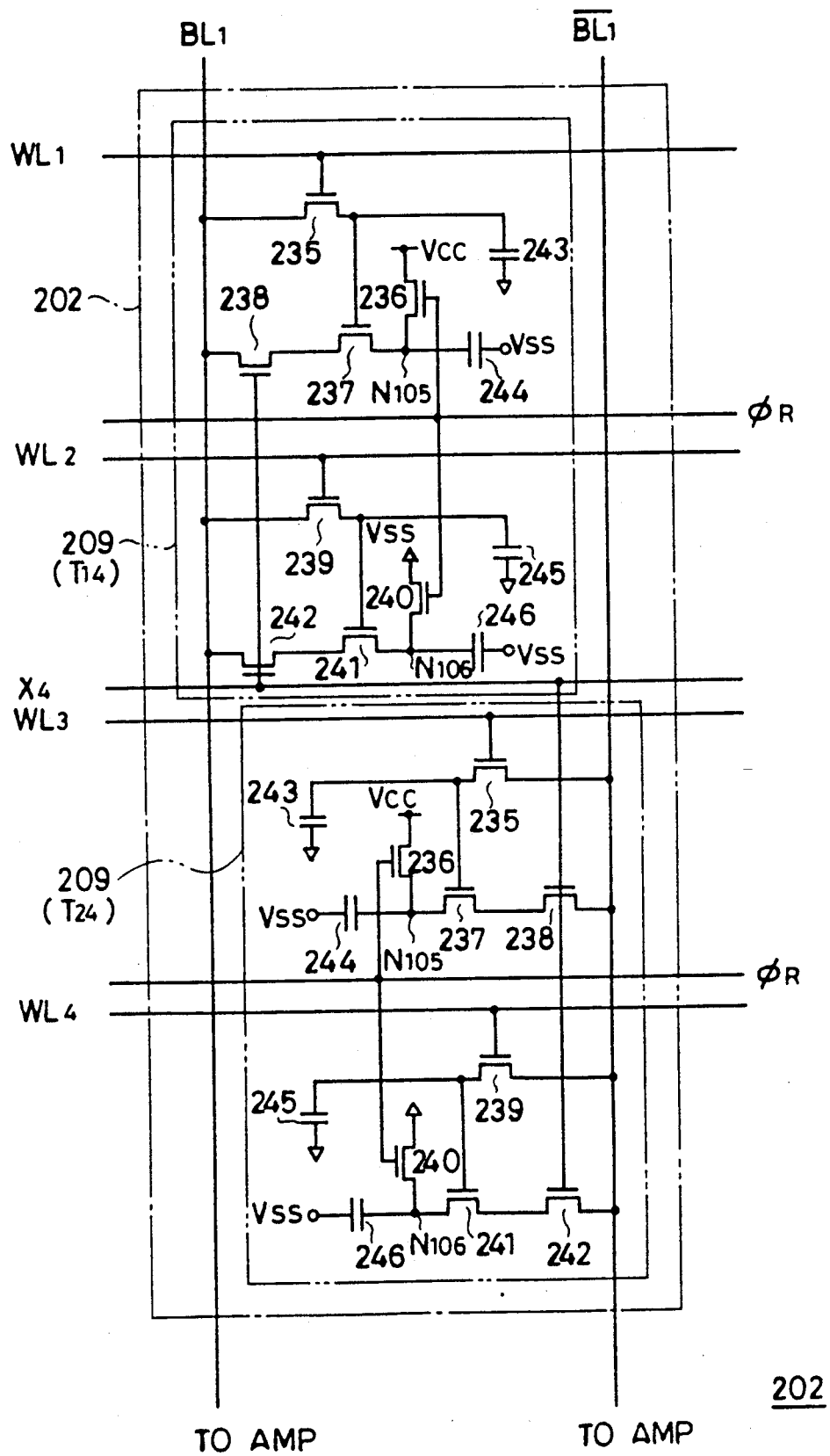
FIG. 20 shows the structure of a coupling element in the neural network shown in FIG. 19.

FIG. 20 shows exemplary structure of an element block 202, which is enclosed by broken lines in FIG. 19. Referring to FIG. 20, a coupling element 209 expressing a synapse load (degree of coupling) $T_{14}$ (coupling elements and synapse loads given by the coupling elements are hereinafter indicated by the same reference numerals) includes capacitors 243 and 245 storing the degree of coupling, and n-FETs 235 and 239 serving as transfer gates for writing data in the capacitors 243 and 245.

In order to couple an input signal line $X_4$ with the bit line $BL_1$, provided are n-FETs 236, 237, 238, 240, 241 and 242 and capacitors 244 and 246. The n-FETs 236 and 240 each enter on states in response to a reset signal $\phi_R$, to charge or discharge nodes N105 and N106 to a source potential $V_{CC}$ level or a ground potential $V_{SS}$ level. Thus, the capacitors 244 and 246 store desired charges. Second electrodes of the capacitors 244 and 246 are connected to receive the ground potential $V_{SS}$ level.

The n-FETs 237 and 241 enter on states in response to data stored in the capacitors 243 and 245, respectively. The n-FETs 238 and 242 enter on states in response to the potential on the data input signal line $X_4$, to connect the bit line $BL_1$ to the nodes N105 and N106 through the n-FETs 237 and 241, respectively.

As understood from the structure shown in FIG. 20, the bit lines $BL_1$ and $\overline{BL_1}$ also serve as data output lines $J_1$ and $J_2$, respectively. The operation is now briefly described.

As to the capacitors 243 and 245, their holding potentials can be written and read and refreshed similarly to an ordinary DRAM, by bringing the transistors of the group 234 shown in FIG. 19 into an on state in response to a control signal $\phi_{20}$. Respective amplifiers 207 are inactivated in operation for writing and reading and refreshing the data since loads on the bit lines BL ($\overline{BL}$) are increased if the amplifiers 207 is made operable to output data, and therefore the amplifiers 207 have their inputs brought into high impedance states.

In order to drive the semiconductor device as a neural network after the coupling degree information is written in the capacitors 243 and 245, the control signal $\phi_{20}$ is brought into an inactive state (low level), and the transistors $Tr_3$ to $Tr_6$ included in the transistor group 234 are brought into off states. Thus, the sense amplifiers 203a and 203b are separated from the connection matrix 201.

At a time $t_1$ shown in FIG. 21, the reset signal $\phi_R$ is raised up to a high level. In response to the reset signal $\phi_R$, the bit lines $BL_1$ and $\overline{BL_1}$ are precharged to a predetermined precharge potential $V_R$ (level of $V_{CC}/2$), and the nodes N105 and N106 are precharged to the source potential $V_{CC}$ level and the ground potential $V_{SS}$ level, respectively.

At a time $t_2$, the reset signal $\phi_R$ is changed to an inactive state (low level). Thus, the bit lines $BL_1$ and $\overline{BL_1}$ and the nodes N105 and N106 are brought into electrically floating states.

At a time $t_3$, the potential on the data input signal line $X_4$ rises to a high level, whereby on the bit lines $BL_1$ and $\overline{BL_1}$ is developed the potential changes which are responsive to the degree of coupling defined by the data stored in the capacitors 243 and 245, similarly to the structure shown in FIG. 18. That is, the potential of the bit line $BL_1$ ($\overline{BL_1}$) is increased when the capacitor 243 stores "1" and the capacitor 245 stores "0", and the potential of the bit line $BL_1$ ($\overline{BL_1}$) is reduced when the capacitor 243 stores "0" and the capacitor 245 stores "1", while the potential of the bit line $BL_1$ ($\overline{BL_1}$) remains unchanged when both of the capacitors 243 and 245 store "0". Thus, positive and negative degrees and a degree 0 of coupling are implemented.

The operation waveform diagram shown in FIG. 21 expresses not only the operation of the circuit shown in FIG. 20, but operation timing of the circuits shown in FIGS. 17 and 18.

FIG. 22 shows a modification of the coupling element shown in FIG. 20. In this modification, potential change is caused on a bit line $BL_1$ through function of capacitive coupling by capacitors 256 and 258. Referring to FIG. 22, this coupling element includes capacitors 255 and 257 for storing a degree of coupling, n-FETs 247 and 251 serving as transfer gates for writing desired data in the capacitors 255 and 257, and the capacitors 256 and 258 and n-FETs 248, 249, 250, 252, 253 and 254 for coupling an input signal line $X_4$ with the bit line (data transfer line) $BL_1$ in response to coupling degree data stored in the capacitors 255 and 257.

The n-FETs 248 and 252 enter on states in response to a reset signal $\phi_R$, to charge and discharge nodes N107 and N108 to a source potential $V_{CC}$ level and a ground potential $V_{SS}$ level, respectively. The n-FETs 249 and 253 enter on or off states in response to data stored in the capacitors 256 and 257, respectively. The n-FETs 250 and 254 enter on states in response to a potential on the data input signal line $X_4$, to transfer a predetermined precharge potential $V_R$ to the nodes N107 and N108 through the n-FETs 249 and 253, respectively. The operation is now briefly described.

Desired data are written in the capacitors 255 and 257 similarly to an ordinary DRAM, as hereinabove described. That is, the data are written by bringing the transistor group 234 into a conducting state by raising up a control signal $\phi_{20}$ to a high level. In this case, an amplifier 207 is inactivated in order to bring input impedance thereof into a high impedance state in data writing, as hereinabove described.

In order to drive this device as a neural network, transistors $Tr_3$ to $Tr_6$ included in the transistor group 234 are brought into off states to isolate sense amplifiers 203a and 203b from a connection matrix 201.

Then, the reset signal $\phi_R$ is raised up to a high level and the bit line $BL_1$ ($\overline{BL_1}$) is precharged to the precharge potential $V_R$ by a precharging circuit (not shown) which is similar to that provided in an ordinary DRAM, while the nodes N107 and N108 are precharged to the source potential $V_{CC}$ level and the ground potential $V_{SS}$ level through the n-FETs 248 and 252, respectively.

After the precharging operation is completed, data are transferred onto the input signal line $X_4$. If the signal potential on the input signal line $X_4$ rises to a high level, the n-FETs 250 and 254 enter on states. Similarly to the structure shown in FIG. 17 the potential of the bit line $BL_1$ ($\overline{BL_1}$) is reduced when the capacitor 255 stores data "1" and the capacitor 257 stores data "0" while the potential of the bit line $BL_1$ ($\overline{BL_1}$) is increased when the capacitor 255 stores data "0" and the capacitor 257 stores data "1". Further, the potential of the bit line $BL_1$ ($\overline{BL_1}$) remains unchanged when the capacitor 255 stores data "0" and the capacitor 257 also stores data "0". Thus, positive and negative degrees and a degree 0 of coupling are implemented. The signal potential transferred onto the bit line $BL_1$ ($\overline{BL_1}$) is amplified by the amplifier 207 and outputted as output data $Y_1$ to $Y_4$.

According to this structure, the bit lines can also serve as input signal lines of the amplifiers, whereby the number of wires can be reduced to reduce the chip area.

In the aforementioned structure of the coupling elements employing DRAM cells, the degree of coupling can take three values, i.e., a positive value, zero and a negative value. However, it is also possible to expand arrangement of the DRAM cells to represent the degree of coupling in multiple steps.

Figure 23:
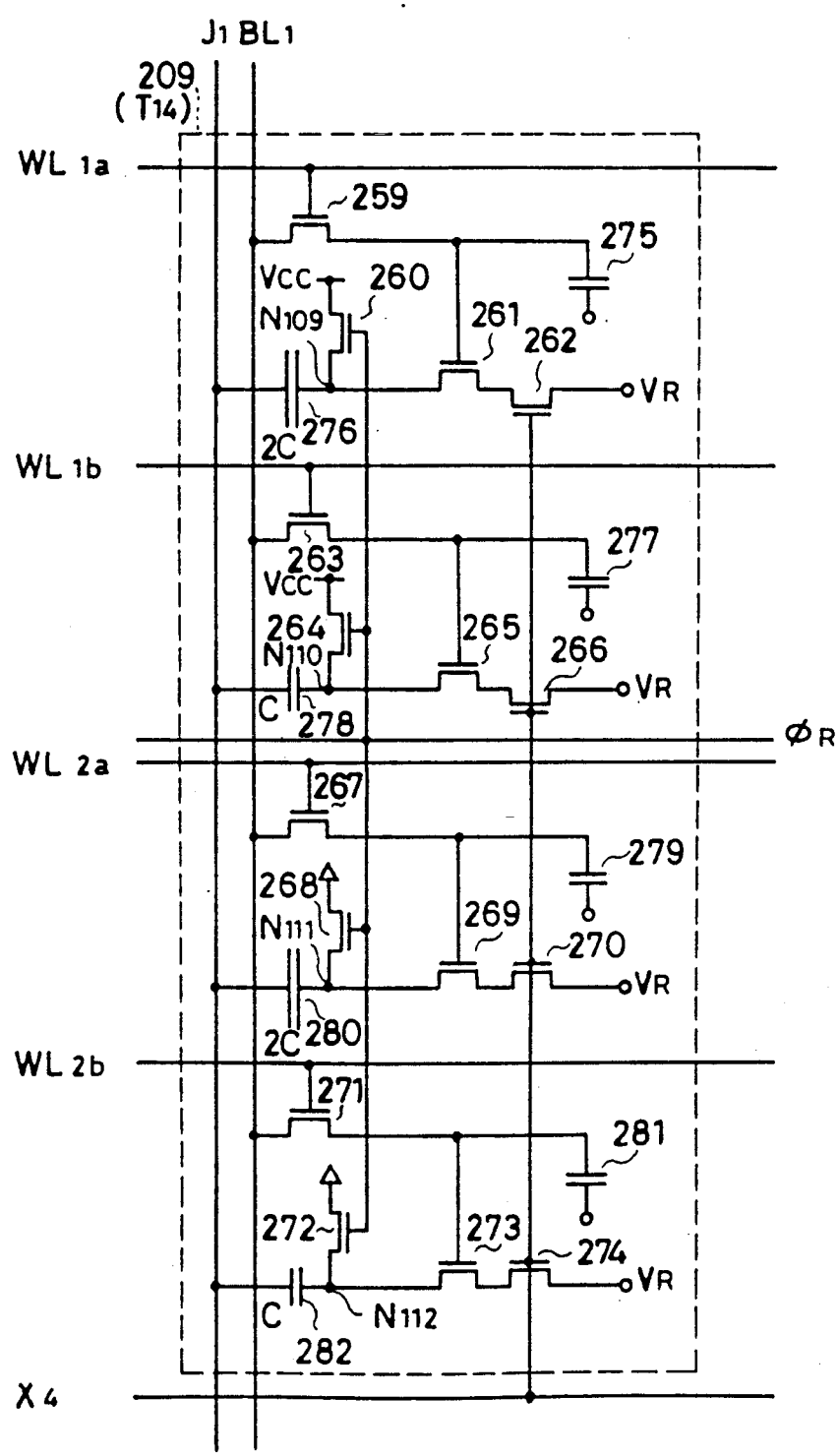
FIG. 23 shows the structure of a coupling element which can express a degree of coupling in a multistage manner.

FIG. 23 shows exemplary structure of a coupling element which can express the degree of coupling in multiple steps. Referring to FIG. 23, a coupling element 209 includes four capacitors 275, 277, 279 and 281 for storing the degree of coupling, and n-FETs 259, 263, 267 and 271 serving as transfer gates for writing desired data in the respective capacitors 275, 277, 279 and 281.

The n-FET 259 enters an on state in response to a signal potential on a word line $WL_{1a}$, to connect the capacitor 275 to a bit line $BL_1$. The n-FET 263 enters an on state in response to a signal potential on a word line $WL_{1b}$, to connect the capacitor 277 to the bit line $BL_1$. The n-FET 267 enters an on state in response to a signal potential on a word line $WL_{2a}$, to connect the capacitor 279 to the bit line $BL_1$. The n-FET 271 enters an on state in response to a signal potential on a word line $WL_{2b}$, to connect the capacitor 281 to the bit line $BL_1$.

A capacitor 276 and n-FETs 260, 261 and 262 are provided in order to provide a degree of coupling which is responsive to data stored in the capacitor 275. The capacitor 276 capacitively couples a signal line $J_1$ with a node N109. The n-FET 260 enters an on state in response to a reset signal $\phi_R$, to charge the node N109 to a source potential $V_{CC}$ level. The n-FET 261 enters an on state in response to information stored in the capacitor 275. The n-FET 262 enters an on state in response to a signal potential on a data input signal line $X_4$. A predetermined potential $V_R$ is transferred to the node N109 when both of the n-FETs 261 and 262 enter on states.

A capacitor 278 and n-FETs 264, 265 and 266 are provided in order to provide a degree of coupling which is responsive to data stored in the capacitor 277. The capacitor 278 capacitively couples a node N100 with a data signal line $J_1$. The n-FET 264 enters an on state in response to the reset signal $\phi_R$, to charge the node 110 to the source potential $V_{CC}$ level. The n-FET 265 enters an on state in response to information stored in the capacitor 277. The n-FET 266 enters an on state in response to the signal potential on the data input line $X_4$. The precharge potential $V_R$ is coupled to the node N110 when both of the n-FETs 265 and 266 enter on states.

A capacitor 280 and n-FETs 268, 269 and 270 are provided in order to implement a degree of coupling which is responsive to information stored in the capacitor 279. The capacitor 280 couples the output signal line $J_1$ with a node N111. The n-FET 268 enters an on state in response to the reset signal $\phi_R$, to charge the node N111 to the ground potential $V_{SS}$ level. The n-FET 269 enters an on state in response to the information stored in the capacitor 279. The n-FET 270 enters an on state in response to the signal potential on the input signal line $X_4$. The reference potential $V_R$ is coupled to the node N111 only when both of the n-FETs 269 and 270 enter on states.

A capacitor 282 and n-FETs 272, 273 and 274 are provided in order to implement a degree of coupling which is responsive to information stored in the capacitor 281. The capacitor 282 capacitively couples the signal line $J_1$ with a node N112. The n-FET 272 enters an on state in response to the reset signal $\phi_R$, to charge the node N112 to the ground potential $V_{SS}$ level. The n-FET 273 enters an on state in response to the information stored in the capacitor 281. The n-FET 274 enters an on state in response to the signal potential on the data input signal line $X_4$. The reference potential $V_R$ is coupled to the node N112 when both of the n-FETs 273 and 274 enter on states.

The coupling capacitors 276 and 280 have capacitance 2C, and the capacitors 278 and 282 have capacitance C. According to this structure, seven steps of degrees $+3$ to $-3$ of coupling can be obtained. The operation is now described.

First, data are written in the capacitors 275, 277, 279 and 281 by sequentially activating the word lines $WL_{1a}$ to $WL_{2b}$ similarly to the above embodiments. Before input data is supplied onto the signal line $X_4$, the reset signal $\phi_R$ is activated and the nodes N109 and N110 are precharged to the source potential $V_{CC}$ level while the nodes N111 and N112 are precharged to the ground potential $V_{SS}$ level. At the same time, the data signal line $J_1$ is also precharged to the reference potential $V_R$ level.

Consider that input data appearing on the input signal line $X_4$ is "1", while "1", "1", "0" and "0" are written in the capacitors 275, 277, 279 and 281, respectively. In this case, the potentials of the nodes N109 and N110 are reduced from the precharge potential $V_{CC}$ to $V_R$. Thus, the capacitors 276 and 278 for capacitive coupling extract charges of:

$$(2C+C) \cdot V_R = 3V_R \cdot C$$

from the signal line $J_1$. In this case, the potential of the signal line $J_1$ is reduced by:

$$3 \cdot V_R \cdot C / C_s,$$

assuming that $C_s$ represents parasitic capacitance of the output signal line $J_1$. That is, a degree $-3$ of coupling is implemented.

When data "0", "0", "1" and "1" are written in the capacitors 275, 277, 279 and 281, respectively, the potentials of the nodes N111 and N112 are raised up from the ground potential level $V_{SS}$ to the reference potential $V_R$, whereby the following charges are injected into the signal line $J_1$ through function of the coupling capacitors 280 and 282:

$$(2C+C)V_R = 3V_R \cdot C$$

Thus, the potential of the output signal line $J_1$ is increased by $3V_R \cdot C/C_s$, to implement a degree $+3$ of coupling.

In such a manner, it is possible to express degrees $-3$ to $+3$ by storing negative values of coupling of negative coupling degree in the storing capacitors 275 and 277 in binary numbers and by storing data expressing a positive coupling degree in binary numbers in the capacitors 279 and 281.

The coupling elements shown in FIGS. 18, 20 and 22 can also be expanded to those expressing degrees of coupling in more multiple steps in a similar manner.

Figure 3:
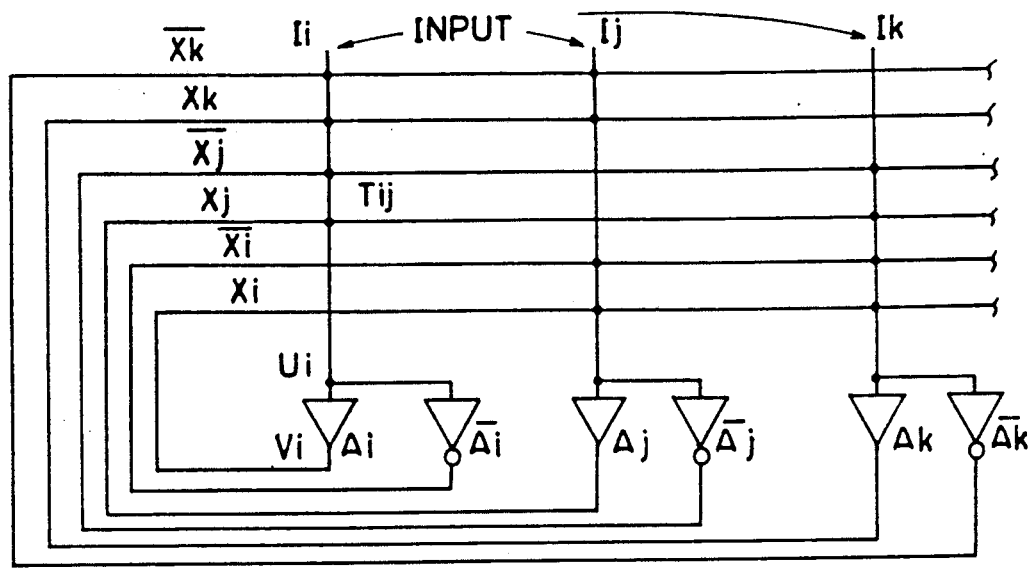
FIG. 3 represents exemplary specific structure of a conventional neural network.
Figure 4A:
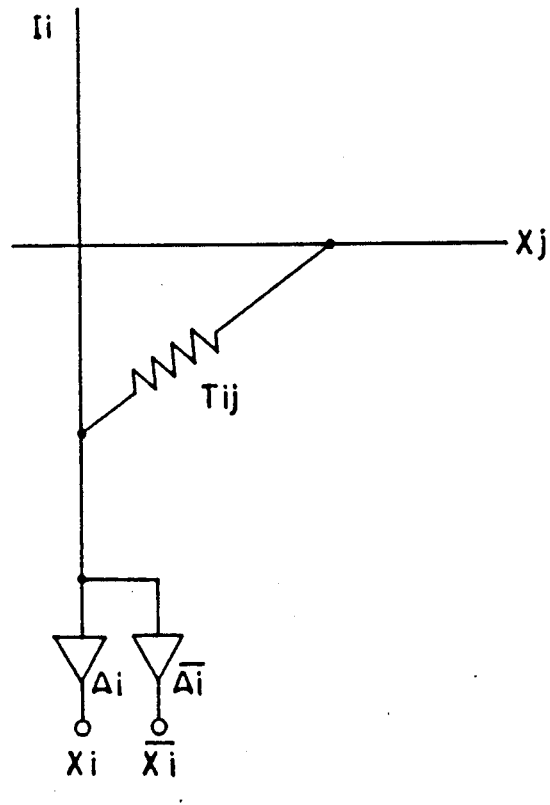
FIGS. 4A and 4B show connection arrangement of coupling elements expressing degrees of coupling in the conventional neural network shown in FIG. 3.
Figure 4B:
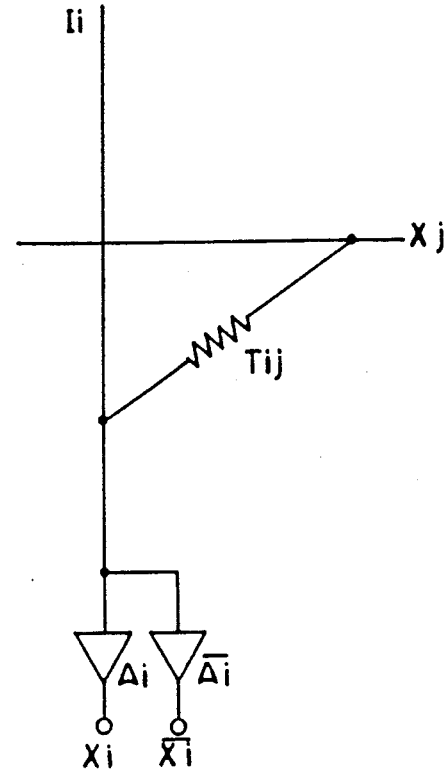
Figure 5:
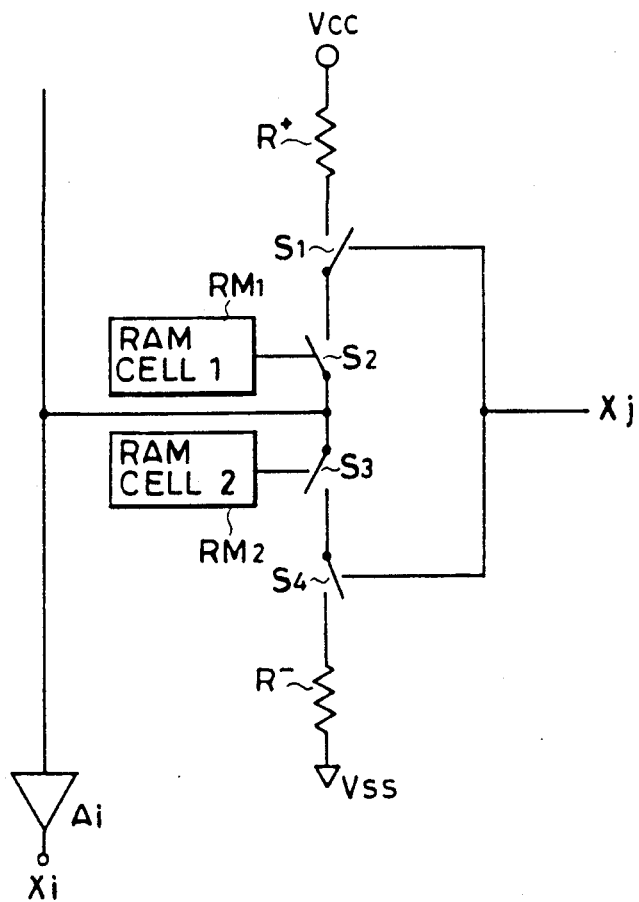
FIG. 5 shows the structure of a coupling element employed in the conventional neural network.
Figure 6:
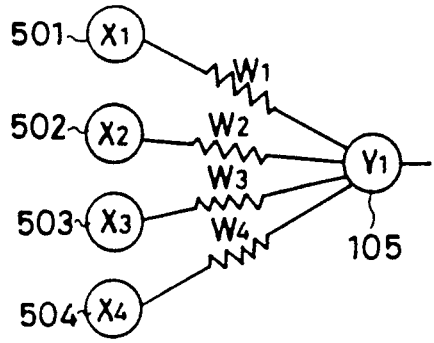
FIG. 6 shows conceptual structure of a generally known perceptron.

In the aforementioned embodiments, the present invention has been applied to perceptrons. However, the structure of the present invention is also applicable to the Hopfield circuit which is shown in FIG. 3.

Figure 24:
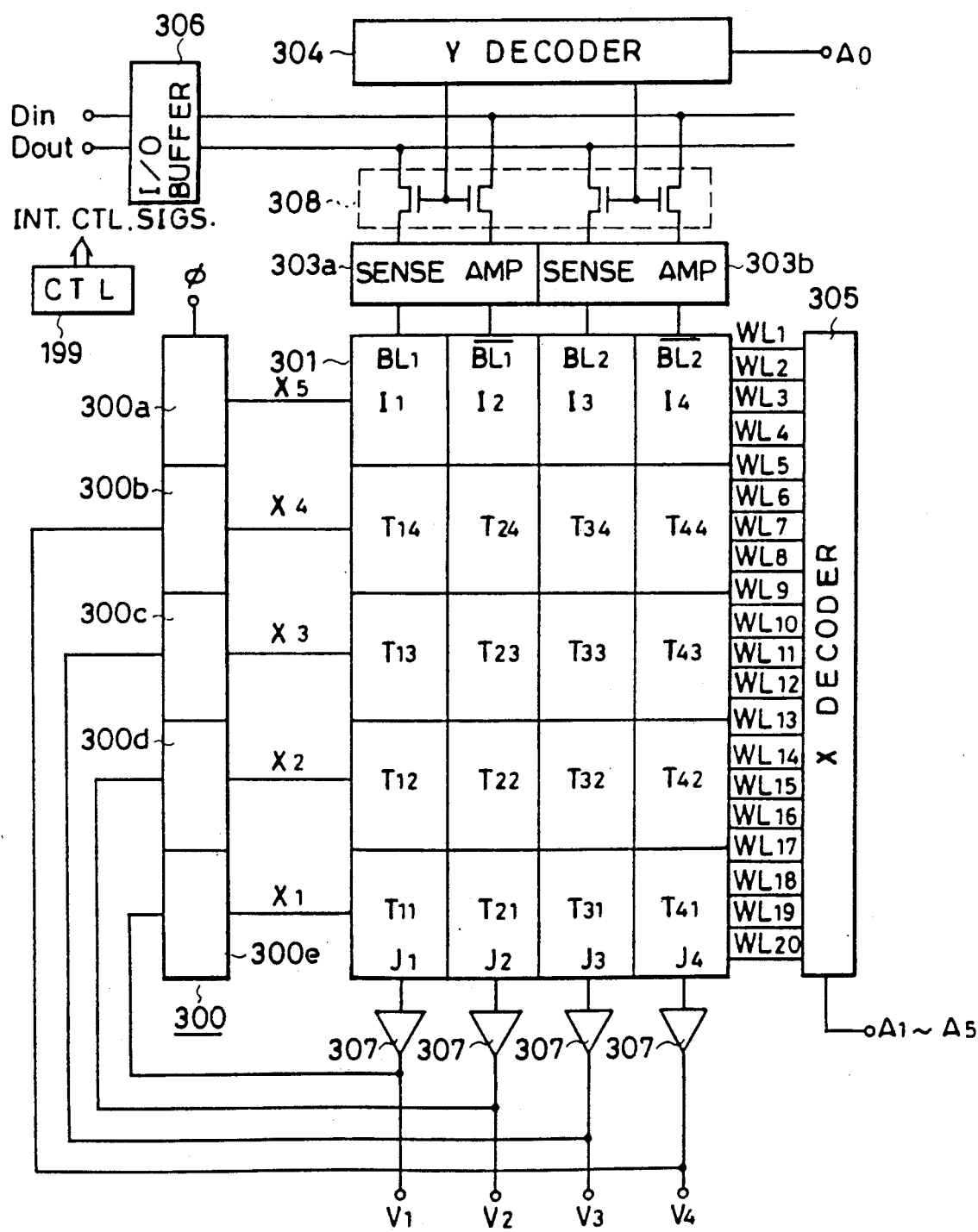
FIG. 24 shows the structure of a neural network according to a further embodiment of the present invention.

FIG. 24 illustrates the structure of a semiconductor neural network which is applied to a Hopfield model. Referring to FIG. 24, a connection matrix 301 includes coupling elements $I_1$, $I_2$, $I_3$ and $I_4$ for storing input data and a register 300 for feeding back output data, in addition to the structure shown in FIG. 16. The coupling elements $I_1$ to $I_4$ are similar in structure to coupling elements $T_{11}$ to $T_{44}$, and the degrees of coupling thereof are set at an appropriate value such as "1", for example.

The register 300 includes unit registers 300b, 300c, 300d and 300e for feeding back the output data and a unit register 300a for reading external input data. The unit register 300a outputs a high level signal in response to a control signal $\phi_5$, and transfers the same onto an input signal line $X_5$. The unit registers 300b to 300e d transfer feedback data (output data from amplifiers 307) as received to respective ones of input signal lines $X_4$ to $X_1$ in response to a control signal $\phi$. Therefore, the unit register 300a may be formed by an RS flip-flop or buffer circuit which receives the control signal $\phi$ at its set input, while each of the unit registers 300b to 300e may be formed, for example, by a latch circuit or transmission gate which passes the feedback data as received when the control signal $\phi$ is applied thereto, and latches received data in other case, i.e., when the control signal $\phi$ is in an inactive state. Such structures of the unit registers are mere examples, and other structures are also employable.

Figure 25:
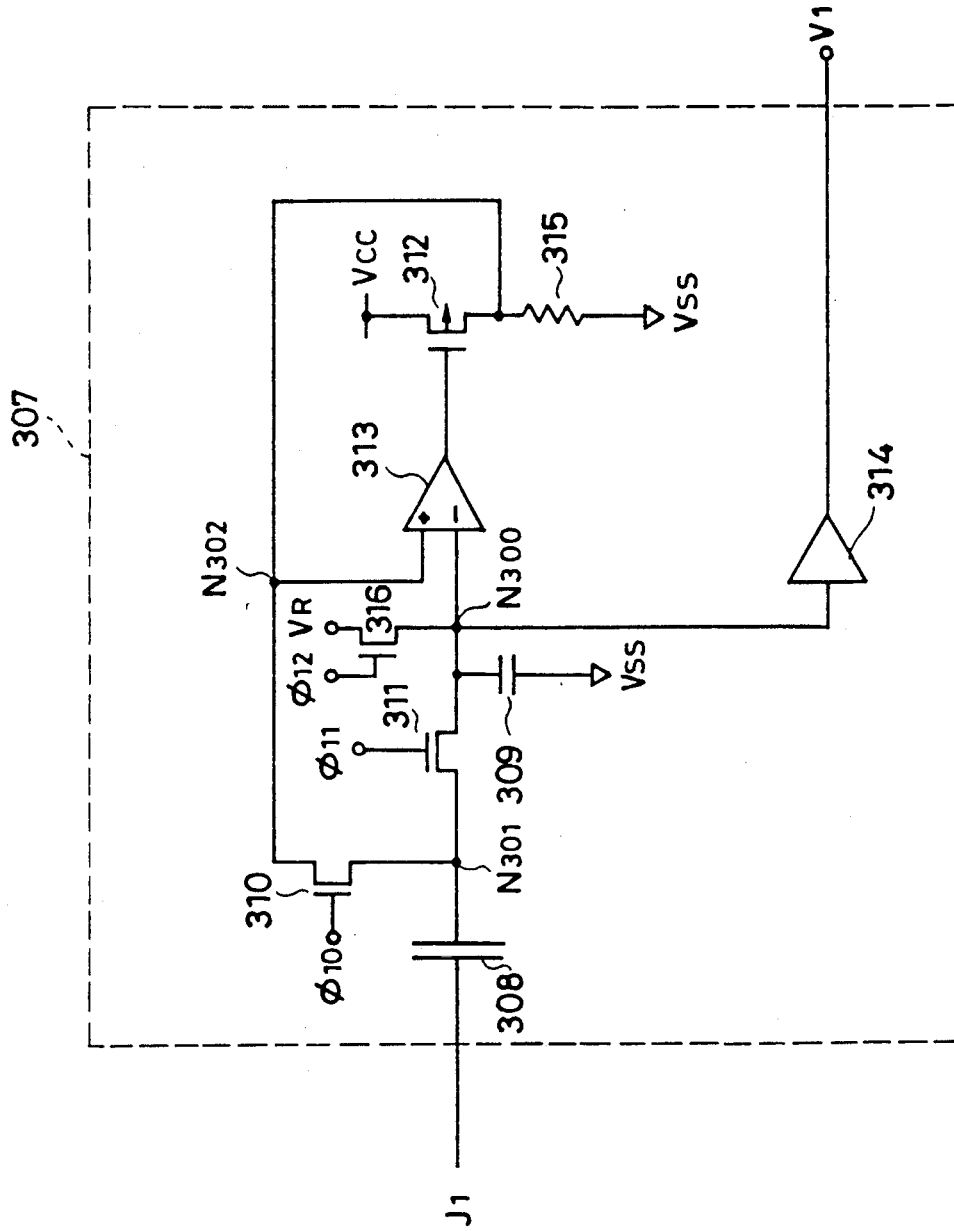
FIG. 25 shows the structure of an amplifier, which serves as a neuron body, employed in the neural network according to the present invention.

The amplifier 307 shown in FIG. 24 includes a coupling capacitor 308 coupled to a data signal line $J_i$ ($i=1\sim4$), in its input part as shown in FIG. 25, so that no standby-state current is developed on the data signal line $J_1$. Referring to FIG. 25, the amplifier 307 includes the coupling capacitor 308, a differential amplifier 313 and a buffer amplifier 314. The coupling capacitor 308 couples the signal line $J_1$ with a node N301. The differential amplifier 313 compares a potential on a node N302 with that of a node N300, to apply the result of comparison to the gate of a p-FET 312. The buffer amplifier 314 amplifies the potential on the node N300 to output the same as output data $V_1$.

Figure 26:
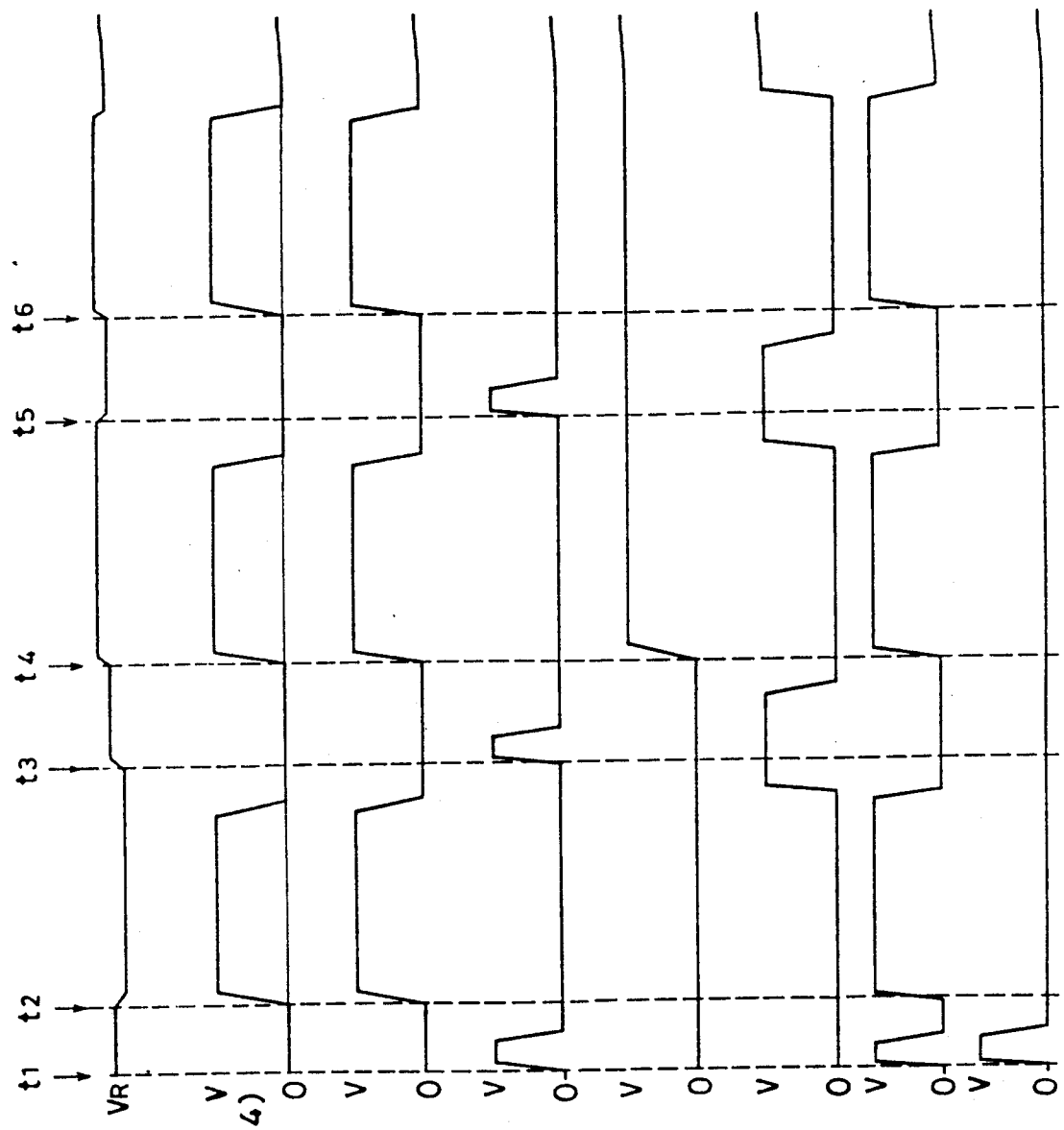
FIG. 26 is a signal waveform diagram showing the operation of the neural network shown in FIG. 24.

The amplifier 307 further includes n-FETs 310, 311 and 316, a capacitor 309 and a resistor 315 in order to maintain the internal nodes at predetermined potentials. The n-FET 310 connects the node N301 with the node N302 in response to a control signal $\phi_{10}$. The n-FET 311 enters an on state in response to a control signal $\phi_{11}$, to connect the node N301 with the node N300. The n-FET 316 enters an on state in response to a control signal $\phi_{12}$, to precharge the node N300 to a predetermined precharge potential $V_R$. The capacitor 309 maintains the potential at the node N300. The resistor 315 sets the potential of the node N302 at a value corresponding to the output of the differential amplifier 313. The operation of the circuit shown in FIGS. 24 and 25 is now described with reference to FIG. 26, which is an operating waveform diagram thereof.

First, input data are written in the respective ones of the coupling elements $I_1$ to $I_4$ through a data input/output circuit 306, an I/O gate 308 and sense amplifiers 303a and 303b. Such data writing in the coupling elements $I_1$ to $I_4$ is performed in a similar manner to an ordinary DRAM, as hereinabove described.

At a time $t_1$, the potential of the signal line $J_1$ is precharged to the precharge potential $V_R$, and internal nodes of the coupling elements $I_1$ to $I_4$ and $T_{11}$ to $T_{44}$ are precharged to a predetermined source potential $V_{CC}$ level and a predetermined ground potential $V_{SS}$ level. At this time, both of the control signals $\phi_{11}$ and $\phi_{12}$ rise to high levels, and the nodes N300 and N301 are precharged to the reference potential $V_R$.

At a time $t_2$, the control signal $\phi$ is activated and the signal potential on a signal line $X_5$ goes high to read input data, while the potentials on the signal lines $X_1$ to $X_4$ are changed in response to values, which are arbitrary values in initial states, stored in the registers 300b to 300e respectively. In response to the potential changes on the signal lines $X_1$ to $X_5$, the potential on the signal line $J_1$, for example, is changed in response to degrees of coupling stored in the coupling elements $I_1$ to $I_4$ and $T_{11}$ to $T_{44}$, similarly to the structure of the coupling elements shown in FIG. 17, for example. The -potential change on the signal line $J_1$, for example, is transferred onto the nodes N301 and N300 through the coupling capacitor 308 in the amplifier 307. The control signal $\phi_{11}$ is activated at the time $t_1$. In response to the potential change on the node N300, the potential of the output $V_1$ from the buffer amplifier 314 is changed. The output potential of the output data from the amplifier 314 is latched by respective ones of the unit registers 300b to 300e of the register 300. The registers 300b to 300e have function of latching analog data, as hereinabove described. The data latch operation is controlled by the control signal $\phi$.

When the potential of the node N302 in the amplifier 307 goes higher than that of the node N300, the output of the differential amplifier 313 goes high and the p-FET 302 enters an off state. Thus, the potential of the node N302 is reduced through the function of the resistor 315. When the potential of the node N302 goes lower than that of the node N300, the p-FET 312 enters an on state and the potential of the node N302 is increased. Thus, the nodes N300 and N302 are normally maintained at the same potential, thereby to prevent potential fluctuation of the node N301 in precharging of the signal line $J_1$ to $J_4$.

At a time $t_3$, the coupling elements $I_1$ to $I_4$ and $T_{11}$ to $T_{44}$ and the signal line $J_1$ to $J_4$ are again precharged as hereinabove described. On the other hand, the control signal $\phi_{10}$ is brought into a high level and the control signal $\phi_{11}$ is brought into a low level while the n-FET 310 is brought into an on state and the n-FET 311 is brought into an off state in the amplifier 307. Thus, the node N300 is isolated from the node N301, and the potential of the node N300 is held by the capacitor 309. At the same time, the potential of the node N301 is brought into the same value as that of the node N302, i.e., the same value as that of the node N300 through the differential amplifier 313. Thus, the potential of the node N301 is prevented from an influence exerted by the precharging operation of the signal line $J_1$, for example, through the coupling capacitor 308.

At a time $t_4$, the latch data from the register 300 are again transferred onto the signal lines $X_1$ to $X_4$ under control by the control signal $\phi$, while the potential on the signal line $X_5$ is set at a high level. Thus, a signal potential responsive to the degree of coupling of each coupling element re-appears on the signal line $J_1$, for example. In the amplifier 307, on the other hand, the control signal $\phi_{10}$ is at a low level and the control signal $\phi_{11}$ is at a high level, whereby the node N301 is connected with the node N300 through the n-FET 311. Consequently, the potential change appearing on the signal line $J_1$ is transferred to the node N300 through the coupling capacitor 308, and the buffer amplifier 314 outputs the output data $V_1$ responsive to the potential on the node N300.

Thereafter the above operation is repeated from the time $t_3$ to a time $t_5$, to obtain output data $V_1$ to $V_4$ depending on the input data.

A neural network operating with low power consumption can be obtained by the aforementioned structure since no standby-state current is developed on signal lines $J_i$ to $J_4$ which are input signal lines for the amplifiers.

When the amplifier of FIG. 25 having a coupling capacitor in its input part is adapted to serve as the body of a neuron, no standby-state current flows on signal lines. Therefore, an effect of reducing power consumption can be attained similarly to the above embodiment by using a coupling element shown in FIG. 27, for example. In the structure shown in FIG. 27, resistors 357 and 358 are employed in place of the coupling capacitor or a capacitor for injecting and discharging charges. The resistor 357 is connected to a source potential $V_{CC}$, and the resistor 358 is connected to a ground potential $V_{SS}$. Also in this structure, data are stored in storing capacitors 330 and 352 separately so that a signal line $J_1$ is charged or discharged through the resistors 357 and 358. At this time, the amplifier 307 detects the potential on the signal line $J_1$ through a coupling capacitor, whereby the amount of standby-state current can be reduced. Data indicative of degrees of coupling are written in the storing capacitors 330 and 332 in a method similar to those shown in FIGS. 20 to 26.

Figure 27:
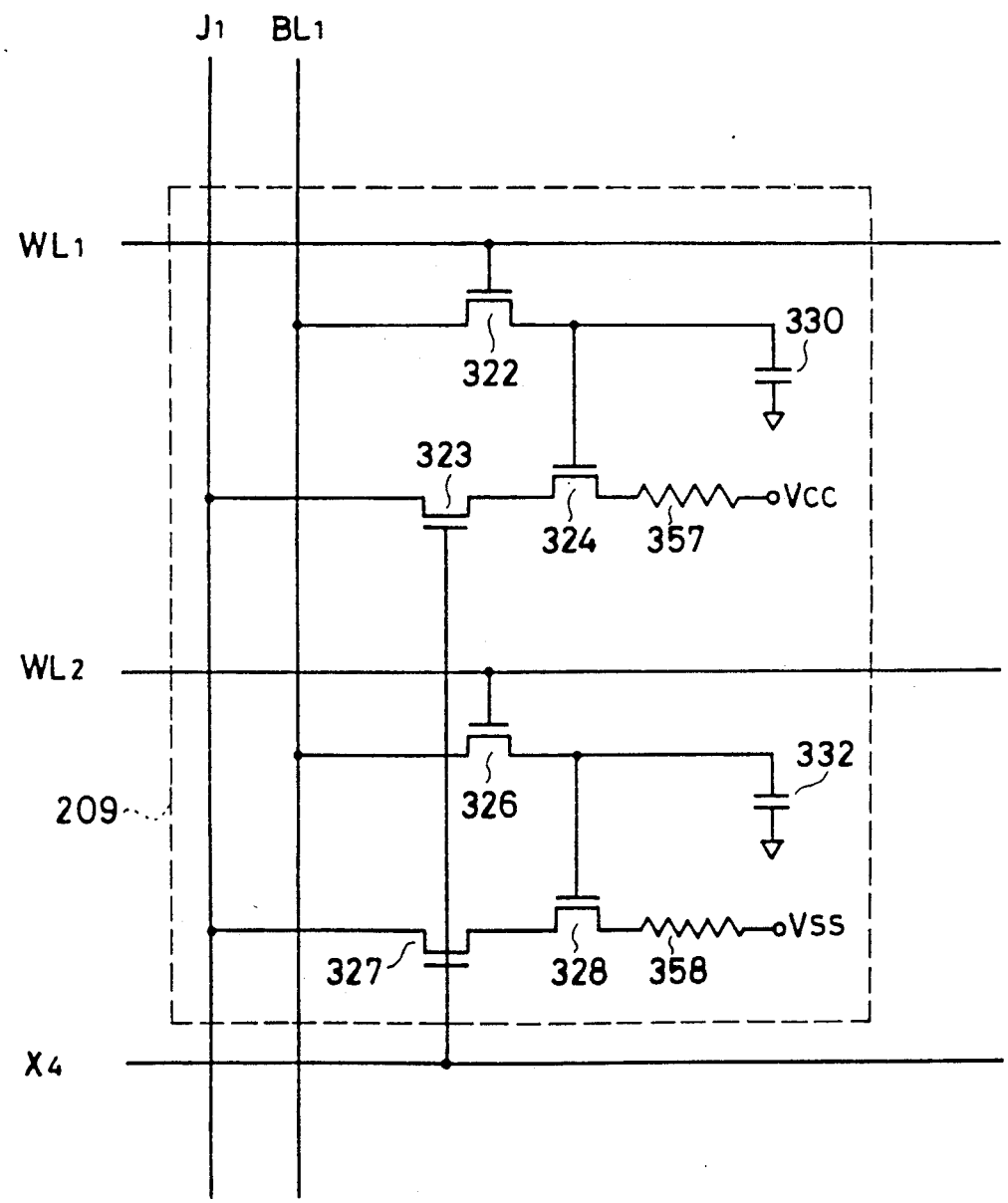
FIG. 27 shows a modification of the coupling element employed in the embodiment shown in FIG. 24.

When a conventional amplifier is employed to amplify the potential on the signal line $J_1$, the coupling element shown in FIG. 27 can be formed with a lower occupied area as compared with a general coupling element since the capacitors are employed for storing the degree of coupling.

Figure 28:
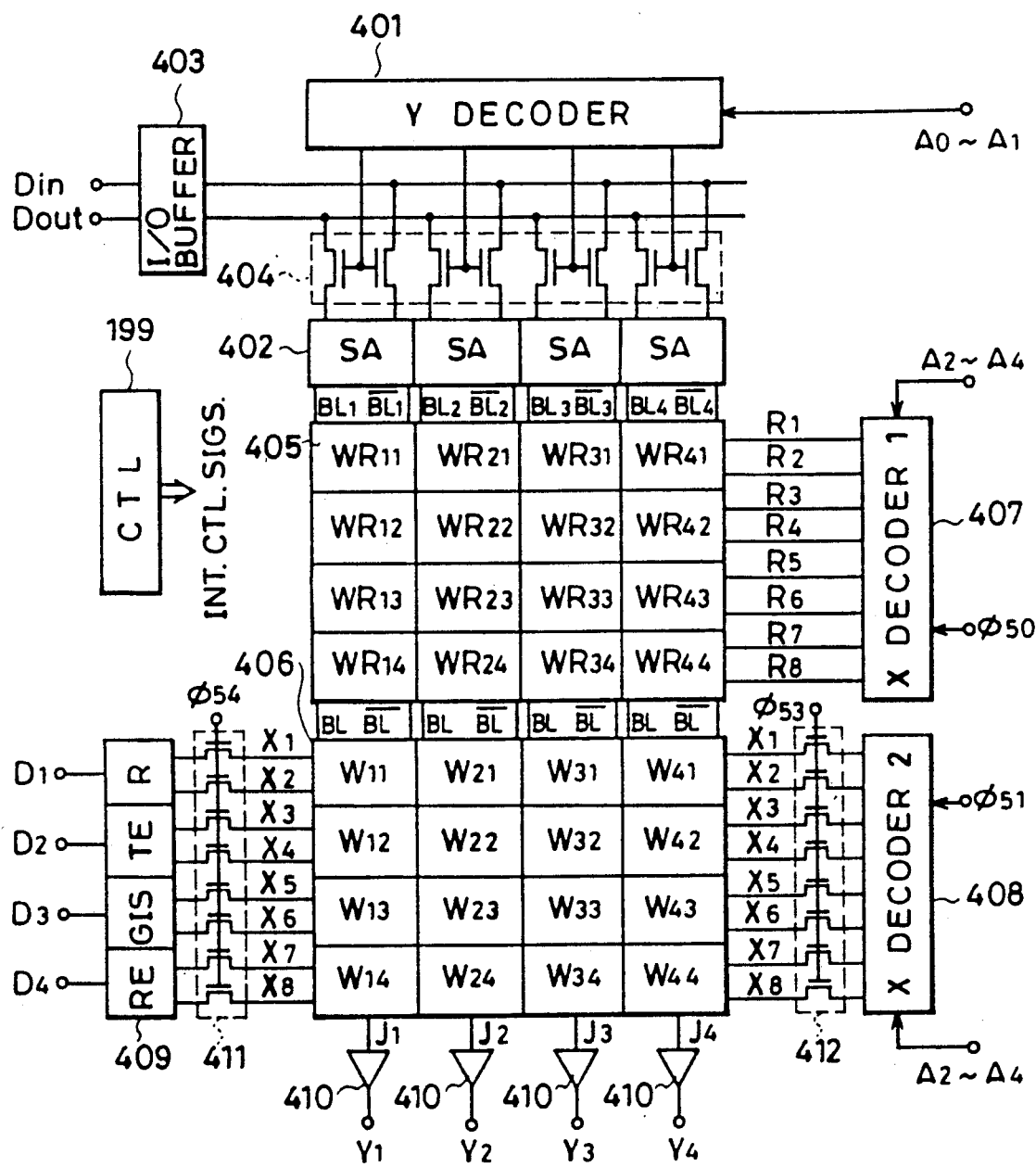
FIG. 28 shows overall structure of a semiconductor neural network according to a further embodiment of the present invention.

In each of the aforementioned embodiments, data indicative of degrees of coupling are stored in capacitors to charge or discharge signal lines $J_i$ through coupling capacitors etc. in response to the data stored in the capacitors. However, it is also possible to employ capacitors for storing coupling degree data themselves as coupling capacitors. FIG. 28 schematically shows overall structure employing storage capacitors as coupling capacitors.

Referring to FIG. 28, a neural network according to a further embodiment of the present invention includes a memory cell array 405 for storing coupling degree information, and a connection matrix 406 for coupling data input lines $X_1$ to $X_8$ with signal lines $J_1$ to $J_4$. The memory cell array 405 includes a four-by-four array of memory cells $WR_{11}$ to $WR_{44}$. The connection matrix 406 includes a four-by-four array of coupling elements $W_{11}$ to $W_{44}$.

A data input/output circuit 403, a Y decoder 401, an I/O gate 404, sense amplifiers 402 and an X decoder 407 are provided in order to write data in the memory cell array 405. The respective circuits provided for the memory cell array 405 are similar in structure and operation to those of an ordinary DRAM. The X decoder 407 is activated in response to a control signal $\phi_{50}$ to decode three-bit address signals $A_2$ to $A_4$, thereby to select one of word lines $R_1$ to $R_8$.

An X decoder 408 and a transfer gate 412 are provided in order to select one row of the connection matrix 406. The X decoder 408 decodes the address signals $A_2$ to $A_4$, to select one of the signal lines $X_1$ to $X_8$. The transfer gate 412 enters an on state in response to a control signal $\phi_{53}$, to connect the connection matrix 406 with the X decoder 408.

A register 409 and a transfer gate 411 are provided in order to transfer input data to the connection matrix 406. The register 409 receives supplied data $D_1$ to $D_4$, to transfer corresponding data onto the signal lines $X_1$ to $X_8$. The transfer gate 411 enters an on state in response to a control signal $\phi_{54}$, to connect the register 409 with the connection matrix 406. Each unit register included in the register 409 is connected with two signal lines, onto which the same data are transferred.

Amplifiers 410 are provided in order to amplify signal potentials on the signal lines $J_1$ to $J_4$ of the connection matrix 406 and derive output data $Y_1$ to $Y_4$.

Figure 29:
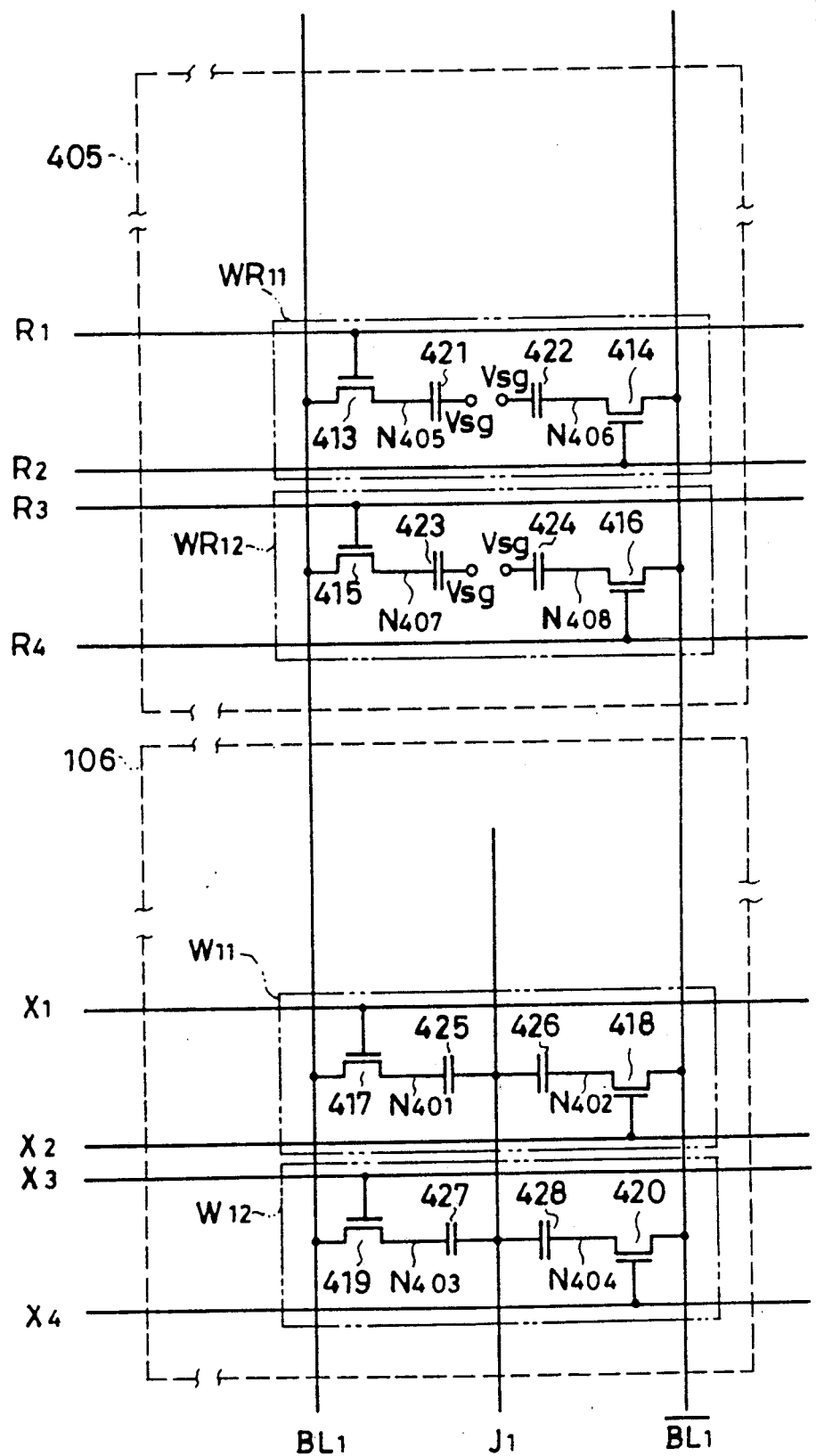
FIG. 29 shows the structure of a memory cell and a coupling element in the neural network shown in FIG. 28.

FIG. 29 schematically shows the structure of the memory cell array 405 and the connection matrix 406. This figure typically illustrates the coupling elements $W_{11}$ and $W_{12}$ and the memory cells $WR_{11}$ and $WR_{12}$. The memory cell $WR_{11}$ includes first and second memory cells, which are selected by the word lines $R_1$ and $R_2$, respectively. The first memory cell includes a capacitor 421 and an n-FET 413. The second memory cell includes a capacitor 422 and an n-FET 414. The n-FET 413 has a gate which is connected to the word line $R_1$, a source connected to a bit line $BL_1$, and a drain connected to a node N405. The capacitor 421 has a first electrode connected to the node N405 and a second electrode connected to a capacitor electrode potential $V_{sg}$. The n-FET 414 has a gate connected to the word line $R_2$, a source connected to a bit line $BL_1$ and a drain connected to a node N406. The capacitor 422 has a first electrode connected to the node N406 and a second electrode connected to the capacitor electrode potential $V_{sg}$.

The memory cell $WR_{12}$ includes a first memory cell comprised of an n-FET 415 and a capacitor 423, and a second memory cell comprised of an n-FET 416 and a capacitor 424. The n-FET 415 has a gate connected to the word line $R_3$, a drain connected to a node N407, and a source connected to the bit line $BL_1$. The capacitor 423 has a first electrode connected to the node N407, and a second electrode connected to the potential $V_{sg}$. The n-FET 416 has a gate connected to the word line $R_4$, a source connected to the bit line $BL_1$, and a drain connected to a node N408. The capacitor 424 has a first electrode connected to the node N408, and a second electrode connected to the potential $V_{sg}$. As clearly understood from FIG. 29, each of the memory cells $WR_{11}$ and $WR_{12}$ has the structure of a one-transistor and one-capacitor type dynamic random access memory cell.

The coupling element $W_{11}$ includes n-FETs 417 and 418 and capacitors 425 and 426. The n-FET 417 has a gate connected to the signal line $X_1$, a source connected to the bit line $BL_1$, and a drain connected to a node N401. The capacitor 425 has a first electrode connected to the node N401, and a second electrode connected to the signal line $J_1$. The n-FET 418 has a gate connected to the signal line $X_2$, a source connected to the bit line $BL_1$, and a drain connected to a node N402. The capacitor 426 has a first electrode connected to the node N402, and a second electrode connected to the signal line $J_1$.

The coupling element $W_{12}$ similarly includes n-FETs 419 and 420 and capacitors 427 and 428. The n-FET 419 has a gate connected to the signal line $X_3$, a source connected to the bit line $BL_1$, and a drain connected to a node N403. The capacitor 427 has a first electrode connected to the node N403, and a second electrode connected to the signal line $J_1$. The capacitor 428 has a first electrode connected to a node N404, and a second electrode connected to the signal line $J_1$. The n-FET 420 has a gate connected to the signal line $X_4$, a source connected to the bit line $BL_1$, and a drain connected to the node N404. As clearly understood from FIG. 29, the coupling elements $W_{11}$ and $W_{12}$ are similar in structure to the memory cells $WR_{11}$ and $WR_{12}$, except for that the second electrode of each capacitor is not connected to the constant potential $V_{sg}$, but to the signal line $J_1$.

Figure 30:
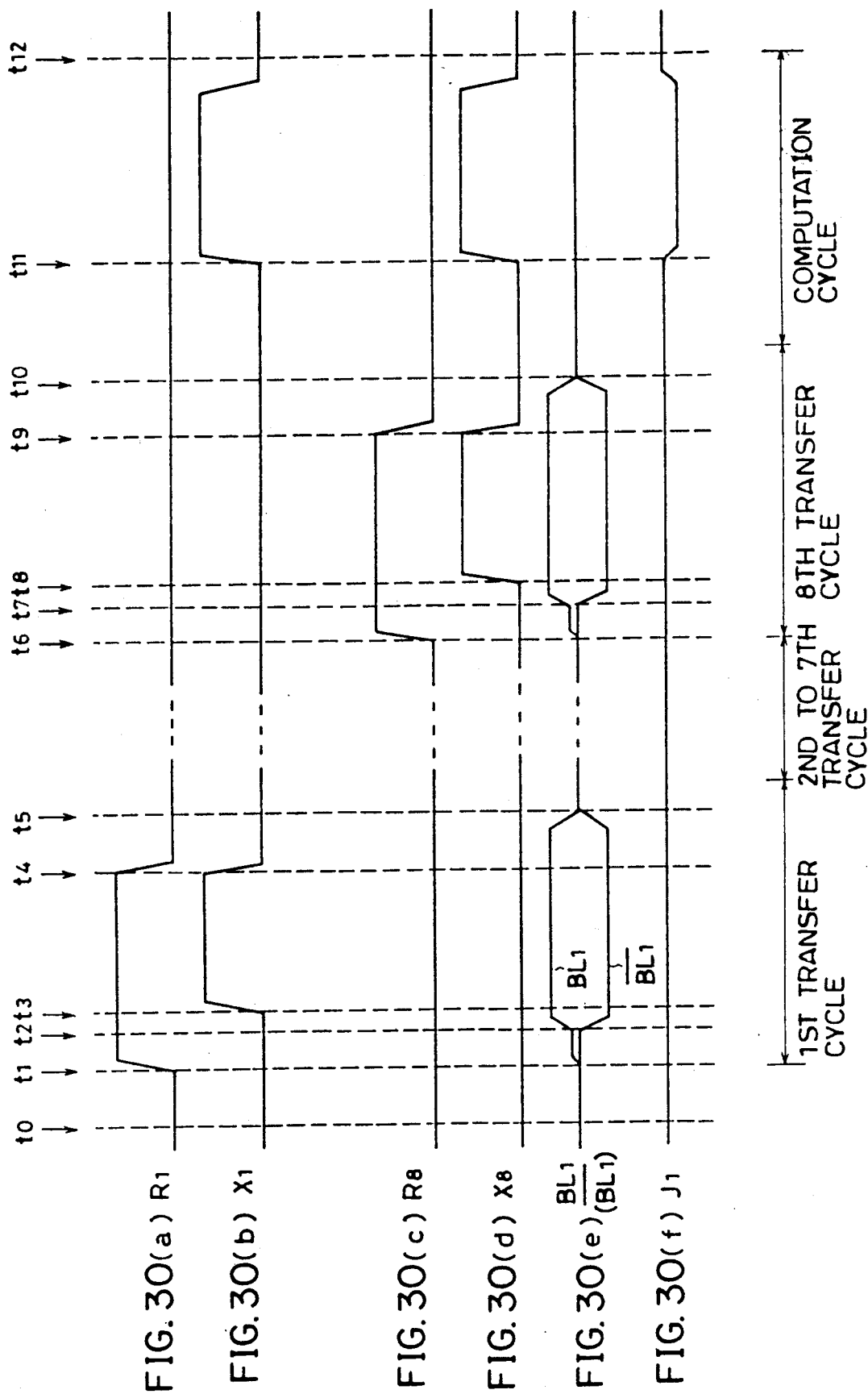
FIG. 30 is a signal waveform diagram showing the operation of the neural network shown in FIGS. 28 and 29.

Data are written in the memory cell array 405 similarly to ordinary DRAM by driving the data input/output circuit 403, the Y decoder 401, the I/O gate 404, the sense amplifiers 402 and the X decoder 407 under control by a control circuit 199. When the word line $R_1$, for example, is selected, its potential rises to a high level, and thereafter data are transferred onto the bit line $BL_1$ through the I/O gate selected by the Y decoder 401 to be written in the node N405. Such operation is performed for each one of the word lines $R_1$ to $R_8$, thereby to write the data in the memory cell array 405. Operation for transferring the data stored in the memory cell array 405 to the connection matrix 406 is now described with reference to an operating waveform diagram shown in FIG. 30.

In order to transfer the data from the memory cell array 405 to the connection matrix 406, a control signal $\phi_{54}$ is set at a low level and a control signal $\phi_{53}$ is set at a high level. Thus, the connection matrix 406 is coupled with the X decoder 408 and isolated from the register 409.

At a time $t_0$, the bit lines $BL_1$ and $\overline{BL_1}$ are precharged to a potential $V_R$ (potential of $V_{CC}/2$ in general) similarly to ordinary DRAM.

At a time $t_1$, the X decoder 407 is activated under control by a control signal $\phi_{50}$ to decode the address signals $A_2$ to $A_4$ and select the signal line $R_1$, thereby to raise up the potential of the signal line $R_1$ to a high level. Thus, the n-FET 413 enters an on state and the capacitor 421 is connected to the bit line $BL_1$. If a high level potential is written in the capacitor 421, the potential on the bit line $BL_1$ is increased.

At a time $t_2$, the sense amplifier 402 is activated to amplify potential difference on the bit lines $BL_1$ and $\overline{BL_1}$.

At a time $t_3$, the X decoder 408 is activated under control by a control signal $\phi_{51}$ to decode the address signals $A_2$ to $A_4$, thereby to raise up the potential on the signal line $X_1$ to a high level. Thus, the n-FET 417 enters an on state and the capacitor 425 is connected to the bit line $BL_1$, so that the high-level potential on the bit line $BL_1$ is written in the capacitor 425. At this time, potentials of capacitors included in the memory cells $WR_{11}$, $WR_{21}$, $WR_{31}$ and $WR_{41}$, which are connected to the signal line $R_1$, are simultaneously transferred to capacitors of the coupling elements $W_{11}$, $W_{21}$, $W_{31}$ and $W_{41}$ selected by the signal line $X_1$ in a similar manner.

After the first transfer cycle is completed at a time $t_5$, the bit lines $BL_1$ and $\overline{BL_1}$ are again precharged and then the signal line $R_2$ is selected similarly to data write and read operation in ordinary DRAM to read out capacitor data thereof onto the complementary bit line $\overline{BL_1}$. Thereafter the signal line $X_2$ is selected to write the read out data in corresponding capacitors. This operation is performed sequentially on the respective pairs of signal lines $R_3$ and $X_3$, ..., $R_8$ and $X_8$, thereby to transfer the potentials of the capacitors included in the memory cell array 405 to the respective coupling elements in the connection matrix 406.

Computation on input data is performed after the potentials of the capacitors in the memory cell array 405 are completely transferred to the array 406.

In this computation process, the control signal $\phi_{54}$ is set at a high level and the control signal $\phi_{53}$ is set at a low level. At a time $t_{10}$, the signal line $J_1$ is precharged to a precharge potential $V_R$, while the bit lines $BL_1$ and $\overline{BL_1}$ are both precharged to a predetermined precharge potential $V_R$. The precharged signal line $J_1$ is then brought into an electrically floating state.

At a time $t_{11}$, the potentials of signal lines which are connected to registers storing data "1" among data $D_1$ to $D_4$ supplied to the registers 409, among the signal lines $X_1$ to $X_8$, are raised up to high levels. In the case of input data $(D_1, D_2, D_3, D_4)=(1, 1, 0, 0)$, for example, the signal potentials of the signal lines $X_1$, $X_2$, $X_3$ and $X_4$ are set at high levels. Signal potentials of the remaining signal lines $X_5$ to $X_8$ are held at low levels.

If the capacitors 425 and 426 of the coupling element $W_{11}$ store data $2V_R$ and $2V_R$ ($V_R=V_{CC}/2$), respectively, the potentials of the nodes N401 and N402 are reduced from $2V_R$ to $V_R$ since the potentials of the bit lines $BL_1$ and $\overline{BL_1}$ are fixed at the precharge potential $V_R$. Thus, charges are extracted from the signal line $J_1$ by $C \cdot V_R \cdot 2$, where C represents capacitance of the capacitors 425 and 426.

Similarly, when the capacitors 425 and 426 of the coupling element $W_{11}$ store potentials "0" and "0", respectively, the potentials of the nodes N401 and N402 are increased from zero to $V_R$, whereby charges of $C \cdot V_R \cdot 2$ are injected into the signal line $J_1$, whose potential is thus increased.

When the capacitors 425 and 426 of the coupling element $W_{11}$ store potentials of $2V_R$ and zero (or zero and $2V_R$), respectively, the potential of the node N401 is changed from $V_R$ to $2V_R$ (or from zero to $V_R$) and the potential of the node N402 is changed from zero to $V_R$ (or from $2V_R$ to $V_R$). Thus, since the capacitors 425 and 426 are identical in capacitance to each other in this case, no charges are injected into the signal line $J_1$ and a degree 0 of coupling is implemented. Thus, the input data $D_1$ is converted along a positive or negative degree or a degree 0 of coupling in response to the degree of coupling stored in the coupling element, and is transferred to the signal line $J_1$.

Also in the coupling element $W_{12}$, input data $D_2$ is converted in response to a degree of coupling expressed by charges stored in the capacitors 427 and 428 (or potentials of the nodes N403 and N404) and transferred to the signal line $J_1$. Signal potentials on the signal lines $X_5$ to $X_8$ are at low levels since the input data $D_3$ and $D_4$ are "0", and no potential change is caused since all n-FETs included in this coupling element are in off states, and therefore the input data $D_3$ and $D_4$ are not transferred to the signal line $J_1$.

The amplifier 410 generates output $Y_1$ which corresponds to the signal potential on the signal line $J_1$. Thus, $$Y_1 = g(\Sigma W_{1i} D_i)$$

is obtained. Other output data $Y_2$ to $Y_4$ are also computed in a similar manner.

Once the computing operation between the times $t_{11}$ and $t_{12}$ is executed, potentials stored in the capacitors expressing the degree of coupling of the coupling elements $W_{11}$ to $W_{44}$, such as the capacitors 425 and 426 in the coupling element $W_{11}$, are destroyed. Therefore, the operation starting at the times $t_0$ to $t_{10}$ is again executed after execution of the single computation cycle, so that data stored in the memory cell array 405 storing the degree of coupling are transferred to the corresponding coupling elements. After completion of the data transfer, predetermined computation is again performed on new or the same input data $D_1$ to $D_4$. A single-layer perceptron can be implemented by this structure.

Figure 31:
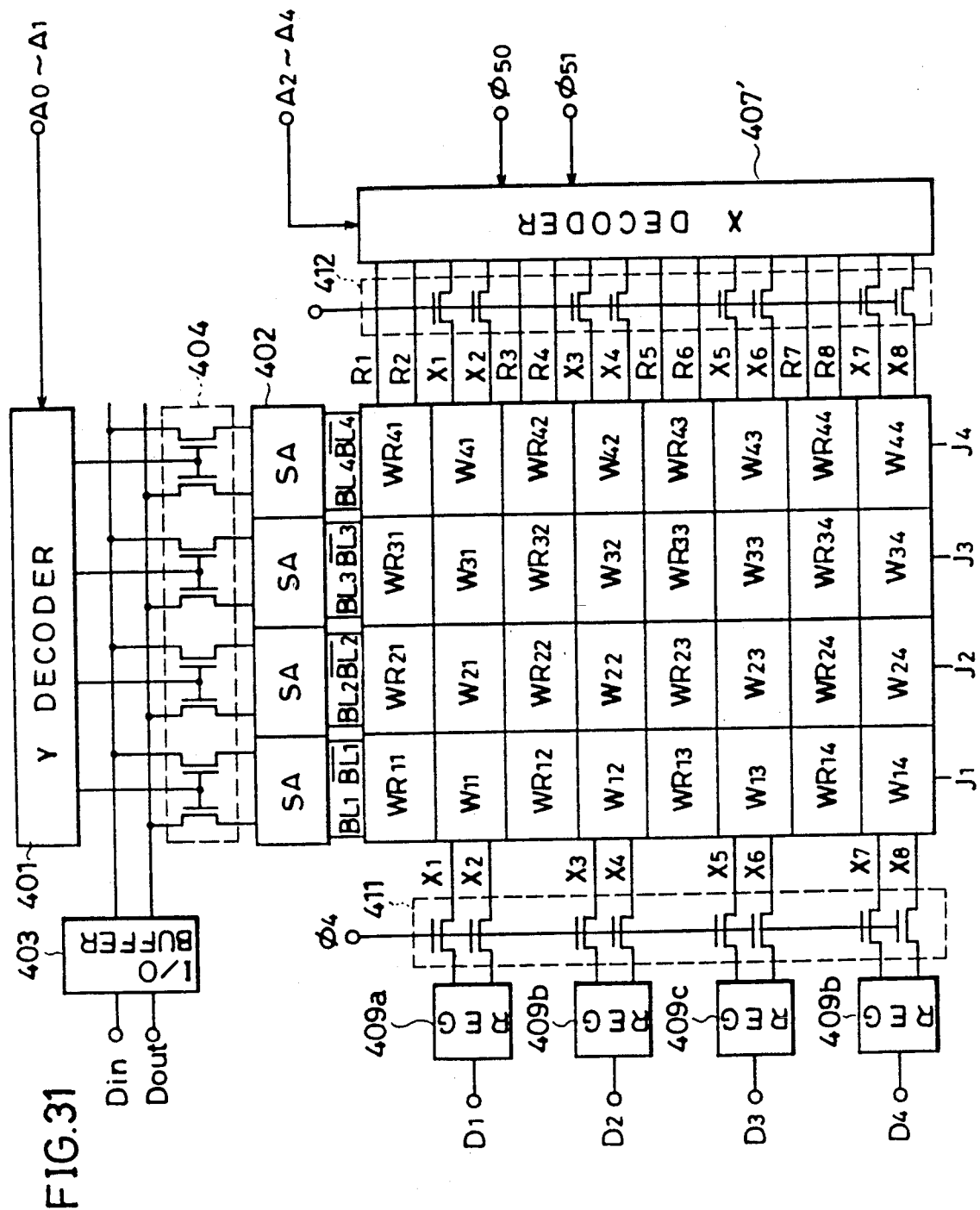
FIG. 31 shows overall structure of a neural network according to a modification of the embodiment shown in FIG. 28.

In the structure shown in FIG. 28, the memory cell array 405 storing the degree of coupling is separately provided from the connection matrix 406. However, a similar effect can be attained by mingling coupling elements $W_{11}$ to $W_{44}$ and memory cells $WR_{11}$ to $WR_{44}$ with each other as shown in FIG. 31. Referring to FIG. 31, each coupling element $W_{ij}$ is placed adjacent to a corresponding memory cell $WR_{ij}$, while decoders for selecting the memory cell array and the connection matrix are integrated as an X decoder 407'. The X decoder 407' response to control signals $\phi_{50}$ and $\phi_{51}$, to select corresponding signal lines R and X respectively, in response to address signals $A_2$ to $A_4$.

In the aforementioned structure, each of the X decoders 407, 408 and 407' is adapted to decode the address signals $A_2$ to $A_4$. However, such an X decoder may be replaced by a shift register, which sequentially raises up signal line potentials.

Further, a circuit for latching data for one row may be provided to simultaneously write the data of one row from this one-row data latch in corresponding memory cells.

An effect similar to the above can be attained through any modified arrangement, so far as the modification implements the structure in which coupling elements $W_{ij}$ and memory cells $WR_{ij}$ are connected to the same bit lines $BL_i$ and $\overline{BL_i}$.

In the structure shown in FIG. 28 or 31, the degrees of coupling is expressed only in three level values, i.e., a positive value, zero and a negative value. However, it is also possible to express the degree of coupling in multiple steps.

Figure 32:
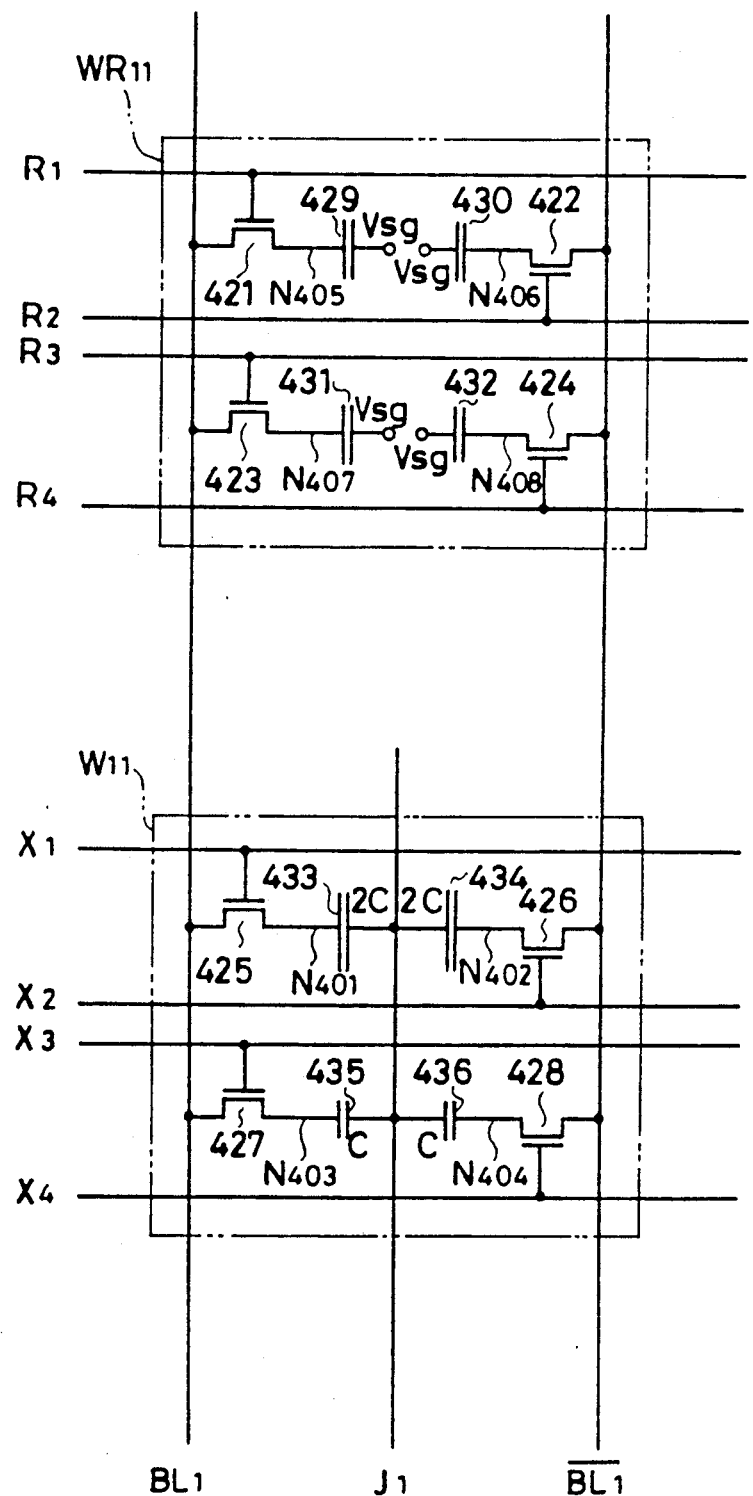
FIG. 32 shows another modification of the coupling element employed in the neural network shown in FIG. 28.

FIG. 32 typically shows a memory cell and a coupling element for expressing the degree of coupling in multiple steps. Referring to FIG. 32, a memory cell $WR_{11}$ includes four DRAM cells. Each memory cell has a one-transistor and one-capacitor structure, and includes n-FETs 421, 422, 423 and 424 and storing capacitors 429, 430, 431 and 432.

Similarly, a corresponding coupling element $W_{11}$ includes n-FETs 425, 426, 427 and 428 and capacitors 433, 434, 435 and 436. This structure corresponds to the case where two coupling elements are integrated into one in the structure shown in FIG. 29, except for that the capacitors 433 and 434 are twice the capacitors 435 and 436 in capacitance. Data indicative of the degree of coupling can be written in the memory cell $WR_{11}$ and transferred from the memory cell $WR_{11}$ to the coupling element $W_{11}$ in a similar manner to the structure shown in FIG. 28. In this case, the capacitors 433 and 434 of the coupling element $W_{11}$ are different in capacitance from the capacitors 435 and 436. Therefore, the amount of charges appearing on a signal line $J_1$ is varied with the data stored in these capacitors. Thus, it is possible to express the degree of coupling in seven steps of $+3$, $+2$, $+1$, $0$, $-1$, $-2$ and $-3$ as shown in FIG. 33.

The indication of the degree of coupling in seven steps shown in FIG. 33 is a mere example, and it is possible to indicate the degree of coupling in a larger number of steps by expanding arrangement of capacitors.

According to the present invention, as hereinabove described, axon signal lines (data input lines X) and dendrite signal lines (data output lines; input lines to amplifiers) are coupled with each other by coupling capacitors expressing the degree of coupling stored in coupling elements, whereby a neural network of low power consumption can be obtained with no flow of standby-state current to the dendrite signal lines during operation (computation process).

Further, a coupling element of a very small area can be obtained since capacitors are employed as elements for storing the degree of coupling in the coupling element.

In addition, a semiconductor neural network of low power consumption can be obtained with no flow of standby-state current to data output lines during the operation since amplifiers serving as bodies of neurons is adapted to detect potentials of the data output lines through capacitive coupling.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A coupling element in a neural circuit device built on the model of a vital cell and having a first signal line for transferring a signal to be computed, an amplifier serving as the body of said vital cell and a second signal line for transferring a signal to said amplifier, said coupling element being adapted to couple said first signal line and said second signal line with each other in a specific degree of coupling, and comprising:

capacitance means for storing information indicating said degree of coupling;

means for transferring said coupling degree information stored in said capacitance means; and capacitive coupling means capacitively coupling an output part of said information transfer means to said second signal line in response to a signal potential on said first line thereby to convert said potential on said first signal line along said coupling degree information and transfer the same onto said second signal line, said information transfer means including means for electrically isolating said capacitance means from said capacitive coupling means.

2. A coupling element in accordance with claim 1, wherein said information transfer means comprises a transistor element having a first conduction terminal coupled to a first source potential, a control terminal connected to receive said information stored in said capacitive means and a second conduction terminal coupled to said capacitance coupling means, said control terminal being electrically isolated from said second conduction terminal.

3. A coupling element in accordance with claim 1, wherein said capacitance means comprises an electrically programmable storage cell having a floating gate, said floating gate storing said coupling degree information in the form of charges and being coupled to an input part of said information transfer means.

4. A coupling element in accordance with claim 2, wherein said capacitance means comprises:

a first electrically programmable memory device having a first floating gate for storing charges, a second electrically programmable memory device having a second floating gate for storing charges, means for simultaneously injecting charges into said first and second floating gates, and means for simultaneously extracting charges from said first and second floating gates, said first and second floating gates being connected to said control terminal of the transistor element.

5. A coupling element in accordance with claim 2, wherein said capacitance means comprises:

a first electrically programmable memory device having a control gate connected to a first control signal line, a conduction terminal selectively coupled to either said first control signal line or a second control signal line and a floating gate for storing charges, said floating gate being connected to said control terminal of said transistor element, a second electrically programmable memory device having a control gate selectively coupled to either said second control signal line or a third control signal line, a conduction terminal connected to said third control signal line and a floating gate for storing charges, said floating gate being connected to said control terminal of said transistor element, first coupling means for coupling said conduction terminal of said first memory device to either said first control signal line or said second control signal line in response to a signal potential on a fourth control signal line, and second coupling means for coupling said control gate of said second memory device to either said second control signal line or said third control signal line in response to said signal potential on said fourth control signal line, and wherein said first control signal line is supplied with a programming voltage being higher than operating source potential, and said second and third control signal lines are supplied with a voltage of a ground potential level while said first coupling means couples said conduction terminal of said first memory device to said second control signal line and said second coupling means couples said control gate of said second memory device to said second control signal line when charges are injected into respective said floating gates of said first and second memory device, and the voltage of said ground potential level is applied to said first and second control signal lines and said programming voltage is applied to said third control signal line while said first coupling means couples said conduction terminal of said first memory device to said second control signal line while said first coupling means couples said conduction terminal of said first memory device to said second control signal line and said second coupling means couples said control terminal of said second memory device to said second control signal line when charges are extracted from respective said floating gates of said first and second memory devices.

6. A coupling element in accordance with claim 1, wherein said capacitive coupling means comprises:

means for electrically shorting said second signal line and an output part of said information transfer means in response to a first control signal, means for connecting said output part of said information transfer means to a first potential source in response to a second control signal, and means for activating said information transfer means in response to a third control signal.

7. A coupling element in accordance with claim 6, wherein
said first control signal is generated in response to the supply of said signal to be computed to said first signal line and said second control signal is generated after completion of said electrical shorting, while said third control signal is generated after completion of connection between said output part of said information transfer means and said first potential source.

8. A coupling element in accordance with claim 2, further comprising:
a first switching element entering an on state in response to a first control signal for shorting said second signal line and said second conduction terminal of said transistor element, said first control signal being generated in response to the supply of said signal to be computed to said first signal line,
a second switching element entering an on state in response to a second control signal for connecting said second conduction terminal of said transistor element to a second source potential, said second control signal being generated after completion of generation of said first control signal, and
a third switching element entering an on state in response to a third control signal for connecting said first conduction terminal of said transistor element to said first source potential, said third control signal being generated after completion of generation of said second control signal.

9. A coupling element in accordance with claim 1, wherein said capacitance means comprises
a first capacitor means being charged from a first potential source,
second capacitor means being charged from a second potential source, and
means for transferring charging potentials of said first and second capacitor means to an input part of said information transfer means along coupling degree information to be programmed.

10. A coupling element in accordance with claim 1, wherein
said capacitance means is provided in its output part with means for nullifying said coupling degree information stored in said capacitance means after a lapse of a predetermined time.

11. A coupling element in accordance with claim 10, wherein
said nullifying means includes means for setting an output potential of said capacitance means at a potential indicating a degree 0 of coupling after a lapse of said predetermined time.

12. A coupling element in accordance with claim 2, wherein
said transistor element comprises an insulated gate field effect transistor having a threshold voltage, said second signal line is precharge to a predetermined precharge voltage before said signal to be computed is supplied to said first signal line, and wherein
said capacitance means has a resistor and a capacitor being connected in series between a third voltage source supplying a voltage equal to the sum of said threshold voltage and said precharge voltage, and said second potential source,
said capacitor being charged from said third potential source through said resistor,
a connection node between said resistor and said capacitor being connected to said control terminal of said transistor element.

13. A coupling element in accordance with claim 1, wherein
said capacitance means includes:
a plurality of capacitors being connected in parallel with each other and having different capacitance values from each other,
a plurality of memory device means provided in correspondence to respective ones of said plurality of capacitors for storing data as to whether corresponding said capacitors are charged to a first potential or a second potential,
means for charging respective said plurality of capacitors in response to a first control signal along data stored in corresponding said memory device means, and
means for parallelly connecting said plurality of capacitors to an input part of said information transfer means in response to a signal potential on said first signal line.

14. A neural circuit device built on the model of vital cells, comprising:
a plurality of signal lines for respectively transferring signals to be computed;
a plurality of amplifiers serving as the bodies of said vital cells;
a plurality of second signal lines provided in correspondence to respective ones of said plurality of amplifiers for transferring signals to corresponding said amplifiers, said second signal lines being arranged to intersect with said first signal lines; and
a plurality of coupling elements provided at respective crossings between said first signal lines and said second signal lines for respectively coupling associated said first signal lines with associated said second signal lines along specific degrees of coupling, each of said plurality of coupling elements including capacitance means for storing said specific degree of coupling in the form of charges and capacitive coupling means for converting a signal potential on the associated said first signal line and transferring the same onto the associated said second signal line through coupling capacitance along information indicative of said degree of coupling stored in said capacitance means.

15. A neural circuit device in accordance with claim 14, wherein
said second signal lines are maintained at a predetermined precharge potential before said signals to be computed are transferred onto said first signal lines and brought into electrically floating states immediately before said signals to be computed are transferred onto said first signal lines, and wherein
each said capacitive coupling means comprises:
means for transferring a charging potential of said capacitance means to a first node in a source follower fashion,
means for shorting said first node and said second signal line in response to a first control signal, said first control signal being generated in response to the supply of said signal to be computed onto said first signal line,
means for connecting said first node to said first potential source in response to a second control signal, said second control signal being generated after completion of said shorting, means for activating said transfer means in response to a third control signal, said third control signal being generated after completion of connection between said first node and said first potential source, and means for capacitively coupling said first node to said second signal line in response to a signal potential on said first signal line.

16. For employment in a neural circuit built on the model of a vital cell and including a first signal line for transferring a signal to be computed, an amplifier serving as the body of said vital cell and a second signal line for transferring a signal to said amplifier, a coupling element being adapted to couple said first signal line and said second signal with each other in a specific degree of coupling, and including:

capacitance means holding information indicating said degree of coupling;

means for transferring a first reference potential to a first node in response to said information held in said capacitance means and a signal potential on said first signal line;

means for capacitively coupling said first node with said second signal line; and means for precharging said first node at a second reference potential different from said first reference potential, before said signal potential is applied to said first signal line.

17. A neural circuit in accordance with claim 16, further including a third signal line for transferring said coupling degree information and a fourth signal line for selecting said capacitance means, and wherein said capacitance means comprises:
a capacitor, and
means for coupling said capacitor to said third signal line in response to a potential on said fourth signal line.

18. A neural circuit in accordance with claim 17, wherein said second signal line and said third signal line are separately provided signal lines.

19. A neural circuit in accordance with claim 17, wherein said second signal line and said third signal line share a common signal line with each other.

20. In a neural circuit device built on the model of a vital cell and including a first signal line for transferring a signal to be computed, an amplifier serving as the body of said vital cell and a second signal line for transferring a signal to said amplifier, a coupling element being adapted to couple said first signal line and said second signal line with each other in a specific degree of coupling and at least including:

first capacitance means for storing information indicative of a negative degree of coupling;

means for transferring a first reference potential to a first node in response to said information held in said first capacitance means and a potential on said first signal line;

means for precharging said first node to a second reference potential, being different from said first reference potential said signal to be computed is transferred to said first signal line;

first capacitive coupling means for capacitively coupling said first node with said second signal line;

second capacitance means for storing information indicative of a positive degree of coupling;

means for transferring said first reference potential to a second node in response to said information held in said second capacitance means and said potential on said first signal line;

means for precharging said second node to a third reference potential before said signal to be computed is transferred to said first signal line; and second capacitive coupling means for capacitively coupling said second node with said second signal line.

21. A neural circuit in accordance with claim 20, wherein said first capacitive coupling means has a capacitance value being identical to that of said second capacitive coupling means.

22. A neural circuit in accordance with claim 20, wherein said first capacitive coupling means has a capacitance value being different from that of said second capacitive coupling means.

23. A neural circuit in accordance with claim 20, further comprising a third signal line for transferring said coupling degree information, a first selection signal line for selecting said first capacitance means, a second selection signal line for selecting said second capacitance means and a third signal line for transferring said coupling degree information, and wherein said first capacitance means comprises:
a first capacitor, and
first connection means for connecting said first capacitor to said third signal line in response to a potential on said first selection signal line, and
said second capacitance means comprises:
a second capacitor, and
second connection means for connecting said second capacitor to said third signal line in response to a potential on said second selection signal line.

24. A neural circuit in accordance with claim 23, wherein said second signal line and said third signal line are separately provided signal lines.

25. A neural circuit in accordance with claim 23, wherein said second signal line is a signal line shared with said third signal line.

26. In a neural circuit device built on the model of a vital cell and including a first signal line for transferring a signal to be computed, an amplifier serving as the body of said vital cell and a second signal line for transferring a signal to said amplifier, a coupling element being adapted to couple said first signal line and said second signal line with each other in a specific degree of coupling, and comprising:

first capacitance means for storing information indicating said degree of coupling;

second capacitance means being precharged at a first potential before said signal to be computed is transferred to said first signal line; and means for connecting said second capacitance means to said second signal line in response to said information stored in said first capacitance means and a signal potential on said first signal line.

27. A neural circuit in accordance with claim 26, further comprising a selection signal line for selecting said first capacitance means and a third signal line for transferring said coupling degree information, and wherein said first capacitance means comprises:

a capacitor, and
means for connecting said capacitor to said third control signal line in response to a signal potential on said selection signal line.

28. In a neural circuit device built on the model of a vital cell and including a first signal line for transferring a signal to be computed, an amplifier serving as the body of said vital cell and a second signal line for transferring a signal to said amplifier, a coupling element being adapted to couple said first signal line and said second signal line with each other in a specific degree of coupling, and comprising:
   first capacitance means for storing information indicative of a positive degree of coupling;
   a first capacitor element being charged at a first potential before said signal to be computed is transferred to said first signal line;
   first connection means for connecting said first capacitor element to said second signal line in response to a signal potential on said first signal line and said information stored in said first capacitance means;
   second capacitance means for storing information indicative of a negative degree of coupling;
   a second capacitor element being charged at a second potential before said signal to be computed is transferred to said first signal line; and
   means for connecting said second capacitor element to said second signal line in response to said signal potential on said first signal line and said information stored in said second capacitance means.

29. A neural circuit device built on the model of vital cells, comprising:
   a plurality of first signal lines to which signals to be computed are transferred respectively;
   a plurality of amplifiers serving as the bodies of said vital cells;
   a plurality of second signal lines provided in correspondence to respective said plurality of amplifiers for transferring signals to corresponding said amplifiers, said second signal lines being arranged to intersect with said first signal lines;
   a plurality of coupling elements provided in respective crossings between said plurality of first signal lines and said plurality of second signal lines, for coupling associated first signal lines with associated second signal lines in a specific degree of coupling, said plurality of coupling elements being arranged in a matrix of rows and columns;
   means for selecting a row in said rows of said coupling element matrix;
   means for selecting a column in said columns of said coupling element matrix; and
   means for writing information indicating a degree of coupling in a coupling element selected by said row selection means and said column selection means,
   each of said plurality of coupling elements including a memory means for storing supplied coupling degree information in the form of charges and means for coupling associated said first signal line with associated said second signal line in response to said information stored in said memory means,
   said coupling means including means for converting a a signal line potential on the associated first signal line through charge pumping function of a capacitor and thereafter transferring the same to the associated second signal line.

30. A neural circuit in accordance with claim 29, further comprising:
   a plurality of column lines each connected with one column of said coupling elements of said coupling element matrix, coupling degree information being transferred to each said column line, and
   a plurality of row lines each connected with one row of said memory means of said coupling element matrix, row selection signals being transferred onto said plurality of row lines,
   said plurality of columns lines comprising a plurality of column line pairs each comprised of two said column lines, said write means including means for transferring to any pair of said column lines a part of data complementary to each other,
   said plurality of coupling elements being so arranged that only one coupling element is provided for a row line in a pair of said column lines.

31. A neural circuit in accordance with claim 29, wherein
   each of said coupling means comprises:
   means for connecting a first node to a first reference potential source in response to information stored in the associated memory means and a signal line potential on the associated first signal line,
   means for connecting said first node to a second reference potential source before said signal to be computed is transferred to said associated first signal line, and
   means for capacitively coupling said first node to the associated second signal line.

32. A neural circuit in accordance with claim 29, wherein
   each of said memory device comprises:
   a first memory device comprising a first capacitor and means for connecting said first capacitor to an associated column line in response to a signal potential on associated row line, and
   a second memory device comprising a second capacitor and means for connecting said second capacitor to said associated column line in response to a signal potential on an associated row line, and
   each said coupling means comprises:
   first connection means for connecting a first node to a first reference potential source in response to a signal potential on an associated said first signal line and a charging potential of said first capacitor,
   second connection means for connecting said first node to a second reference potential source before said signal to be computed is transferred onto said associated first signal line,
   first capacitive coupling means for capacitively coupling said first node to an associated said second signal line,
   third connection means for connecting said first reference potential source to a second node in response to a signal potential on said associated first signal line and a charge potential of said second capacitor,
   fourth connection means for connecting said second node to a third reference potential source before said signal to be computed is transferred to said associated first signal line, and
   second capacitive coupling means for capacitively coupling said second node with said associated second signal line.

33. A neural circuit in accordance with claim 30, wherein said column lines are conductor lines identical to said second signal lines.

34. A neural circuit in accordance with claim 30, wherein
said column lines and said second signal lines are separately provided signal lines.

35. A neural circuit built on the model of vital cells, comprising:
a plurality of first signal lines each having a signal to be computed transferred thereon;
a plurality of amplifiers each serving as the body of said vital cell;
a plurality of second signal lines provided in correspondence to respective said plurality of amplifiers for transferring signals to corresponding amplifiers, said second signal lines being arranged to intersect with said first signal lines;
a plurality of coupling elements provided at respective crossings between said plurality of first signal lines and said plurality of second signal lines, each for coupling an associated first signal line with an associated second signal line in a specific degree of coupling, said plurality of coupling elements being arranged in a matrix of rows and columns;
means for selecting a row of said coupling element matrix;
means for selecting a column of said coupling element matrix; and
means for writing information indicating a degree of coupling in a coupling element selected by said row selection means and said column selection means,
each said coupling element including a memory device for storing supplied coupling degree information in the form of charges and means for coupling the associated first signal line with the associated second signal line in response to said information stored in said memory device,
said coupling means including means for converting a signal line potential on the associated first signal line by the degree of coupling through charging function of a capacitor and thereafter transferring the same to the said second signal line.

36. A neural circuit in accordance with claim 35, wherein
each said coupling means includes:
a capacitor being charged to a first potential before said signal to be computed is transferred onto the associated first signal line, and
means for connecting said capacitor to the associated second signal line in response to said information stored in the memory device and said signal potential on said associated first signal line.

37. A neural circuit in accordance with claim 35, further comprising:
a plurality of column lines each being connected with one column of said coupling elements of said coupling element matrix, coupling degree information being transferred to each said column line, and
a plurality of row lines each connected with one row of said memory devices of said coupling element matrix, row selection signals being transferred onto said plurality of row lines,
said plurality of column lines comprising a plurality of column line pairs each formed by two said column lines,
said write means including means for transferring true complementary data to each said pair of said column lines,
said plurality of coupling elements being so arranged that only one said memory device is connected to one said row line in a pair of said column lines.

38. A neural circuit in accordance with claim 37, wherein each said memory device comprises,
a first memory device having a first capacitor and means for connecting said first capacitor to an associated column line in response to a signal potential on a first row line, and
a second memory device having a second capacitor and means for connecting said second capacitor to said associated column line in response to a signal potential on a second row line, and wherein
each said coupling means comprises:
a third capacitor being charged to a first reference potential before said signal to be computed is transferred to the associated first signal line,
means for connecting said third capacitor to the associated second signal line in response to a signal potential on said associated first signal line and a charge potential of said first capacitor, and
means for connecting a fourth capacitor to said associated second signal line in response to said associated first signal line and a charge potential of said second capacitor.

39. In a neural circuit device built on the model of a vital cell, including a first signal line for transferring a signal to be computed, an amplifier serving as the body of said vital cell, a second signal line for transferring a signal to said amplifier, a coupling element for coupling said first signal line and said second signal line with each other in a specific degree of coupling, and including:
capacitance means for storing information indicating said degree of coupling;
a third signal line for transferring said coupling degree information to said capacitance means, said third signal line being precharged to a first reference potential before said signal to be computed is transferred to said first signal line; and
means for capacitively coupling said second signal line with said third signal line through said capacitance means in response to a signal potential on said first signal line.

40. A coupling element in accordance with with claim 39, wherein
said capacitance means comprises:
a capacitor element having a first electrode and a second electrode being connected to said second signal line, and
means for connecting said first electrode of said capacitor element to said third signal line in response to a signal potential on said first signal line.

41. A coupling element in accordance with claim 39, wherein
said first signal line comprises at least a pair of signal lines and said third signal line comprises a pair of signal lines, and wherein
said capacitance means comprises at least:
first capacitance means comprising a first capacitor element having a first electrode and a second electrode being connected to said second signal line and first connection means for connecting said first electrode of said first capacitor element to one signal line of said third signal line pair in response to a potential on one signal line of said first signal line pair, and second capacitance means comprising a second capacitor element having a first electrode and a second electrode being connected to said second signal line and second connection means for connecting said first electrode of said second capacitor element to the other said signal line of said third signal line pair in response to a signal potential on the other signal line of said first signal line pair, the same signal to be computed being transferred onto both said signal lines of said first signal line pair.

42. A coupling element in accordance with claim 41, wherein said first capacitance means comprises a plurality of capacitance means each having different capacitance values from others, said second capacitance means comprises a plurality of capacitance means each having different capacitance values from others and said first signal line has a plurality of signal lines corresponding to respective said capacitance means included in said first and second capacitance means, the same signal to be computed being transferred to said plurality of signal lines forming said first signal line.

43. A neural circuit built on the model of vital cells, comprising:

a plurality of first signal lines each having a signal to be computed transferred thereon;

a plurality of amplifiers each serving as the body of said vital cell;

a plurality of second signal lines provided in correspondence to respective said plurality of amplifiers each for transferring a signal to the corresponding amplifier;

a plurality of coupling elements provided at respective crossings between said plurality of first signal lines and said plurality of second signal lines, each for coupling an associated first signal lines with an associated second signal line in a specific degree of coupling, each of said plurality of coupling elements comprising capacitance means for storing a specific degree of coupling in the form of charges;

a plurality of memory devices provided in correspondence to respective said coupling elements, each for storing coupling degree information of corresponding said coupling element, each of said plurality of memory devices including capacitance means of the same number as in the corresponding coupling element;

a plurality of third signal lines for transferring said coupling degree information from said memory devices to said coupling elements;

write means for writing said coupling degree information in respective said memory devices; and transfer/write means for transferring said coupling degree information from said memory devices to said coupling elements and writing said coupling degree information in corresponding said coupling elements.

44. A neural circuit in accordance with claim 43, wherein each said memory device includes a one-capacitor and one transistor type dynamic random access memory cell.

45. A neural circuit in accordance with claim 43, further comprising means for precharging said third signal lines to a first reference potential before said signals to be computed as transferred to said first signal lines, and wherein said capacitance means of each said coupling element comprises:

a capacitor for storing coupling degree information, and means for coupling the associated third signal line with the associated second signal line through said capacitor in response to a signal potential on an associated first signal line.

46. A neural circuit in accordance with claim 43, wherein said memory devices are arranged in a matrix of rows and columns, and said third signal lines are arranged in pairs, and wherein said write means includes:

means for selecting a row of said memory device matrix, means for selecting a column of said memory device matrix, and means for transferring true and complementary signal pair to each said third signal line pair.

47. A neural circuit in accordance with claim 46, wherein said capacitance means of said coupling elements are arranged in a matrix of rows and columns in correspondence to said memory devices, and said write/transfer means comprising:

means for selecting a row of said memory devices, means for selecting a row of said capacitance means of said coupling elements, and means for differentially amplifying signal potentials on each said third signal line pair.

48. An amplifier serving as the body of a vital cell in a neural circuit device built on the model of said vital cell, a signal being transferred to said amplifier through a first signal line, said amplifier including:

means for capacitively coupling said first signal line with a first node;

means for precharging a second node to a reference potential in response to an initialization designating signal;

means for connecting said first node with said second node after completion of precharging of said first signal line to said reference potential, said connection means electrically isolating said first node from said second node in precharging of said first signal line;

means for amplifying and outputting a potential of said second node; and means for maintaining said first and second nodes at the same potential in precharging of said first signal line.

49. A neural circuit device in accordance with claim 48, wherein said means for maintaining said first and second nodes at the same potential comprises:

means for comparing a potential of a third node with that of said second node, means for adjusting said potential of said third node in response to an output signal from said comparison means, and means for connecting said third node with said first node in precharging of said first signal line.

50. A neural circuit device in accordance with claim 49, wherein said potential adjusting means comprises:

a switching transistor having a first conduction terminal connected to a first potential source, a second conduction terminal connected to said third node and a control terminal connected to receive an output of said comparison means, and a resistor interposed between said second conduction terminal of said switching transistor and a second potential source.

51. A neural circuit device built on the model of vital cells, comprising:

a plurality of first signal lines to which signals to be computed are transferred;

a plurality of second signal lines arranged to intersect with said plurality of first signal lines;

a plurality of coupling elements respectively provided in crossings between said first signal lines and said second signal lines, each for coupling an associated first signal line with an associated second signal line in a specific degree of coupling; and a plurality of amplifiers provided in correspondence to respective said plurality of second signal lines for detecting and amplifying signal potentials on corresponding second signal lines through capacitive coupling means.

52. An operating method of a neural circuit device built on the model of vital cells, said neural circuit device including a plurality of first signal lines to which signals to be computed are transferred respectively, a plurality of second signal lines arranged to intersect with respective said first signal lines and a plurality of coupling elements provided in respective crossings between said first signal lines and said second signal lines each for coupling an associated first signal line with an associated second signal line in a specific degree of coupling, each of said coupling elements having a capacitive element for storing information indicating said specific degree of coupling in the form of charges, said operating method comprising the steps of:

a step of precharging said second signal lines to a predetermined potential and bringing the same into electrically floating states;

transferring said signals to be computed to said first signal lines; and converting signal potentials on said first signal lines along said coupling degree information stored in said coupling elements and transferring the same onto said second signal lines through capacitive coupling means said conversion/transfer step comprising, in each said coupling element, the steps of:

capacitively coupling the associated second signal line in an electrically floating state with a first node in response to a signal potential on the associated first signal line, connecting said associated electrically floating second signal line, with said first node, connecting said first node to a first potential source, and transferring a charge potential of said capacitive element to said first node in a source follower fashion.

53. An operating method of a neural circuit device built on the model of vital cells, said neural circuit device comprising a plurality of first signal lines to which signals to be computed are transferred respectively, a plurality of second signal lines arranged to intersect with said first signal lines and a plurality of coupling elements respectively provided at crossings between said first signal lines and said second signal lines and each for coupling an associated first signal line with an associated second signal line in a specific degree of coupling, each of said plurality of coupling elements including first and second capacitive elements for storing said specific degree in the form of charges and third and fourth capacitive elements capacitively coupling the associated second signal line with first and second nodes, said operating method comprising the steps of:

precharging said second signal lines to a predetermined first potential;

precharging said first node and said second node to a second potential and a third potential respectively in each said coupling element;

bringing said second signal lines into electrically floating states and transferring said signals to be computed to said first signal lines; and connecting said first and second nodes to said first potential in response to a signal potential of said first capacitive element in each said coupling element.

54. An operating method of a neural circuit device built on the model of vital cells, said neural circuit device including a plurality of signal lines to which signals to be computed are transferred, a plurality of second signal lines arranged to intersect with said first signal lines and a plurality of coupling elements provided in respective crossings between said first signal lines and said second signal lines and each for coupling an associated first signal line with an associated second signal line in a specific degree of coupling, each of said plurality of coupling elements including first and second capacitive elements for storing said specific degree of coupling in the form of charges and third and fourth capacitive elements, said operating method comprising the steps of:

precharging said second signal lines to a first reference potential;

charging said third capacitive element and said fourth capacitive element to a second reference potential and a third reference potential respectively in each said coupling element in precharging of said second signal line;

bringing said second signal lines into electrical floating states and then transferring said signals to be computed to said first signal lines; and connecting said third capacitive element to the associated second signal line in response to a signal potential on the associated first signal line and said information stored in said first capacitive element and connecting said fourth capacitive element to said associated second signal line in response to a signal potential of said associated first signal line and said information stored in said second capacitive element in each coupling element.

55. An operating method of a neural circuit device built on the model of vital cells, said neural circuit device including a plurality of first signal lines to which signals to be computed are transferred, a plurality of second signal lines arranged to intersect with said first signal lines, a plurality of coupling elements, being arranged in a matrix, provided in respective crossings between said first signal lines and said second signal lines and each for coupling an associated first signal line with an associated second signal line in a specific degree of coupling, each of said plurality of coupling elements including a capacitive element for storing said specific degree of coupling in the form of charges, and a plurality of third signal lines for transferring coupling degree information to be written to said capacitive elements, a column of said capacitive elements being connected to respective said third signal lines, said operating method comprising the steps of:

writing said coupling information in respective said capacitive elements through said third signal lines;

maintaining said third signal lines at a first reference potential;

transferring said signals to be computed to said first signal lines; and coupling said third signal line with said second signal line through each said capacitive elements in said coupling elements in response to signal potentials on corresponding first signal lines.

56. An operating method in accordance with claim 55, wherein said neural circuit further comprises a plurality of memory devices being arranged in a matrix in correspondence to said capacitive elements included in said coupling elements, each said memory device comprising a one-transistor and one-capacitor type dynamic memory cell, each said coupling element comprises at least a pair of said capacitive elements, and said third signal lines are arranged in pairs, each said third signal line being connected with a column of said memory devices and a column of said capacitive elements included in said coupling elements, and wherein said writing step comprising the steps of:

selecting one row of said memory devices, writing said coupling degree information in said selected one row of said memory devices through said third signal lines, said writing step including a step of transferring true and complementary signal pair onto each said pair of said third signal lines, and transferring said coupling degree information from each said memory device to each said capacitive element included in each said coupling element after completion of writing of said coupling degree information in all said memory devices, said transfer step including:

selecting one row of said memory devices and reading information of said selected memory devices onto associated third signal lines, differentially amplifying signal potentials on each said pair of said third signal lines, and selecting one row of said capacitive elements included in said coupling elements and connecting said selected row of capacitive elements to corresponding third signal lines.

57. An operating method of a neural circuit device built on the model of vital cells, said neural circuit device comprising a plurality of first signal lines to which signals to be computed are transferred, a plurality of second signal lines arranged to intersect with said first signal lines, a plurality of coupling elements respectively provided at crossings between said first signal lines and said second signal lines and each for coupling associated first signal line with associated second signal line in a specific degree of coupling and a plurality of amplifiers provided in correspondence to respective said second signal lines, each said amplifier having a first node and a second node, said operating method comprising, in each said amplifier, the steps of:

capacitively coupling an associated second signal line with said first node;

precharging said second signal line to a first potential, said precharging step including a step of electrically isolating said first and second nodes from each other while maintaining the same at the same potential;

connecting said first node with said second node in response to transfer of said signal to be computed to said first signal line; and amplifying and outputting a potential of said second node.

58. An operating method in accordance with claim 57, further comprising, as initialization steps, the steps of:

precharging said second signal lines and said second nodes to said first potential in response to an initialization designating signal; and connecting said first nodes with said second nodes in response to said initialization designating signal.

59. An operating method in accordance with claim 57, wherein said step of maintaining said nodes at the same potential comprises the steps of:

comparing potentials of said second and third nodes with each other, adjusting said potential of said third node in response to the result of said comparison in said comparing step, and a step of connecting said third node with said first node in response to said precharging of said second signal line to said first potential, said first and third nodes being electrically isolated from each other in initialization of said neural circuit device.

* * * * *